United States Patent
Lee et al.

(10) Patent No.: US 11,856,181 B2
(45) Date of Patent: Dec. 26, 2023

(54) METHOD AND DEVICE FOR TRANSMITTING OR RECEIVING 6DOF VIDEO USING STITCHING AND RE-PROJECTION RELATED METADATA

(71) Applicant: LG ELECTRONICS INC., Seoul (KR)

(72) Inventors: Sooyeon Lee, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 941 days.

(21) Appl. No.: 16/650,842

(22) PCT Filed: Jun. 8, 2018

(86) PCT No.: PCT/KR2018/006535
§ 371 (c)(1),
(2) Date: Jul. 20, 2020

(87) PCT Pub. No.: WO2019/066191
PCT Pub. Date: Apr. 4, 2019

(65) Prior Publication Data
US 2023/0132473 A1   May 4, 2023

Related U.S. Application Data

(60) Provisional application No. 62/576,051, filed on Oct. 23, 2017, provisional application No. 62/564,283, filed on Sep. 28, 2017.

(51) Int. Cl.
G06T 9/00 (2006.01)
H04N 13/351 (2018.01)
(Continued)

(52) U.S. Cl.
CPC ............ H04N 13/351 (2018.05); G06T 9/00 (2013.01); G06V 10/16 (2022.01); G06V 10/761 (2022.01); H04N 13/178 (2018.05)

(58) Field of Classification Search
CPC .. G06T 9/00; G06T 3/40; G06T 9/005; G06T 7/12; G06T 15/005; G06T 3/00;
(Continued)

(56) References Cited

U.S. PATENT DOCUMENTS 10,078,644 B1 * 9/2018 Newman ............. H04N 1/2158
2011/0090307 A1   4/2011 Marvie et al.
(Continued)

FOREIGN PATENT DOCUMENTS

CN   106658023   5/2017
KR   1020070030849   3/2007
(Continued)

OTHER PUBLICATIONS

European Patent Office Application Serial No. 18861900.1, Search Report dated Sep. 4, 2020, 10 pages.
(Continued)

*Primary Examiner* — Duy M Dang
(74) *Attorney, Agent, or Firm* — LEE, HONG, DEGERMAN, KANG & WAIMEY PC

(57) ABSTRACT

A 6DoF video data processing method performed by a 6DoF video transmission device according to the present invention comprises the steps of: acquiring information on pictures of a 6DoF video and metadata of the 6DoF video; decoding the pictures on the basis of the metadata and the information of the pictures, and deriving an image of a user position; and processing the image on the basis of the metadata, and performing rendering into a 3D space around the user
(Continued)

position, wherein the metadata includes stitching information and information of a camera having captured the 6DoF video.

18 Claims, 31 Drawing Sheets

(51) Int. Cl.
*H04N 13/178* (2018.01)
*G06V 10/74* (2022.01)
*G06V 10/10* (2022.01)

(58) Field of Classification Search
CPC ........ G06T 5/00; G06T 15/00; H03M 7/6005; H03M 7/6011; H03M 7/3077; H03M 7/4031; H03M 7/425; H03M 7/6023; H03M 7/46; H04N 19/436; H04N 19/88; H04N 19/91; H04N 19/44; H04N 11/146; H04N 11/165; H04N 11/186; H04N 19/42; H04N 19/423; H04N 19/433; H04N 19/426; H04N 19/427; H04N 19/93; H04N 1/419; H04N 13/00; H04N 13/351; H04N 13/178; G06V 10/16; G06V 10/761

See application file for complete search history.

(56) References Cited

U.S. PATENT DOCUMENTS

| | | |
|---|---|---|
| 2014/0320667 A1 | 10/2014 | Densham et al. |
| 2016/0179830 A1 | 6/2016 | Schmalstieg et al. |
| 2017/0244948 A1 | 8/2017 | Pang et al. |

FOREIGN PATENT DOCUMENTS

| | | |
|---|---|---|
| KR | 20160094384 | 8/2016 |
| KR | 1020170052674 | 5/2017 |
| KR | 20170107719 | 9/2017 |
| WO | 2016191464 | 12/2016 |
| WO | 2017142353 | 8/2017 |

OTHER PUBLICATIONS

3rd Generation Partnership Project (3GPP), "Technical Specification Group Services and System Aspects; Virtual Reality (VR) media services of 3GPP (Release 15)," 3GPP TR 26.918 v2.0.0, Sep. 2017, 94 pages.

WG11, "Working Draft 0.3 of TR: Technical Report on Architectures for Immersive Media", ISO/IECJTC1/SC29/WG11/W17067, XP30023728, Jul. 2017, 46 pages.

David Wood, "Report of the DVB CM Study Mission on Virtual Reality (CM1697) ", XP17851464, Oct. 2016, 127 pages.

The State Intellectual Property Office of the People's Republic of China Application Serial No. 201880062266.5, Office Action dated Jan. 6, 2021, 17 pages.

PCT International Application No. PCT/KR2018/006535, International Search Report dated Sep. 2018, 6 pages.

* cited by examiner

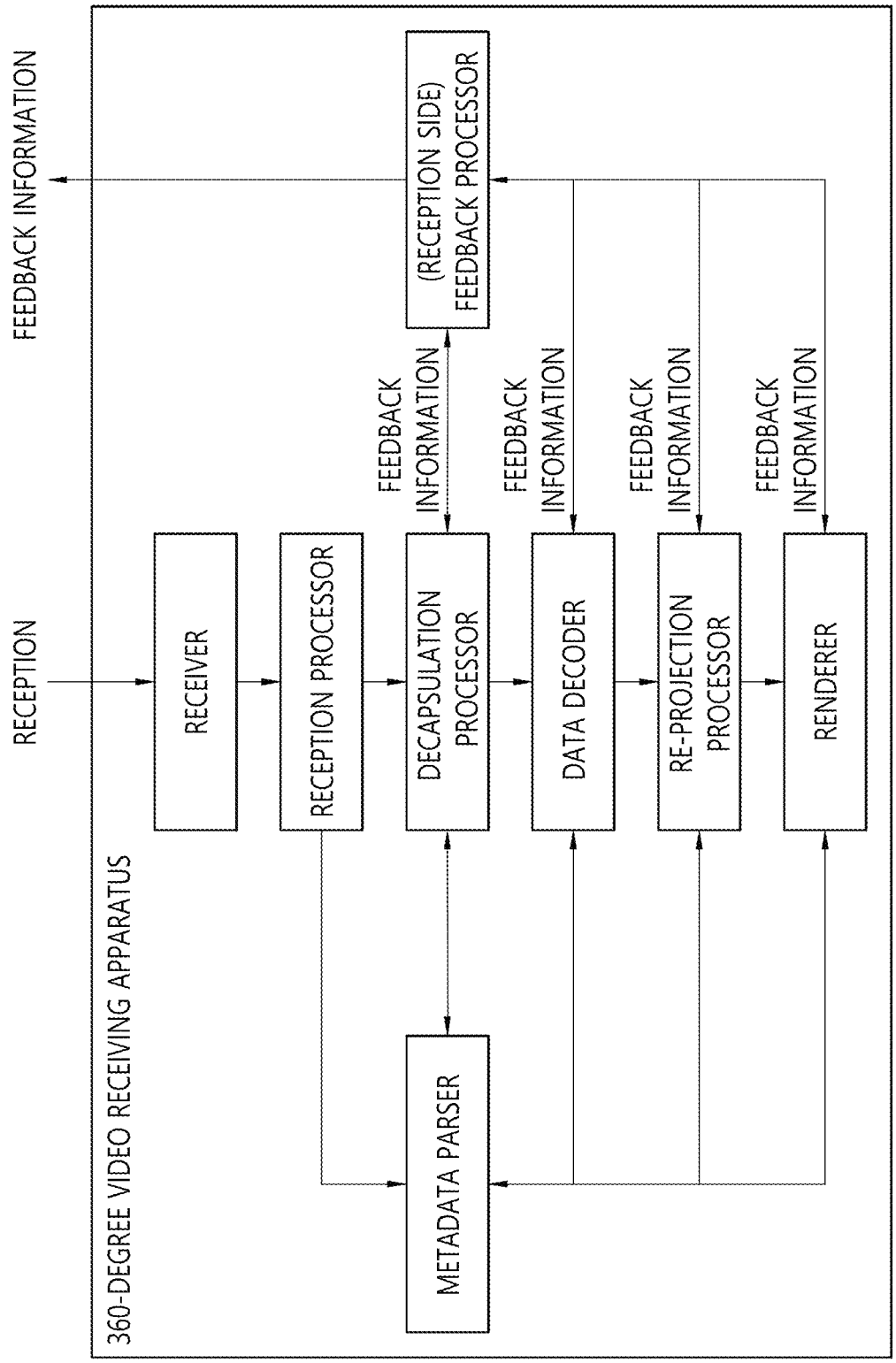

FIG. 9A
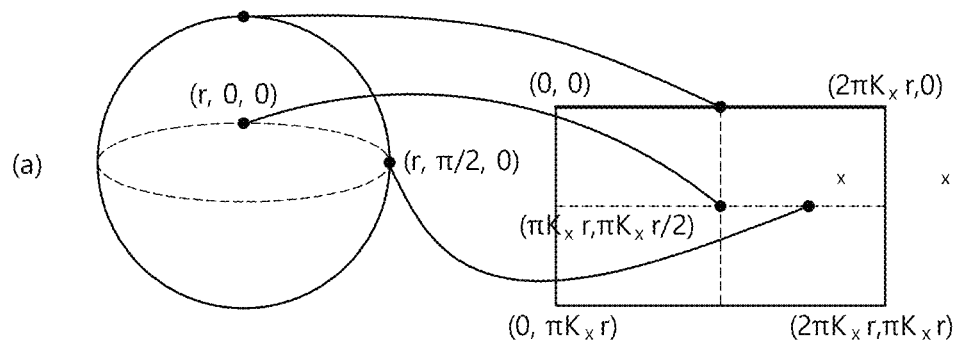
(a)
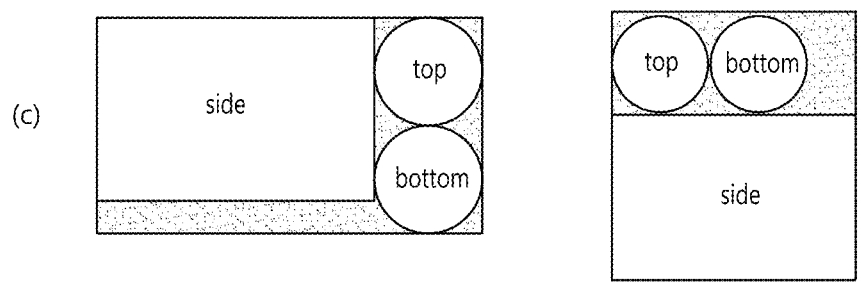
(b)
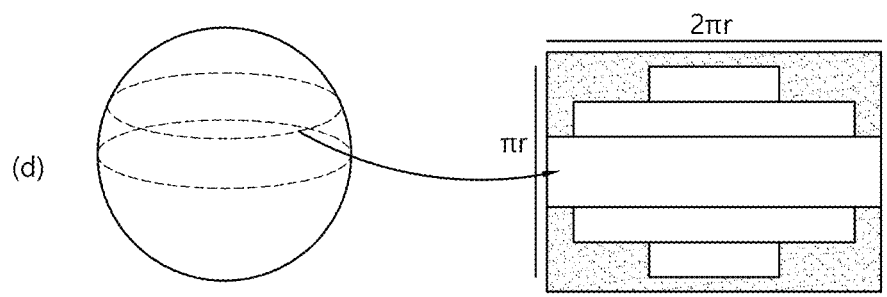
(c)
(d)

FIG. 11

```
...
        <BASIC METADATA>
unsigned    int(8)    vr_geometry;
unsigned    int(8)    projection_schme;

<Stereocopic RELATED METADATA>
unsigned    int(1)    is_stereoscopic;
unsigned    int(3)    stereo_mode;

<Initial View RELATED METADATA>
signed      int(8)    initial_view_yaw_degree;
signed      int(8)    initial_view_pitch_degree;
signed      int(8)    initial_view_roll_degree;

<ROI RELATED METADATA>
unsigned int(1)       2d_roi_range_flag;
unsigned int(1)       3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}

<Field Of View RELATED METADATA>
unsigned int(1)          content_fov_flag;
if (content_fov_flag==1) {
  unsigned int(16)       content_fov;
}

<Cropped Region RELATED METADATA>
unsigned int(1)          is_copped_region;
if (content_fov_flag==1) {
  unsigned int(16)       cr_region_left_top_x;
  unsigned int(16)       cr_region_left_top_y;
  unsigned int(16)       cr_region_width;
  unsigned int(16)       cr_region_height;
}
...
```

FIG. 18
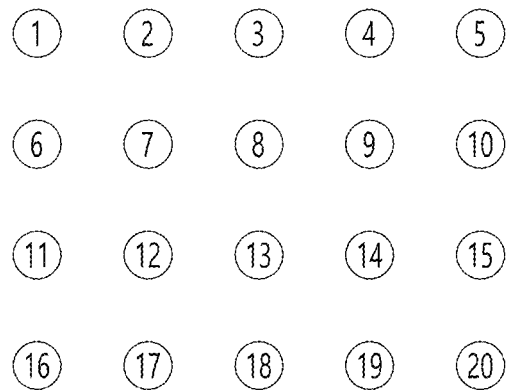
(a)
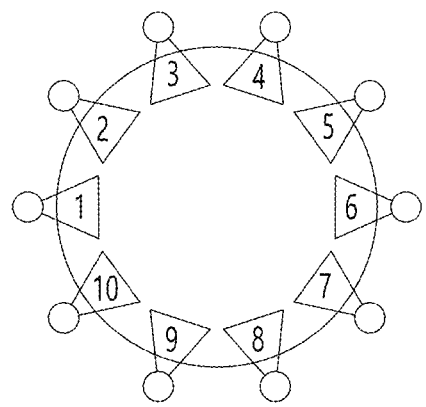
(b)
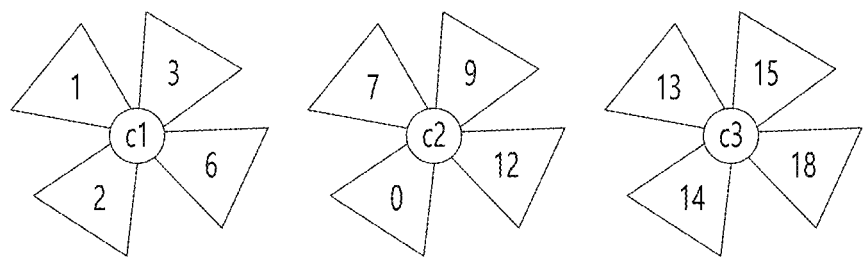
(c)

FIG. 19E
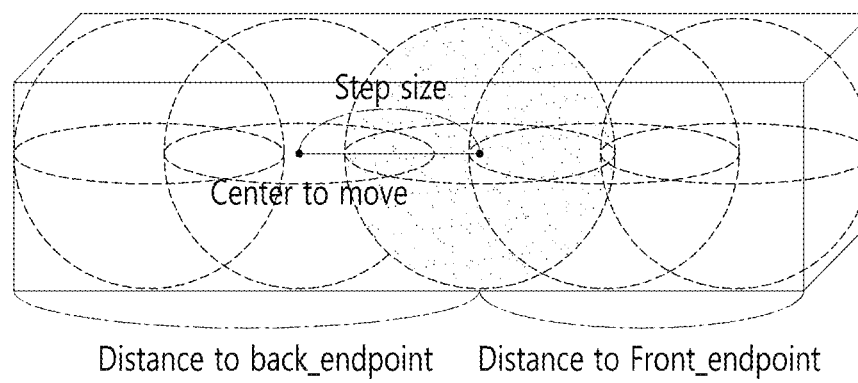
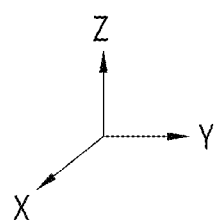

(a)            (b)

METHOD AND DEVICE FOR TRANSMITTING OR RECEIVING 6DOF VIDEO USING STITCHING AND RE-PROJECTION RELATED METADATA

CROSS-REFERENCE TO RELATED APPLICATIONS

This application is the National Stage filing under 35 U.S.C. 371 of International Application No. PCT/KR2018/006535, filed on Jun. 8, 2018, which claims the benefit of U.S. Provisional Application Nos. 62/564,283 filed on Sep. 28, 2017, and 62/576,051, filed on Oct. 23, 2017, the contents of which are all hereby incorporated by reference herein in their entirety.

BACKGROUND

Field

The present disclosure relates to a 6DoF video, and more particularly, to a method and apparatus for transmitting and receiving a 6DoF video using stitching and reprojection related metadata.

Related Art

Virtual reality (VR) systems allow users to feel as if they are in electronically projected environments. Systems for providing VR can be improved in order to provide images with higher picture quality and spatial sounds. VR systems allow users to interactively consume VR content.

Six degrees of Freedom (6DoF) contents may enable a user to consume more various sensory experiences by providing a 3DoF or 360-degree video newly formed according to a user movement.

SUMMARY

The present disclosure provides a method and apparatus for increasing efficiency of 6DoF video data transmission for providing a 6DoF system.

The present disclosure further provides a method and apparatus for transmitting a 6DoF video and metadata of the 6DoF video.

The present disclosure further provides a method and apparatus for transmitting a 6DoF video and capture information metadata of the 6DoF video.

The present disclosure further provides a method and apparatus for transmitting a 6DoF video and stitching information metadata of the 6DoF video.

The present disclosure further provides a method and apparatus for transmitting a 6DoF video and rendering information metadata of the 6DoF video.

In an aspect, a 6DoF video processing method performed by a 6DoF video transmitting apparatus is provided. The method includes acquiring a 6DoF video of a plurality of views by at least one camera; acquiring pictures of the views by processing the 6DoF video; generating metadata of the 6DoF video; encoding the pictures; and performing a process for storing or transmitting the encoded pictures and the metadata, wherein the metadata includes camera information for a camera capturing the 6DoF video and stitching information.

In another aspect, a 6DoF video transmitting apparatus for processing 6DoF video data is provided. The 6DoF video transmission apparatus includes a data inputter for acquiring a 6DoF video of a plurality of views by at least one camera, a projection processor for processing the 6DoF video to obtain pictures of the views, a metadata processor for generating metadata of the 6DoF video, a data encoder for encoding the pictures, and a transmission processor for performing processing for storing or transmitting the encoded pictures and the metadata, wherein the metadata includes camera information for a camera capturing the 6DoF video and stitching information.

In another aspect, a 6DoF video processing method performed by a 6DoF video receiving apparatus is provided. The method includes acquiring information about pictures of a 6DoF video and metadata of the 6DoF video; decoding the pictures based on the metadata and information about the pictures, and deriving an image of a user position; and rendering the image in a 3D space centered on the user position by processing the image based on the metadata, wherein the metadata includes camera information for a camera capturing the 6DoF video and stitching information.

In another aspect, a 6DoF video receiving apparatus for processing 6DoF video data is provided. The 6DoF video receiving apparatus includes a reception processor for acquiring information about pictures of a 6DoF video and metadata about the 6DoF video, a data decoder for decoding the pictures based on the metadata and information about the pictures, and deriving an image of a user's position, and a renderer for processing the image based on the metadata and rendering the image in a 3D space centered on the user's position, wherein the metadata includes camera information for a camera capturing the 6DoF video and stitching information.

According to the present disclosure, it is possible to efficiently transmit a 6DoF content in an environment supporting next generation hybrid broadcasting using a terrestrial broadcasting network and an internet network.

According to the present disclosure, in consuming a 6DoF content of a user, a method for providing an interactive experience can be proposed.

According to the present disclosure, in consuming a 6DoF content of a user, it is possible to propose a method of signaling by accurately reflecting a 6DoF content producer's intention.

According to the present disclosure, in delivering a 6DoF content, it is possible to propose a method of efficiently increasing a transmission capacity and delivering necessary information.

According to the present disclosure, even when there is no captured 6DoF video for a specific position by signaling stitching information about the specific position, a 6DoF video of the specific position can be generated and provided to the user based on a 6DoF video of a peripheral position and thus 6DoF contents can be provided more efficiently.

According to the present disclosure, by signaling reserved rendering information according to a movement direction provided in the 6DoF content or a predicted position movement direction of the user, the 6DoF content to be provided to the user can be transmitted and rendered preferentially, and the 6DoF content can be provided more efficiently.

BRIEF DESCRIPTION OF THE DRAWINGS

FIG. 6 is a view schematically illustrating a configuration of a 360-degree video reception apparatus to which the present disclosure is applicable.

FIGS. 9A and 9B illustrate projection schemes according to the present disclosure.

FIG. 11 illustrates an example of 360-degree video related metadata according to an embodiment of the present disclosure.

FIG. 18 illustrates a camera array used for acquiring 6DoF video data.

FIGS. 19A to 19E are diagrams illustrating a form of the reserved rendering range of the present disclosure.

DESCRIPTION OF EXEMPLARY EMBODIMENTS

Figure 1:
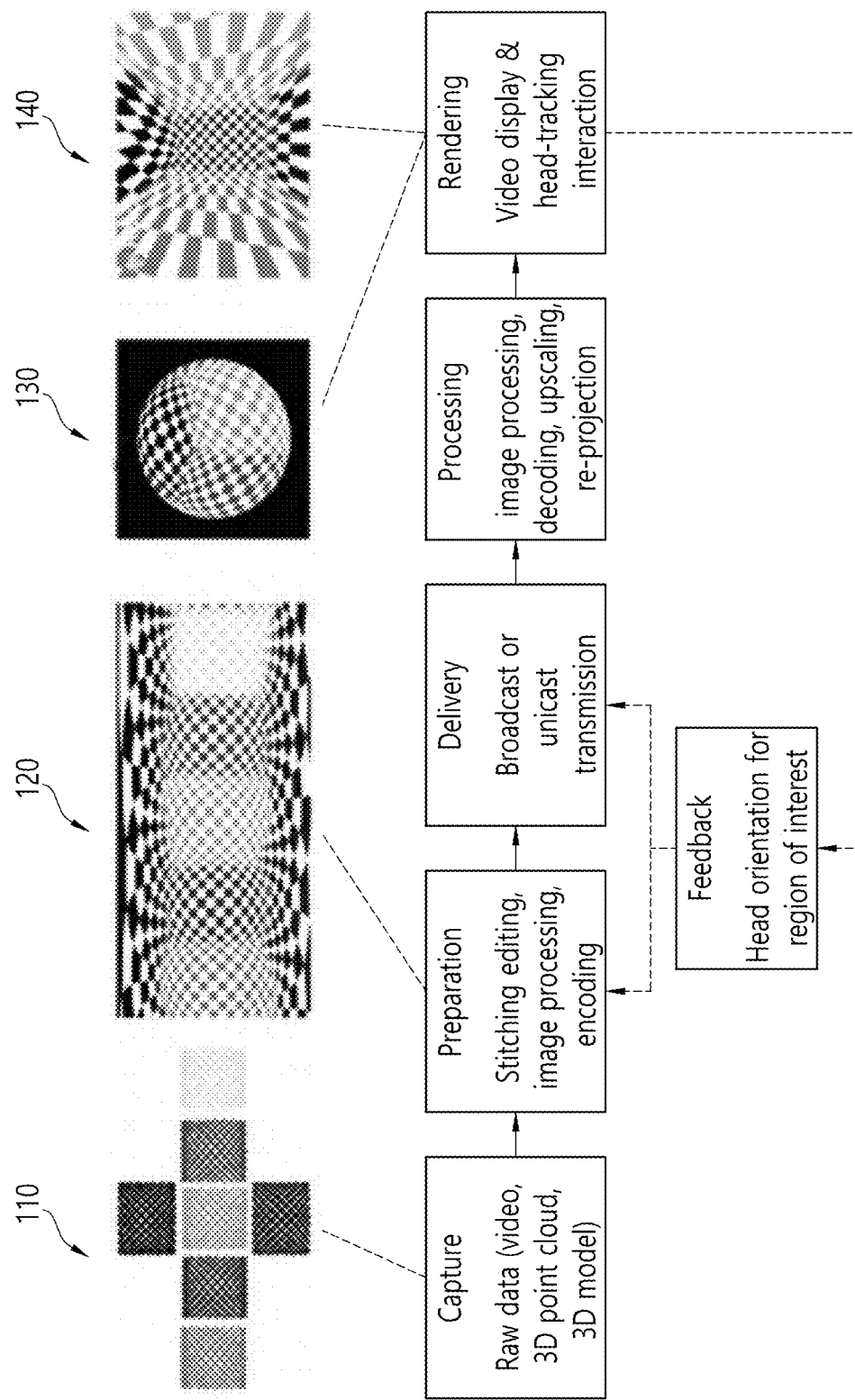
FIG. 1 is a view illustrating overall architecture for providing a 360-degree video according to the present disclosure.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, preferred embodiments of the present disclosure will be described in more detail with reference to the attached drawings. Hereinafter, the same reference numbers will be used throughout this specification to refer to the same components and redundant description of the same component will be omitted.

FIG. 1 is a view illustrating overall architecture for providing a 360-degree video according to the present disclosure.

The present disclosure proposes a method of providing 360-degree content in order to provide virtual reality (VR) to users. Here, the 360-degree content may refer to a 3 Degrees of Freedom (3DoF) content, VR may refer to technology for replicating actual or virtual environments or those environments. VR artificially provides sensory experience to users and thus users can experience electronically projected environments.

360 content refers to content for realizing and providing VR and may include a 360-degree video and/or 360 audio. The 360-degree video may refer to video or image content which is necessary to provide VR and is captured or reproduced omnidirectionally (360 degrees). Hereinafter, the 360-degree video may refer to 360-degree video. A 360-degree video may refer to a video or an image represented on 3D spaces in various forms according to 3D models. For example, a 360-degree video can be represented on a spherical surface. The 360 audio is audio content for providing VR and may refer to spatial audio content whose audio generation source can be recognized to be located in a specific 3D space. 360 content may be generated, processed and transmitted to users and users can consume VR experiences using the 360 content.

Particularly, the present disclosure proposes a method for effectively providing a 360-degree video. To provide a 360-degree video, a 360-degree video may be captured through one or more cameras. The captured 360-degree video may be transmitted through series of processes and a reception side may process the transmitted 360-degree video into the original 360-degree video and render the 360-degree video. In this manner the 360-degree video can be provided to a user.

Specifically, processes for providing a 360-degree video may include a capture process, a preparation process, a transmission process, a processing process, a rendering process and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360-degree video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

Video data projected on the 2D image may be subjected to the region-wise packing process in order to improve video coding efficiency. Region-wise packing may refer to a process of processing video data projected on a 2D image for each region. Here, regions may refer to divided areas of a 2D image. Regions can be obtained by dividing a 2D image equally or arbitrarily according to an embodiment. Further, regions may be divided according to a projection scheme in an embodiment. The region-wise packing process is an optional process and may be omitted in the preparation process.

The processing process may include a process of rotating regions or rearranging the regions on a 2D image in order to improve video coding efficiency according to an embodiment. For example, it is possible to rotate regions such that specific sides of regions are positioned in proximity to each other to improve coding efficiency.

The processing process may include a process of increasing or decreasing resolution for a specific region in order to differentiate resolutions for regions of a 360-degree video according to an embodiment. For example, it is possible to increase the resolution of regions corresponding to relatively more important regions in a 360-degree video to be higher than the resolution of other regions. Video data projected on the 2D image or region-wise packed video data may be subjected to the encoding process through a video codec.

According to an embodiment, the preparation process may further include an additional editing process. In this editing process, editing of image/video data before and after projection may be performed. In the preparation process, metadata regarding stitching/projection/encoding/editing may also be generated. Further, metadata regarding an initial viewpoint or a region of interest (ROI) of video data projected on the 2D image may be generated.

The transmission process may be a process of processing and transmitting image/video data and metadata which have passed through the preparation process. Processing according to an arbitrary transmission protocol may be performed for transmission. Data which has been processed for transmission may be delivered through a broadcast network and/or a broadband. Such data may be delivered to a reception side in an on-demand manner. The reception side may receive the data through various paths.

The processing process may refer to a process of decoding received data and re-projecting projected image/video data on a 3D model. In this process, image/video data projected on the 2D image may be re-projected on a 3D space. This process may be called mapping or projection according to context. Here, 3D model to which image/video data is mapped may have different forms according to 3D models. For example, 3D models may include a sphere, a cube, a cylinder and a pyramid.

According to an embodiment, the processing process may additionally include an editing process and an up-scaling process. In the editing process, editing of image/video data before and after re-projection may be further performed. When the image/video data has been reduced, the size of the image/video data can be increased by up-scaling samples in the up-scaling process. An operation of decreasing the size through down-scaling may be performed as necessary.

The rendering process may refer to a process of rendering and displaying the image/video data re-projected on the 3D space. Re-projection and rendering may be combined and represented as rendering on a 3D model. An image/video re-projected on a 3D model (or rendered on a 3D model) may have a form 130 shown in FIG. 1. The form 130 shown in FIG. 1 corresponds to a case in which the image/video is re-projected on a 3D spherical model. A user can view a region of the rendered image/video through a VR display. Here, the region viewed by the user may have a form 140 shown in FIG. 1.

The feedback process may refer to a process of delivering various types of feedback information which can be acquired in a display process to a transmission side. Interactivity in consumption of a 360-degree video can be provided through the feedback process. According to an embodiment, head orientation information, viewport information representing a region currently viewed by a user, and the like can be delivered to a transmission side in the feedback process. According to an embodiment, a user may interact with an object realized in a VR environment. In this case, information about the interaction may be delivered to a transmission side or a service provider in the feedback process. According to an embodiment, the feedback process may not be performed.

The head orientation information may refer to information about the position, angle, motion and the like of the head of a user. Based on this information, information about a region in a 360-degree video which is currently viewed by the user, that is, viewport information, can be calculated.

The viewport information may be information about a region in a 360-degree video which is currently viewed by a user. Gaze analysis may be performed through the viewpoint information to check how the user consumes the 360-degree video, which region of the 360-degree video is gazed by the user, how long the region is gazed, and the like. Gaze analysis may be performed at a reception side and a result thereof may be delivered to a transmission side through a feedback channel. A device such as a VR display may extract a viewport region based on the position/direction of the head of a user, information on a vertical or horizontal field of view (FOV) supported by the device, and the like.

According to an embodiment, the aforementioned feedback information may be consumed at a reception side as well as being transmitted to a transmission side. That is, decoding, re-projection and rendering at the reception side may be performed using the aforementioned feedback information. For example, only a 360-degree video with respect to a region currently viewed by the user may be preferentially decoded and rendered using the head orientation information and/or the viewport information.

Here, a viewport or a viewport region may refer to a region in a 360-degree video being viewed by a user. A viewpoint is a point in a 360-degree video being viewed by a user and may refer to a center point of a viewport region. That is, a viewport is a region having a viewpoint at the center thereof, and the size and the shape of the region can be determined by an FOV which will be described later.

In the above-described overall architecture for providing a 360-degree video, image/video data which is subjected to the capture/projection/encoding/transmission/decoding/re-projection/rendering processes may be referred to as 360-degree video data. The term "360-degree video data" may be used as the concept including metadata and signaling information related to such image/video data.

To store and transmit media data such as the aforementioned audio and video data, a standardized media file format may be defined. According to an embodiment, a media file may have a file format based on ISO BMFF (ISO base media file format).

Figure 2:
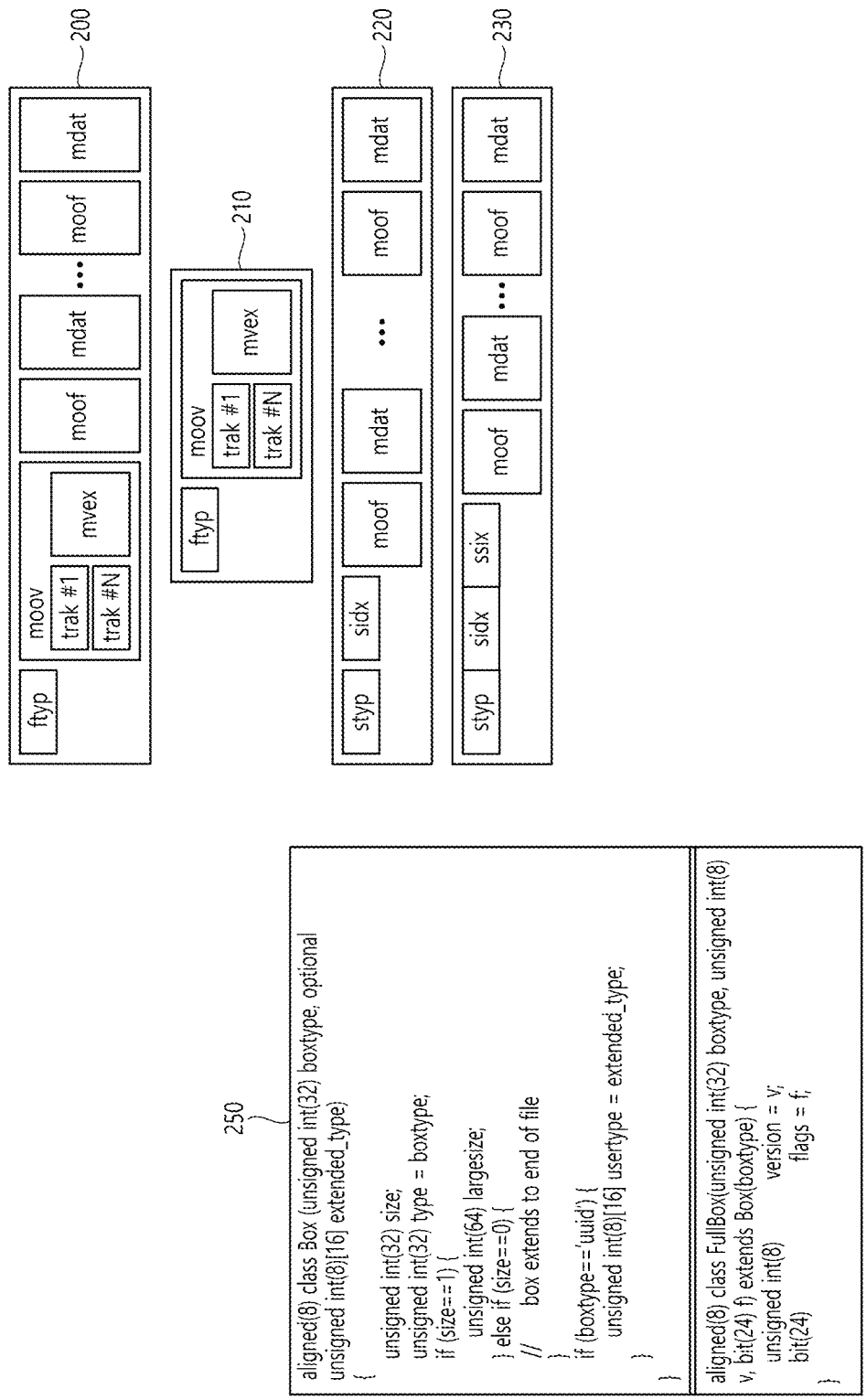
FIGS. 2 and 3 are views illustrating a structure of a media file according to an embodiment of the present disclosure.
Figure 3:
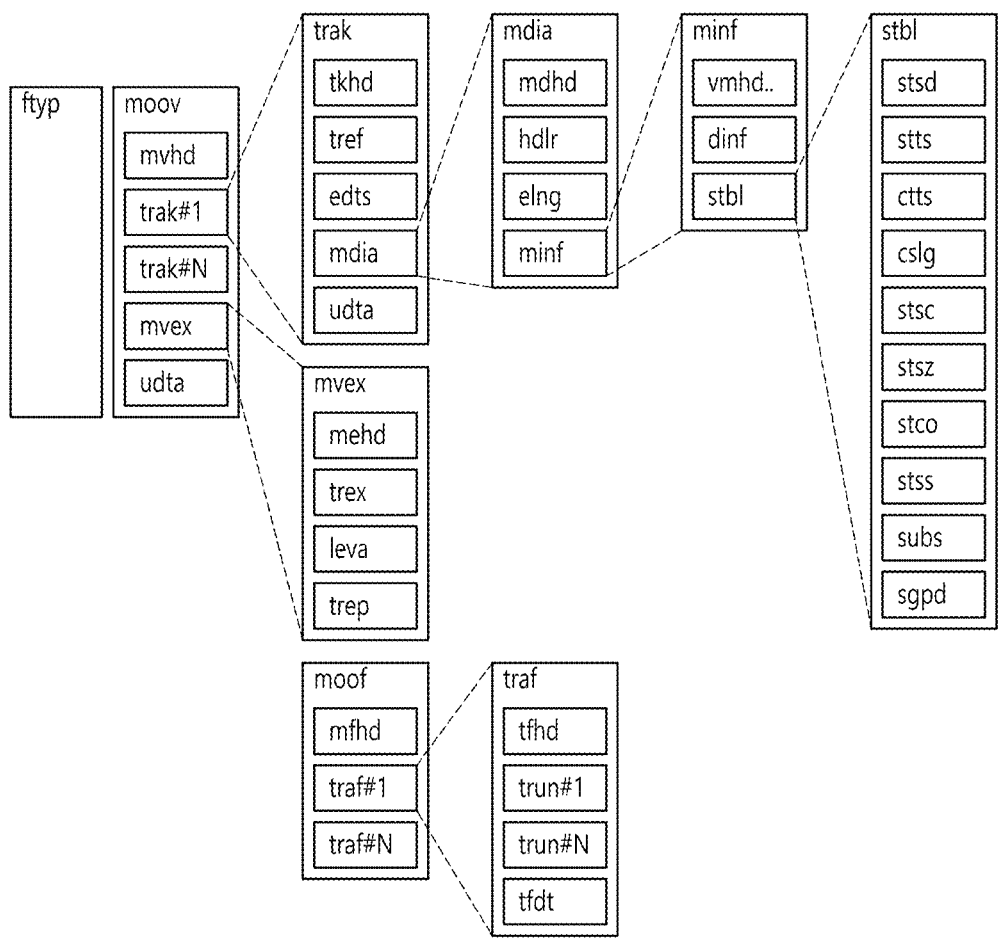

FIGS. 2 and 3 are views illustrating a structure of a media file according to an embodiment of the present disclosure.

The media file according to the present disclosure may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to the present disclosure may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to the present disclosure may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, the fields (attributes) for 360-degree video of the present disclosure can be included and delivered in a DASH based adaptive streaming model.

Figure 4:
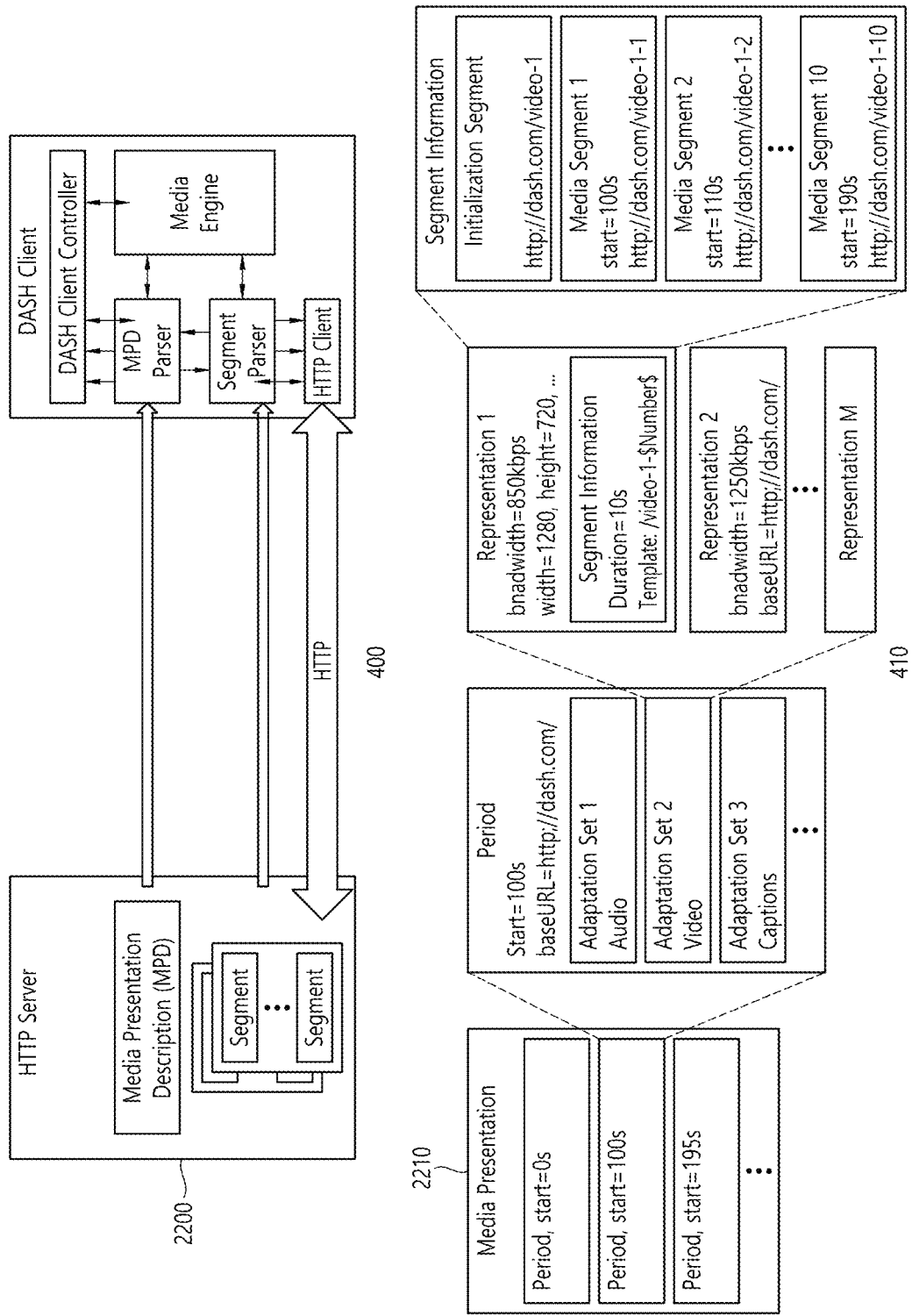
FIG. 4 illustrates an example of the overall operation of a DASH based adaptive streaming model.

FIG. 4 illustrates an example of the overall operation of a DASH based adaptive streaming model. The DASH based adaptive streaming model according to the illustrated embodiment 400 describes operations between an HTTP server and a DASH client. Here, DASH (Dynamic Adaptive Streaming over HTTP) is a protocol for supporting adaptive streaming based on HTTP and can dynamically support streaming according to network state. Accordingly, seamless AV content reproduction can be provided.

First, a DASH client can acquire an MPD. The MPD can be delivered from a service provider such as an HTTP server. The DASH client can send a request for corresponding segments to the server using information on access to the segments which is described in the MPD. Here, the request can be performed based on a network state.

Upon acquisition of the segments, the DASH client can process the segments in a media engine and display the processed segments on a screen. The DASH client can request and acquire necessary segments by reflecting a reproduction time and/or a network state therein in real time (adaptive streaming). Accordingly, content can be seamlessly reproduced.

The MPD (Media Presentation Description) is a file including detailed information for a DASH client to dynamically acquire segments and can be represented in the XML format.

A DASH client controller can generate a command for requesting the MPD and/or segments based on a network state. Further, this controller can control an internal block such as the media engine to be able to use acquired information.

An MPD parser can parse the acquired MPD in real time. Accordingly, the DASH client controller can generate the command for acquiring necessary segments.

The segment parser can parse acquired segments in real time. Internal blocks such as the media block can perform specific operations according to information included in the segments.

An HTTP client can send a request for a necessary MPD and/or segments to the HTTP server. In addition, the HTTP client can transfer the MPD and/or segments acquired from the server to the MPD parser or a segment parser.

The media engine can display content on a screen using media data included in segments. Here, information of the MPD can be used.

A DASH data model may have a hierarchical structure 410. Media presentation can be described by the MPD. The MPD can describe a temporal sequence of a plurality of periods which forms the media presentation. A period can represent one period of media content.

In one period, data can be included in adaptation sets. An adaptation set may be a set of a plurality of exchangeable media content components. Adaptation can include a set of representations. A representation can correspond to a media content component. Content can be temporally divided into a plurality of segments within one representation. This may be for accessibility and delivery. To access each segment, the URL of each segment may be provided.

The MPD can provide information related to media presentation, and a period element, an adaptation set element and a representation element can respectively describe the corresponding period, adaptation set and representation. A representation can be divided into sub-representations, and a sub-representation element can describe the corresponding sub-representation.

Here, common attributes/elements can be defined. The common attributes/elements can be applied to (included in) adaptation sets, representations and sub-representations. The common attributes/elements may include an essential property and/or a supplemental property.

The essential property is information including elements regarded as essential elements in processing data related to the corresponding media presentation. The supplemental property is information including elements which may be used to process data related to the corresponding media presentation. According to an embodiment, when descriptors which will be described later are delivered through the MPD, the descriptors can be defined in the essential property and/or the supplemental property and delivered.

Figure 5:
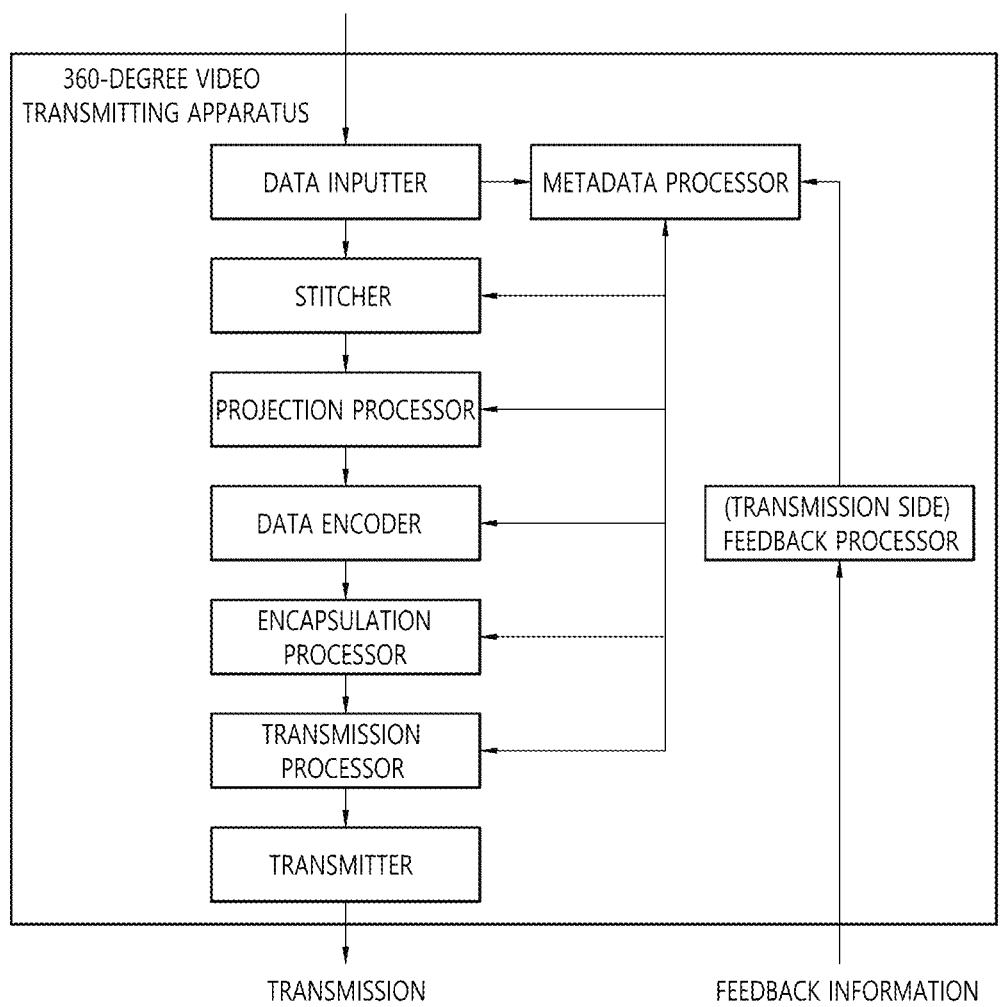
FIG. 5 is a view schematically illustrating a configuration of a 360-degree video transmission apparatus to which the present disclosure is applicable.

FIG. 5 is a view schematically illustrating a configuration of a 360-degree video transmission apparatus to which the present disclosure is applicable.

The 360-degree video transmission apparatus according to the present disclosure can perform operations related the above-described preparation process and the transmission process. The 360-degree video transmission apparatus may include a data inputter, a stitcher, a projection processor, a region-wise packing processor (not shown), a metadata processor, a (transmission side) feedback processor, a data encoder, an encapsulation processor, a transmission processor and/or a transmitter as internal/external elements.

The data inputter can receive captured images/videos for respective viewpoints. The images/videos for the respective viewpoints may be images/videos captured by one or more cameras. Further, data inputter may receive metadata generated in a capture process. The data inputter may forward the received images/videos for the viewpoints to the stitcher and forward metadata generated in the capture process to the signaling processor.

The stitcher can perform a stitching operation on the captured images/videos for the viewpoints. The stitcher may forward stitched 360-degree video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360-degree video data on a 2D image. The projection processor may perform projection according to various schemes which will be described later. The projection processor may perform mapping in consideration of the depth of 360-degree video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360-degree video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360-degree video related metadata using such metadata. According to an embodiment, the metadata processor may generate the 360-degree video related metadata in the form of a signaling table. 360-degree video related metadata may also be called metadata or 360-degree video related signaling information according to signaling context. Further, the metadata processor may forward the acquired or generated metadata to internal elements of the 360-degree video transmission apparatus as necessary. The metadata processor may forward the 360-degree video related metadata to the data encoder, the encapsulation processor and/or the transmission processor such that the 360-degree video related metadata can be transmitted to a reception side.

The data encoder can encode the 360-degree video data projected on the 2D image and/or region-wise packed 360-degree video data. The 360-degree video data can be encoded in various formats.

The encapsulation processor can encapsulate the encoded 360-degree video data and/or 360-degree video related metadata in a file format. Here, the 360-degree video related metadata may be received from the metadata processor. The encapsulation processor can encapsulate the data in a file format such as ISOBMFF, CFF or the like or process the data into a DASH segment or the like. The encapsulation processor may include the 360-degree video related metadata in a file format. The 360-degree video related metadata may be included in a box having various levels in SOBMFF or may be included as data of a separate track in a file, for example. According to an embodiment, the encapsulation processor may encapsulate the 360-degree video related metadata into a file. The transmission processor may perform processing for transmission on the encapsulated 360-degree video data according to file format. The transmission processor may process the 360-degree video data according to an arbitrary transmission protocol. The processing for transmission may include processing for delivery over a broadcast network and processing for delivery over a broadband. According to an embodiment, the transmission processor may receive 360-degree video related metadata from the metadata processor as well as the 360-degree video data and perform the processing for transmission on the 360-degree video related metadata.

The transmitter can transmit the 360-degree video data and/or the 360-degree video related metadata processed for transmission through a broadcast network and/or a broadband. The transmitter may include an element for transmission through a broadcast network and/or an element for transmission through a broadband.

According to an embodiment of the 360-degree video transmission apparatus according to the present disclosure, the 360-degree video transmission apparatus may further include a data storage unit (not shown) as an internal/external element. The data storage unit may store encoded 360-degree video data and/or 360-degree video related metadata before the encoded 360-degree video data and/or 360-degree video related metadata are delivered to the transmission processor. Such data may be stored in a file format such as ISOBMFF. Although the data storage unit may not be required when 360-degree video is transmitted in real time, encapsulated 360 data may be stored in the data storage unit for a certain period of time and then transmitted when the encapsulated 360 data is delivered over a broadband.

According to another embodiment of the 360-degree video transmission apparatus according to the present disclosure, the 360-degree video transmission apparatus may further include a (transmission side) feedback processor and/or a network interface (not shown) as internal/external elements. The network interface can receive feedback information from a 360-degree video reception apparatus according to the present disclosure and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360-degree video data processing.

According to another embodiment of the 360-degree video transmission apparatus according to the present disclosure, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360-degree video data on a spherical surface before projection. Information about region rotation, that is, rotation directions, angles and the like may be signaled through 360-degree video related metadata.

According to another embodiment of the 360-degree video transmission apparatus according to the present disclosure, the data encoder may perform encoding differently for respective regions. The data encoder may encode a specific region in high quality and encode other regions in low quality. The transmission side feedback processor may forward feedback information received from the 360-degree video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360-degree video transmission apparatus according to the present disclosure, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360-degree video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360-degree video transmission apparatus according to the present disclosure may be hardware elements. According to an embodiment, the internal/external elements may be changed, omitted, replaced by other elements or integrated.

FIG. 6 is a view schematically illustrating a configuration of a 360-degree video reception apparatus to which the present disclosure is applicable.

The 360-degree video reception apparatus according to the present disclosure can perform operations related to the above-described processing process and/or the rendering process. The 360-degree video reception apparatus may include a receiver, a reception processor, a decapsulation processor, a data decoder, a metadata parser, a (reception side) feedback processor, a re-projection processor and/or a renderer as internal/external elements. A signaling parser may be called the metadata parser.

The receiver can receive 360-degree video data transmitted from the 360-degree video transmission apparatus according to the present disclosure. The receiver may receive the 360-degree video data through a broadcast network or a broadband depending on a channel through which the 360-degree video data is transmitted.

The reception processor can perform processing according to a transmission protocol on the received 360-degree video data. The reception processor may perform a reverse process of the process of the aforementioned transmission processor such that the reverse process corresponds to processing for transmission performed at the transmission side. The reception processor can forward the acquired 360-degree video data to the decapsulation processor and forward acquired 360-degree video related metadata to the metadata parser. The 360-degree video related metadata acquired by the reception processor may have the form of a signaling table.

The decapsulation processor can decapsulate the 360-degree video data in a file format received from the reception processor. The decapsulation processor can acquired 360-degree video data and 360-degree video related metadata by decapsulating files in ISOBMFF or the like. The decapsulation processor can forward the acquired 360-degree video data to the data decoder and forward the acquired 360-degree video related metadata to the metadata parser. The 360-degree video related metadata acquired by the decapsulation processor may have the form of a box or a track in a file format. The decapsulation processor may receive metadata necessary for decapsulation from the metadata parser as necessary.

The data decoder can decode the 360-degree video data. The data decoder may receive metadata necessary for decoding from the metadata parser. The 360-degree video related metadata acquired in the data decoding process may be forwarded to the metadata parser.

The metadata parser can parse/decode the 360-degree video related metadata. The metadata parser can forward acquired metadata to the data decapsulation processor, the data decoder, the re-projection processor and/or the renderer.

The re-projection processor can perform re-projection on the decoded 360-degree video data. The re-projection processor can re-project the 360-degree video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360-degree video data corresponding to a specific area of the 3D space on the 3D space using metadata necessary for re-projection.

The renderer can render the re-projected 360-degree video data. As described above, re-projection of 360-degree video data on a 3D space may be represented as rendering of 360-degree video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360-degree video through a VR—display or the like. The VR display is a device which reproduces 360-degree video and may be included in a 360-degree video reception apparatus (tethered) or connected to the 360-degree video reception apparatus as a separate device (un-tethered).

According to an embodiment of the 360-degree video reception apparatus according to the present disclosure, the 360-degree video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360-degree video transmission apparatus.

As described above, the feedback information may be consumed at the reception side as well as being transmitted to the transmission side. The reception side feedback processor may forward the acquired feedback information to internal elements of the 360-degree video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360-degree video reception apparatus according to the present disclosure may be hardware elements. According to an embodiment, the internal/external elements may be changed, omitted, replaced by other elements or integrated. According to an embodiment, additional elements may be added to the 360-degree video reception apparatus.

Another aspect of the present disclosure may pertain to a method for transmitting a 360-degree video and a method for receiving a 360-degree video. The methods for transmitting/receiving a 360-degree video according to the present disclosure may be performed by the above-described 360-degree video transmission/reception apparatuses or embodiments thereof.

Embodiments of the above-described 360-degree video transmission/reception apparatuses and transmission/reception methods and embodiments of the internal/external elements of the apparatuses may be combined. For example, embodiments of the projection processor and embodiments of the data encoder may be combined to generate as many embodiments of the 360-degree video transmission apparatus as the number of cases. Embodiments combined in this manner are also included in the scope of the present disclosure.

Figure 7A:
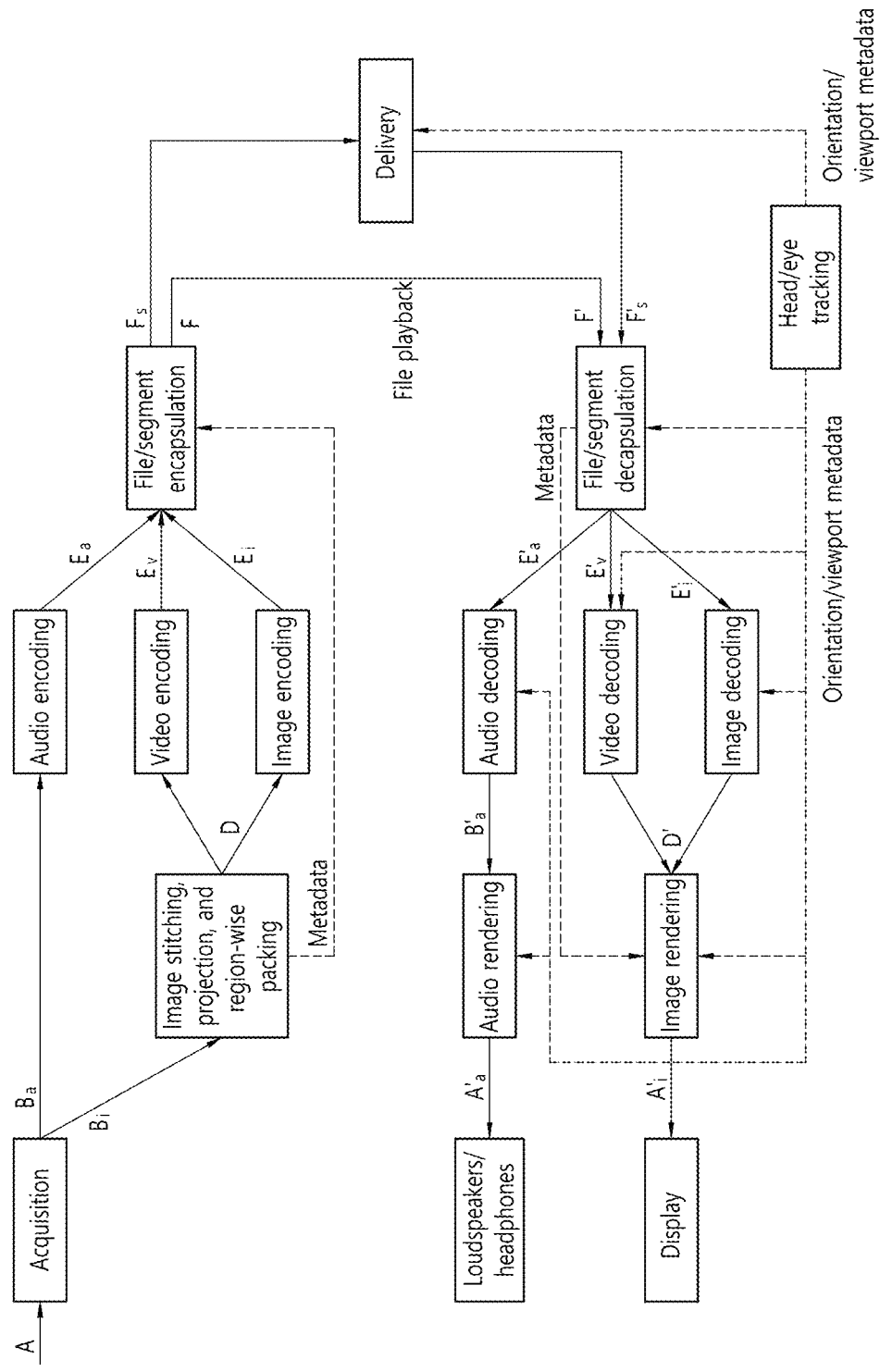
FIGS. 7A to 7B illustrate an entire architecture for providing a 360-degree video performed through a 360-degree video transmitting apparatus/360-degree video receiving apparatus.
Figure 7B:
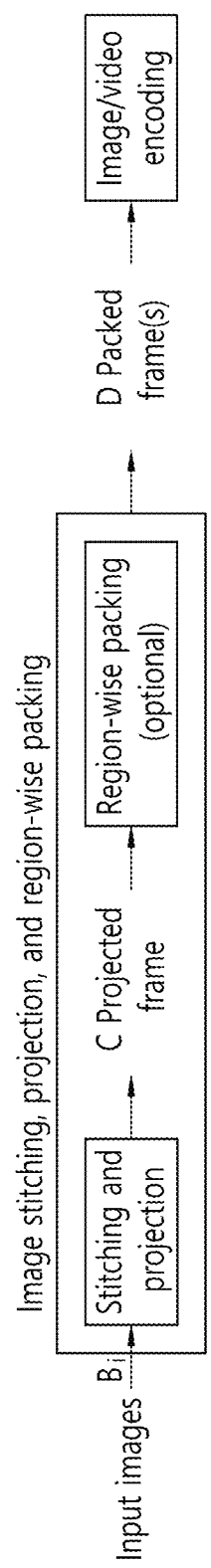

FIGS. 7A to 7B illustrate an entire architecture for providing a 360-degree video performed through a 360-degree video transmitting apparatus/360-degree video receiving apparatus.

A 360 content may be provided by an architecture illustrated in FIGS. 7A and 7B. The 360 content may be provided in the form of a file or in the form of a segment-based download or streaming service such as a DASH. Here, the 360 content may be referred to as a VR content.

Specifically, referring to FIG. 7A, as described above, 360-degree video data and/or 360 audio data may be acquired. Further, the 360 audio data may undergo an audio preprocessing process or an audio encoding process. In this process, audio related metadata may be generated, and the encoded audio and audio related metadata may be processed for transmission (file/segment encapsulation).

The 360-degree video data may undergo the above-described process. Referring to FIG. 7A, a stitcher of the 360-degree video transmitting apparatus may perform stitching in the 360-degree video data (Visual stitching). This process may be omitted in some embodiments and be performed at the reception side.

Further, referring to FIG. 7A, a projection processor of the 360-degree video transmitting apparatus may project 360-degree video data onto a 2D image (projection and mapping (packing)). The projection processor may receive 360-degree video data (input Images), and in this case, the projection processor may perform stitching and projection processes. In the projection process, specifically, it may be regarded that the stitched 360-degree video data is projected onto the 3D space, and the projected 360-degree video data is arranged on the 2D image. In the present specification, this process may be expressed as projecting 360-degree video data onto a 2D image. Here, the 3D space may be a sphere or a cube. This 3D space may be the same as a 3D space used for re-projection at the reception side.

The 2D image may be referred to as a projected frame or a projected picture. Further, a region-wise packing process may be selectively performed in the 2D image. When the region-wise packing process is performed, by indicating a position, form, and size of each region, regions on the 2D image may be mapped onto a packed frame. The packed frame may be referred to as a packed picture. When the region-wise packing process is not performed in the projected frame, the projected frame may be the same as the packed frame. The region will be described later. The projection process and the region-wise packing process may be expressed as each region of 360-degree video data is projected onto a 2D image. According to the design, 360-degree video data may be converted directly to a packed frame without an intermediate process.

Referring to FIG. 7A, a packed frame relating to 360-degree video data may be image encoded or video encoded. Even in the same 360-degree video content, there may be 360-degree video data for each viewpoint, and in this case, 360-degree video data for each viewpoint of the content may be encoded into different bit streams. The encoded 360-degree video data may be processed in a file format such as ISOBMFF by the above-described encapsulation processor. Alternatively, the encapsulation processor may process the encoded 360-degree video data into segments. Segments may be included in an individual track for transmission based on DASH.

In conjunction with processing of 360-degree video data, 360-degree video related metadata may be generated, as described above. The metadata may be included and delivered in video stream or a file format. The metadata may be used for a process such as an encoding process, file format encapsulation, and processing for transmission.

The 360 audio/video data may be processed for transmission according to a transmission protocol and then transmitted. The above-described 360-degree video receiving apparatus may receive the 360 audio/video data through a broadcast network or a broadband.

As illustrated in FIG. 7A, loudspeakers/headphones, a display, and a head/eye tracking component may be performed by a VR application or an external device of the 360-degree video receiving apparatus, but according to an embodiment, the 360-degree video receiving apparatus may include all of the loudspeakers/headphones, the display, and the head/eye tracking component. According to an embodiment, the head/eye tracking component may correspond to the above-described reception side feedback processor.

The 360-degree video receiving apparatus may perform file/segment decapsulation for reception of 360 audio/video data. The 360 audio data may be provided to a user through loudspeakers/headphones through audio decoding and audio rendering processes.

The 360-degree video data may be provided to the user through the display via image decoding, video decoding, and rendering processes. Here, the display may be a display supporting VR or a general display.

As described above, the rendering process may specifically be regarded as 360-degree video data is re-projected onto the 3D space, and the re-projected 360-degree video data is rendered. This may be expressed as 360-degree video data is rendered on the 3D space.

The head/eye tracking component may acquire and process head orientation information, gaze information, viewport information, and the like of the user. The related contents may be as described above.

At the reception side, there may be a VR application that communicates with the above-described receiving process.

Further, FIG. 7B illustrates a 2D image to which a region-wise packet process according to a projection scheme and a processing process of 360-degree video is applied. Referring to FIG. 7B, a process of input 360-degree video data may be described. Specifically, referring to FIG. 7B, 360-degree video data of the input viewpoint may be stitched and projected onto a 3D projection structure according to various projection schemes, and 360-degree video data projected onto the 3D projection structure may be represented with a 2D image. That is, the 360-degree video data may be stitched and projected into the 2D image.

The 2D image projected onto the 360-degree video data may be referred to as a projected frame. Further, in the projected frame, the above-described region-wise packing process may be performed. That is, a process of dividing an area including the projected 360-degree video data on the projected frame into regions, rotating and rearranging each region, changing a resolution of each region, and the like may be performed. In other words, the region-wise packing process may represent a process of mapping the projected frame to one or more packed frames. The region-wise packing process may be optional, and when the region-wise packing process is not applied, the packed frame and the projected frame may be the same. When the region-wise packing process is applied, each region of the projected frame may be mapped to a region of the packed frame, and metadata representing a position, a shape, and a size of the region of the packed frame mapped to each region of the projected frame may be derived.

Figure 8:
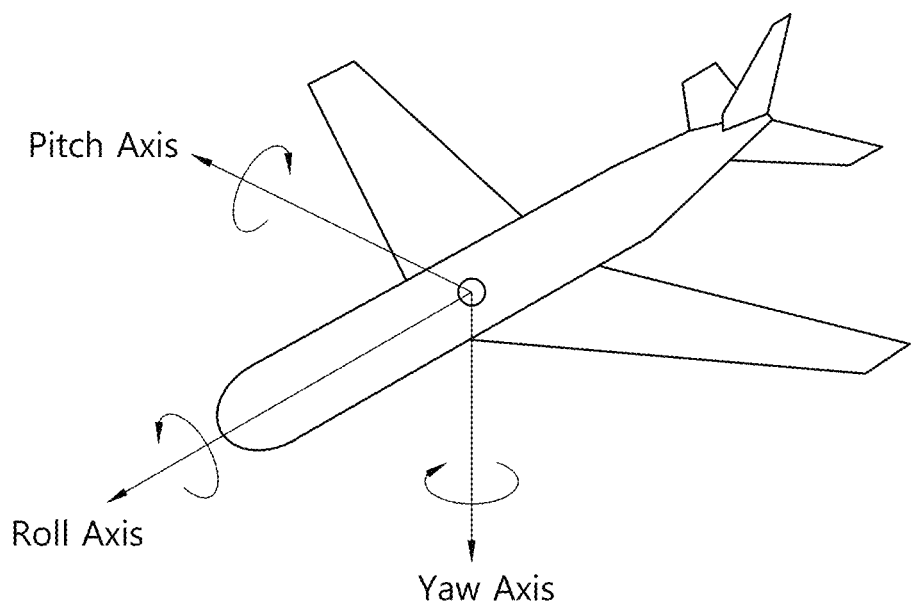
FIG. 8 is a diagram illustrating the concept of aircraft principal axes for explaining a 3D space of the present disclosure.

FIG. 8 is a diagram illustrating the concept of aircraft principal axes for describing a 3D space of the present disclosure. In the present disclosure, the aircraft principal axis concept may be used for representing a specific point, position, direction, gap, area, etc. in a 3D space. That is, in the present disclosure, the aircraft principal axis concept may be used for describing the 3D space before the projection or after the re-projection and performing signaling on the 3D space. According to an embodiment, a method using an X, Y, Z axis concept or a spherical coordinate system may be used.

The aircraft may rotate freely in three dimensions. The three-dimensional axes are referred to as a pitch axis, a yaw axis, and a roll axis, respectively. In the present specification, the three-dimensional axes may be represented with a pitch, a yaw, and a roll or a pitch direction, a yaw direction, and a roll direction.

The pitch axis may mean a reference axis of a direction in which a nose of the aircraft rotates up and down. In the illustrated aircraft principal axis concept, the pitch axis may mean an axis connected from a wing to the wing of the aircraft.

The yaw axis may mean a reference axis of a direction in which a front nose of the aircraft rotates left and right. In the illustrated aircraft principal axis concept, the yaw axis may mean an axis connected from top to bottom of the aircraft. The roll axis is an axis connected from a front nose to a tail of the aircraft in the illustrated aircraft principal axis concept, and a rotation in the roll direction may mean a rotation based on the roll axis. As described above, a 3D space in the present disclosure may be described through the concept of pitch, yaw, and roll.

Figure 9B:
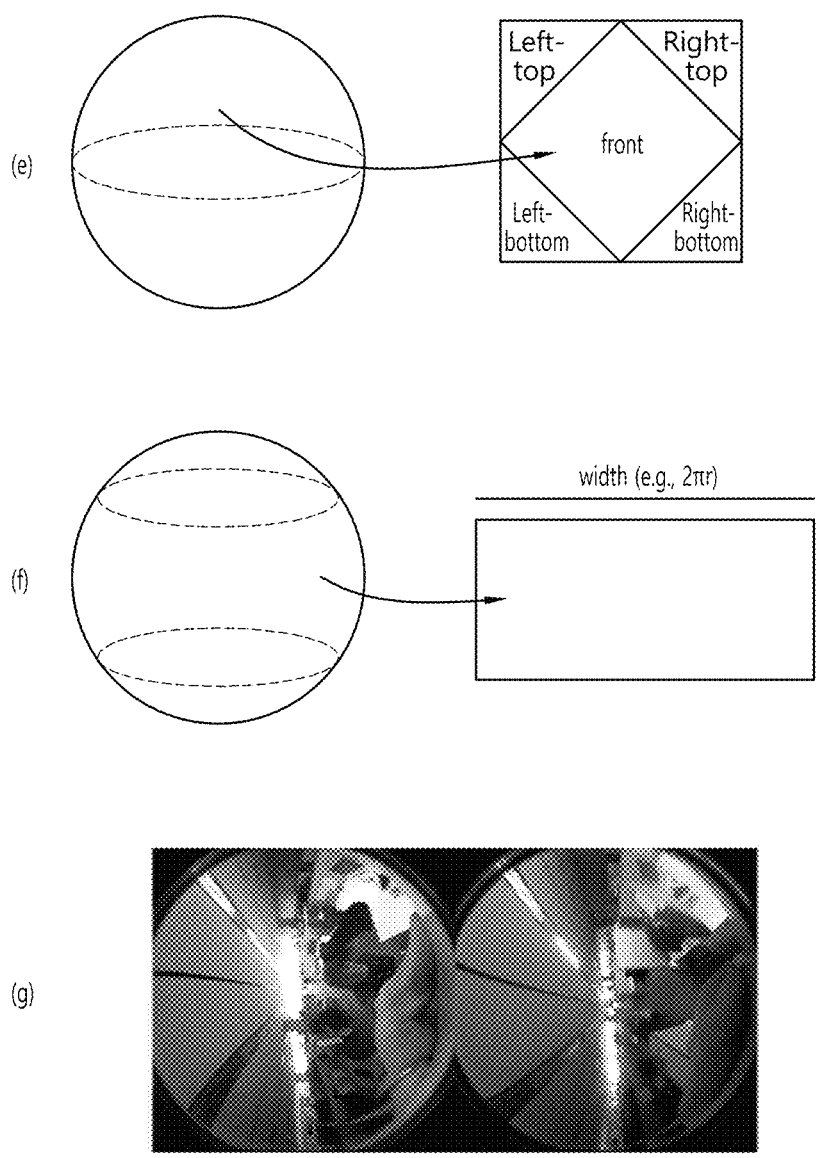

FIGS. 9A and 9B illustrate projection schemes according to the present disclosure. As described above, the projection processor of the 360-degree video transmitting apparatus according to the present disclosure may project stitched 360-degree video data onto a 2D image. In this process, various projection schemes may be applied. That is, the projection processor may project 360-degree video data onto a 2D image according to various projection schemes. The 2D image may be referred to as a projected picture.

According to an embodiment of the present disclosure, a projection may be performed using an equirectangular projection scheme. The projection processor may perform a projection of 360-degree video data using an equirectangular projection scheme. FIG. 9A(a) may represent an equirectangular projection scheme. The equirectangular projection scheme may be referred to as an Equirectangular Projection (ERP). When the equirectangular projection scheme is applied, $(r, \theta_0, 0)$ on a spherical surface, i.e., a point of $\theta=\theta_0$ and $\varphi=0$ may be mapped to a center pixel of the 2D image. Further, it may be assumed that a principal point of a front camera is a point $(r, 0, 0)$ of a spherical surface. Further, it may be fixed that $\varphi o=0$. Therefore, a value $(x, y)$ converted to an XY coordinate system may be converted to $(X, Y)$ pixels on the 2D image through Equation 1.

$$X=K_x{}^*x+X_O=K_x{}^*(\theta-\theta_0)^*r+X_O$$

$$Y=-K_y{}^*y-Y_O \qquad \text{[Equation 1]}$$

Further, when an upper left end pixel of the 2D image is positioned at (0,0) of the XY coordinate system, an offset value with respect to the x-axis and an offset value with respect to the y-axis may be represented through Equation 2.

$$X_O=K_x{}^*\pi{}^*r$$

$$Y_O=-K_y{}^*\pi/2^*r \qquad \text{[Equation 2]}$$

Using Equation 2, a conversion equation to the XY coordinate system illustrated in Equation 1 may be rewritten as follows.

$$X=K_x x+X_O=K_x{}^*(\pi+\theta-\theta_0)^*r$$

$$Y=-K_y y-Y_O=K_y{}^*(\pi/2-\varphi^*r \qquad \text{[Equation 3]}$$

For example, when $\theta_0=0$, i.e., a central pixel of the 2D image points indicates data of $\theta=0$ on a spherical surface, the spherical surface may be mapped to a region in which a width=$2K_x\pi r$ and a height=$K_x\pi r$ on the 2D image based on (0,0). Data in which $\varphi=\pi/2$ on a spherical surface may be mapped to the entire upper side on the 2D image. Further, data $(r, \pi/2, 0)$ on the spherical surface may be mapped to a point $(3\pi K_x r/2, \pi K_x r/2)$ on the 2D image.

At the reception side, 360-degree video data on the 2D image may be re-projected onto the spherical surface. Specifically, the re-projection processor of the 360-degree video receiving apparatus may re-project 360-degree video data on the 2D image onto a spherical surface. The 2D image may be referred to as a projected picture. Equation 3 may be the same as Equation 4 by a conversion equation.

$$\theta=\theta_0 X/K_x{}^*r-\pi$$

$$\varphi=\pi/2-Y/K_y{}^*r \qquad \text{[Equation 4]}$$

For example, a pixel having an XY coordinate value of $(K_x\pi r, 0)$ on a 2D image may be re-projected to a point of $\theta=\theta_0$ and $\varphi=\pi/2$ on a spherical surface.

According to another embodiment of the present disclosure, a projection may be performed using a cubic projection scheme. The projection processor may perform a projection of 360-degree video data using a cubic projection scheme. The cubic projection scheme may be referred to as a cube map projection (CMP). FIG. 9A(b) may represent a cubic projection scheme. For example, stitched 360-degree video data may be represented on a spherical surface. The projection processor may divide the 360-degree video data into a cube form and project the 360-degree video data onto a 2D image. 360-degree video data on a spherical surface may correspond to each surface of the cube and may be projected onto a 2D image, as illustrated in (b) left or (b) right of FIG. 9A.

According to another embodiment of the present disclosure, a projection may be performed using a cylindrical projection scheme. The projection processor may perform a projection of 360-degree video data using a cylindrical projection scheme. FIG. 9A(c) may represent a cylindrical projection scheme. When it is assumed that the stitched 360-degree video data may be represented on a spherical surface, the projection processor may divide the 360-degree video data into a cylinder form to project the 360-degree video data on a 2D image. 360-degree video data on a spherical surface may correspond to the side, top, and bottom of the cylinder, respectively to be projected onto the 2D image, as illustrated in (c) left or (c) right of FIG. 9A.

According to another embodiment of the present disclosure, a projection may be performed using a tile-based projection scheme. The projection processor may perform a projection of 360-degree video data using a tile-based projection scheme. FIG. 9A(d) may represent a tile-based projection scheme. When a tile-based projection scheme is used, the above-described projection processor may divide 360-degree video data on a spherical surface into one or more detail regions to project the 360-degree video data onto a 2D image, as illustrated in FIG. 9A(d). The detail region may be referred to as a tile.

According to another embodiment of the present disclosure, a projection may be performed using a pyramid projection scheme. The projection processor may perform a projection of 360-degree video data using a pyramid projection scheme. FIG. 9B(e) may represent a pyramid projection scheme. When it is assumed that the stitched 360-degree video data may be represented on a spherical surface, the projection processor may regard the 360-degree video data in a pyramid form and divide each surface to project the 360-degree video data on a 2D image. The 360-degree video data on the spherical surface may correspond to a front, left top, left bottom, right top, and right bottom, respectively, of four directions of the pyramid to be projected onto the 2D image, as illustrated in the (e) left or the (e) right of FIG. 9B(e). Here, the bottom surface may be an area including data acquired by a camera viewing the front.

According to another embodiment of the present disclosure, a projection may be performed using a panoramic projection scheme. The projection processor may perform a projection of 360-degree video data using the panoramic projection scheme. FIG. 9B(f) may represent a panoramic projection scheme. When the panoramic projection scheme is used, the above-described projection processor may project only a side surface of the 360-degree video data on the spherical surface onto the 2D image, as illustrated in FIG. 9B(f). This may be the same as the case where there is no top and bottom in the cylindrical projection scheme.

According to another embodiment according to the present disclosure, a projection may be performed without stitching. FIG. 9B(g) may represent a case where a projection is performed without stitching. When a projecting is performed without stitching, the above-described projection processor may project 360-degree video data onto a 2D image as it is, as illustrated in FIG. 9B(g). In this case, stitching may not be performed, and each image acquired by the camera may be projected onto the 2D image as it is.

Referring to FIG. 9B(g), two images may be projected onto the 2D image without stitching. Each image may be a fish-eye image acquired through each sensor in a spherical camera. As described above, image data acquired by camera sensors at the reception side may be stitched, and by mapping the stitched image data onto a spherical surface, a spherical video, i.e., a 360-degree video may be rendered.

Figure 10A:
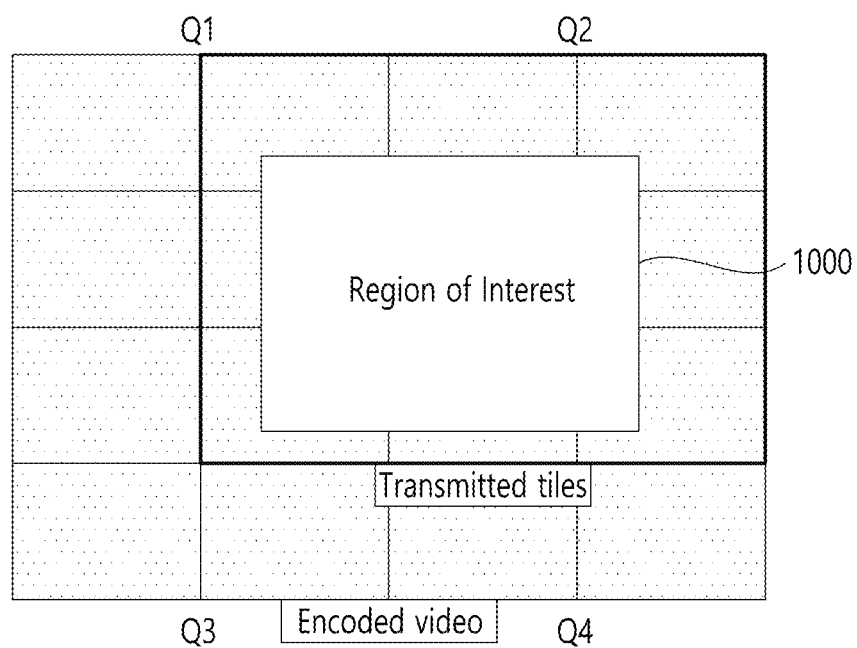
FIGS. 10A and 10B illustrate a tile according to an embodiment of the present disclosure.
Figure 10B:
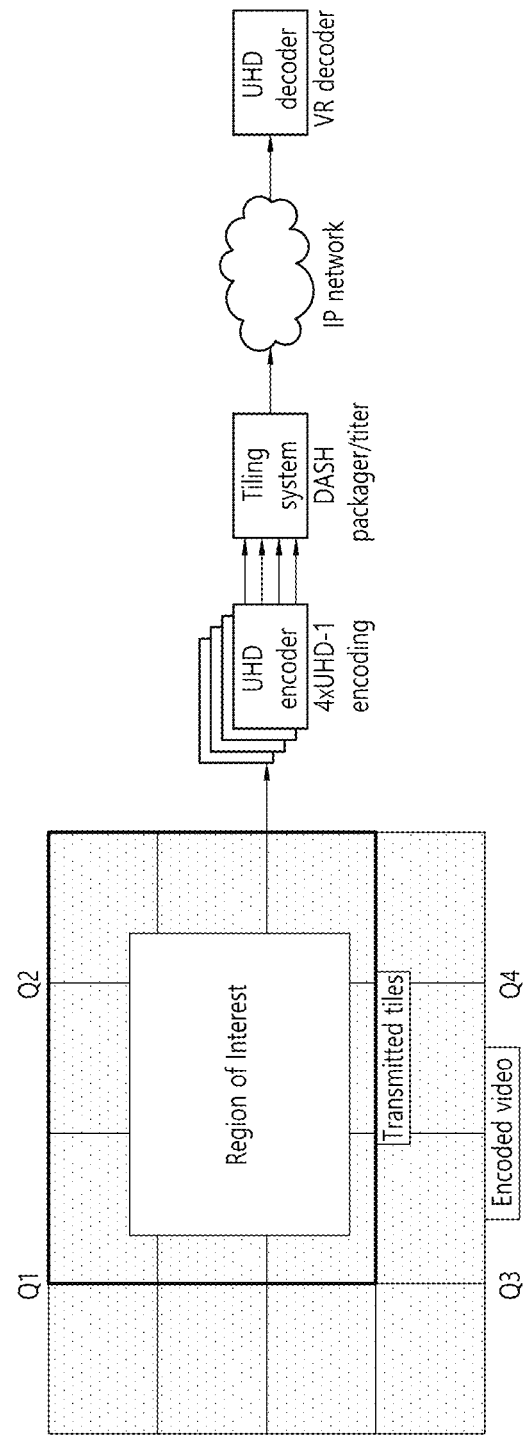

FIGS. 10A and 10B illustrate a tile according to an embodiment of the present disclosure. 360-degree video data projected onto a 2D image or 360-degree video data in which region-wise packing is performed may be divided into one or more tiles. That is, 360-degree video data of a projected picture or 360-degree video data of a packed picture may be divided into one or more tiles. FIG. 10A may represent one 2D image divided into 16 tiles. Here, the 2D image may represent the projected picture or the packed picture. According to another embodiment of a 360-degree video transmitting apparatus of the present disclosure, a data encoder of the 360-degree video transmitting apparatus may independently encode each tile.

The region-wise packing and tiling may be distinguished. The above-described region-wise packing may mean to divide and process a 360-degree video data projected onto a 2D image into regions in order to increase coding efficiency or to adjust a resolution. Tiling may mean that the data encoder divides a projected picture or a packed picture into sections called tiles, and independently encodes the corresponding tiles. When 360-degree video is provided, the user may not consume all parts of the 360-degree video at the same time, and tiling may enable to send or consume only tiles corresponding to an important portion or a predetermined portion such as a viewport in which the user currently views on a limited bandwidth to the reception side. That is, a limited bandwidth may be used more efficiently through tiling, and the reception side may reduce a computational load as compared to processing all 360-degree video data at once.

Because regions and tiles are distinguished, it is unnecessary that two regions are the same. However, in some embodiments, regions and tiles may refer to the same area. According to an embodiment, region-wise packing may be performed according to tiles and thus regions and tiles may be the same. Further, according to an embodiment, when each surface and region according to the projection scheme are the same, each surface, region, and tile according to the projection scheme may refer to the same region. According to the context, the region may be referred to as a VR region, and the tile may be referred to as a tile region.

A region of interest (ROI) may mean a region of interest of users, which are suggested by a 360 content provider. When producing a 360-degree video, the 360 content provider may predict that the user may be interest in any specific area and produce a 360-degree video in consideration of this. According to an embodiment, the ROI may correspond to a region in which an important content is reproduced on the content of the 360-degree video.

According to another embodiment of a 360-degree video transmission/receiving apparatus of the present disclosure, a reception side feedback processor may extract and collect viewport information and deliver the viewport information to the transmission side feedback processor. In this process, viewport information may be delivered using both side network interfaces. FIG. 10A illustrates a viewport 1000 in a 2D image. Here, as illustrated in FIG. 10A, the viewport 1000 may span nine tiles on the 2D image.

In this case, the 360-degree video transmitting apparatus may further include a tiling system. According to an embodiment, the tiling system may be located after a data encoder. FIG. 10B may represent a tiling system located after the data encoder. Alternatively, the tiling system may be included in the above-described data encoder or transmission processor or may be included in the 360-degree video transmitting apparatus as a separate internal/external element.

Referring to FIG. 10B, the tiling system may receive viewport information from a feedback processor of the transmission side. The tiling system may select and transmit only tiles including the viewport region. For example, in a 2D image illustrated in FIG. 10A, only nine tiles including a viewport region 1000 among total 16 tiles may be transmitted. Here, the tiling system may transmit tiles in a unicast manner through a broadband. This is because a viewport region is different according to a user.

Further, in this case, the transmission side feedback processor may deliver viewport information to the data encoder. The data encoder may perform encoding on tiles including a viewport region with a higher quality than other tiles.

Further, in this case, the transmission side feedback processor may deliver viewport information to a metadata processor. The metadata processor may deliver metadata related to the viewport region to each internal element of the 360-degree video transmitting apparatus or may include metadata related to the viewport region in the 360-degree video related metadata.

Through such a tiling scheme, a transmission bandwidth can be saved and by performing differential processing of each tile, efficient data processing/transmission can be performed.

Embodiments related to the above-described viewport region may be applied in a similar manner to other specific areas other than the viewport region. For example, through the above-described gaze analysis, in a region determined to be mainly interested by users, an ROI region, a region (initial viewpoint) first reproduced when the user encounters a 360-degree video through a VR display, and the like, the same processes as the above-described viewport region may be performed.

Further, according to another embodiment of the 360-degree video transmitting apparatus of the present disclosure, the transmission processor may perform processing for transmission differently for each tile. The transmission processor may apply different transmission parameters (modulation order, code rate, etc.) for each tile to vary robustness of data delivered for each tile.

In this case, the transmission side feedback processor may deliver feedback information received from the 360-degree video receiving apparatus to the transmission processor to enable the transmission processor to perform a differential transmission process for each tile. For example, the transmission side feedback processor may deliver viewport information received from the reception side to the transmission processor. The transmission processor may perform transmission processing on tiles including the corresponding viewport region to have higher robustness than other tiles.

FIG. 11 illustrates an example of 360-degree video related metadata according to an embodiment of the present disclosure. As described above, the 360-degree video related metadata may include various metadata of a 360-degree video. According to the context, 360-degree video related metadata may be referred to as 360-degree video related signaling information. The 360-degree video related metadata may be included and transmitted in a separate signaling table, may be included and transmitted in a DASH MPD, or may be included and delivered in a box form in a file format such as ISOBMFF. When the 360-degree video related metadata is included in the box form, files, fragments, tracks, sample entries, samples, and the like may be included in various levels to include metadata of data of corresponding levels.

According to an embodiment, some of metadata to be described later may be configured and delivered with a signaling table, and the remaining metadata may be included in a box or track form within the file format.

According to an embodiment of 360-degree video related metadata of the present disclosure, the 360-degree video related metadata may include a basic metadata related to a projection scheme, stereoscopic related metadata, initial view (Initial view/Initial viewpoint) related metadata, ROI related metadata, Field of View (FOV) related metadata, and/or cropped region related metadata. According to an embodiment, the 360-degree video related metadata may further include additional metadata in addition to the above metadata.

Embodiments of 360-degree video related metadata according to the present disclosure may be a form including at least one of the above-described basic metadata, stereoscopic related metadata, initial view related metadata, ROI related metadata, FOV related metadata, cropped region related metadata, and/or metadata that may be added later. Embodiments of 360-degree video related metadata according to the present disclosure may be variously configured according to the number of cases of detailed metadata included in each case. According to an embodiment, the 360-degree video related metadata may further include additional information in addition to the above metadata.

The basic metadata may include 3D model related information and projection scheme related information. The basic metadata may include a vr_geometry field, a projection scheme field, and the like. In some embodiments, the basic metadata may further include additional information.

The vr_geometry field may represent a type of a 3D model supported by the corresponding 360-degree video data. As described above, when the 360-degree video data is re-projected on a 3D space, the corresponding 3D space may be represented with a type according to a 3D model indicated by the vr_geometry field. According to an embodiment, a 3D model used upon rendering may be different from a 3D model used for re-projection indicated by the vr_geometry field. In this case, the basic metadata may further include a field indicating a 3D model used when rendering. When the corresponding field has a value of 0, 1, 2, and 3, the 3D space may be derived as a 3D model of a sphere, a cube, a cylinder, and a pyramid, respectively. When the corresponding field has the remaining values, the field may be reserved for future use. According to an embodiment, the 360-degree video related metadata may further include detailed information about a 3D model indicated by the corresponding field. Here, the detailed information about the 3D model may mean, for example, radius information of a sphere and height information of a cylinder. This field may be omitted.

The projection_scheme field may represent a projection scheme used when the corresponding 360-degree video data is projected onto the 2D image. For example, when the projection_scheme field has a value of 0, 1, 2, 3, 4, and 5, the projection_scheme field may represent an equirectangular projection scheme, a cubic projection scheme, a cylindrical projection scheme, a tile-based projection scheme, a pyramid projection scheme, and a panoramic projection scheme, respectively. When the corresponding field has a value of 6, the corresponding field may represent a projection scheme in which 360-degree video data is directly projected onto a 2D image without stitching. When the corresponding field has the remaining values, the field may be reserved for future use.

According to an embodiment, the 360-degree video related metadata may further include detailed information about a region generated by the projection scheme specified by the corresponding field. Here, the detailed information about the region may mean, for example, whether the region is rotated or radius information of a top region of the cylinder. Metadata about detailed information about a region generated by the projection scheme may be referred to as a projection_scheme field related metadata. The projection_scheme field related metadata may provide detailed information about each of the indicated projection schemes (equirectangular projection scheme, cubic projection scheme, cylindrical projection scheme, pyramid projection scheme, panoramic projection scheme, and projection without stitching).

The stereoscopic related metadata may include information about 3D related attributes of 360-degree video data. The stereoscopic related metadata may include an is_stereoscopic field and/or a stereo_mode field. According to an embodiment, the stereoscopic related metadata may further include additional information.

The is_stereoscopic field may represent whether the corresponding 360-degree video data supports 3D. If the corresponding field is 1, the is_stereoscopic field may mean support of 3D, and if the corresponding field is 0, the is_stereoscopic field may mean non-support of 3D. This field may be omitted.

The stereo_mode field may represent a 3D layout supported by the corresponding 360-degree video. Only this field may represent whether the corresponding 360-degree video supports 3D, and in this case, the above-described is_stereoscopic field may be omitted. If this field value is 0, the corresponding 360-degree video may be in a mono mode. That is, the projected 2D image may include only one mono view. In this case, the 360-degree video may not support 3D.

If the field value is 1 or 2, the corresponding 360-degree video may follow a left-right layout and a top-bottom layout, respectively. The left-right layout and the top-bottom layout may be referred to as a side-by-side format and a top-bottom format, respectively. In the case of the left-right layout, 2D images in which the left image and the right image are projected may be positioned at the left and the right, respectively, on an image frame. In the case of the top-bottom layout, 2D images in which the left image and the right image are projected may be positioned at top and bottom, respectively on the image frame. If the corresponding field has the remaining value, the field may be reserved for future use.

The initial view related metadata may include information about a viewpoint (initial view) viewed when the user first reproduces a 360-degree video. The initial view related metadata may include an initial_view_yaw_degree field, an initial_view_pitch_degree field, and/or an initial_view_roll_degree field. According to an embodiment, the initial view related metadata may further include additional information.

The initial_view_yaw_degree field, the initial_view_pitch_degree field, and the initial_view_roll_degree field may represent an initial view when reproducing the corresponding 360-degree video. That is, a center point of a viewport first viewed upon reproducing may be represented by these three fields. Specifically, the initial_view_yaw_degree field may represent a yaw value of the initial view. That is, the initial_view_yaw_degree field may represent a position of a center point with a direction (sign) and a degree (angle) thereof rotated based on the yaw axis. Further, the initial_view_pitch_degree field may represent a pitch value of the initial view. That is, the initial_view_pitch_degree field may represent a position of the center point with a direction (sign) and a degree (angle) thereof rotated based on a pitch axis. Further, the initial_view_roll_degree field may represent a roll value of the initial view. That is, the initial_view_roll_degree field may represent a position of the center point with a direction (sign) and a degree (angle) thereof rotated based on the roll axis. The initial_view_yaw_degree field, the initial_view_pitch_degree field, and the initial_view_roll_degree field may represent an initial view when reproducing a corresponding 360-degree video, i.e., a center point of a viewport first viewed when reproducing the video and thus a specific region of the 360-degree video may be displayed and provided to the user at an initial view. Further, the width and height of the initial viewport may be determined based on the initial view indicated through the field of view (FOV). That is, by using these three fields and the FOV information, the 360-degree video receiving apparatus may provide a predetermined region of the 360-degree video as an initial viewport to a user.

According to an embodiment, an initial view indicated by the initial view related metadata may be changed for each scene. That is, a scene of the 360-degree video is changed according to the temporal flow of a 360 content, and an initial view or an initial viewport in which the user first views may be changed for each scene of the 360-degree video. In this case, the initial view related metadata may indicate an initial view of each scene. To this end, the initial view related metadata may further include a scene identifier for identifying a scene to which the initial view is applied. Further, because a field of view (FOV) may change for each scene of the 360-degree video, the initial view related metadata may further include FOV information for each scene representing FOV corresponding to the scene.

The ROI related metadata may include information related to the above-described ROI. The ROI related metadata may include a 2d_roi_range_flag field and/or a 3d_roi_range_flag field. The 2d_roi_range_flag field may represent whether the ROI related metadata includes fields representing ROI based on a 2D image, and the 3d_roi_range_flag field may represent whether ROI related metadata includes fields representing ROI based on a 3D space. According to an embodiment, the ROI related metadata may further include additional information such as differential encoding information according to ROI and differential transmission processing information according to ROI.

When ROI related metadata includes fields representing ROI based on a 2D image, the ROI related metadata may include a min_top_left_x field, a max_top_left_x field, a min_top_left_y field, a max_top_left_y field, a min_width field, a max_width field, a min_height field, a max_height field, a min_x Field, a max_x field, a min_y field, and/or a max_y field.

The min_top_left_x field, the max_top_left_x field, the min_top_left_y field, and the max_top_left_y field may represent a minimum/maximum value of coordinates of the upper left end of the ROI. That is, the fields may sequentially represent a minimum x coordinate, a maximum x coordinate, a minimum y coordinate, and a maximum y coordinate of the upper left end.

The min_width field, the max_width field, the min_height field, and the max_height field may represent minimum/maximum values of a width and a height of ROI. That is, the fields may sequentially represent a minimum value of a horizontal size, a maximum value of a horizontal size, a minimum value of a vertical size, and a maximum value of a vertical size.

The min_x field, the max_x field, the min_y field, and the max_y field may represent a minimum/maximum value of coordinates in the ROI. That is, the fields may sequentially represent a minimum x coordinate, a maximum x coordinate, a minimum y coordinate, and a maximum y coordinate of coordinates in the ROI. These fields may be omitted.

When the ROI related metadata includes fields representing ROI based on coordinates on a 3D rendering space, the ROI related metadata may include a min_yaw field, a max_yaw field, a min_pitch field, a max_pitch field, a min roll field, a max_roll field, a min_field_of_view field, and/or a max_field_of_view field.

The min_yaw field, the max_yaw field, the min_pitch field, the max_pitch field, the min_roll field, and the max_roll field may represent an area occupied by the ROI on a 3D space with a minimum/maximum value of yaw, pitch, and roll. That is, the fields may sequentially represent a minimum value of a rotation amount based on a yaw axis, a maximum value of a rotation amount based on a yaw axis, a minimum value of a rotation amount based on a pitch axis, a maximum value of a rotation amount based on a pitch axis, a minimum value of a rotation amount based on a roll axis, and a maximum value of a rotation amount based on a roll axis.

The min_field_of_view field and the max_field_of_view field may represent a minimum/maximum value of a field of view (FOV) of the corresponding 360-degree video data. The FOV may mean a field of view displayed at one time when the 360-degree video is reproduced. The min_field_of_view field and the max_field_of_view field may represent a minimum value and a maximum value of the FOV, respectively. These fields may be omitted. These fields may be included in FOV related metadata to be described later.

The FOV related metadata may include information related to the above-described FOV. The FOV related metadata may include a content_fov_flag field and/or a content_fov field. According to an embodiment, the FOV related metadata may further include additional information such as the minimum/maximum value related information of the above-described FOV.

The content_fov_flag field may represent whether there is information about the intended FOV when producing the corresponding 360-degree video. When this field value is 1, there may be a content_fov field.

The content_fov field may represent information about the intended FOV when producing the corresponding 360-degree video. According to an embodiment, a region displayed at one time to a user among 360 images may be determined according to a vertical or horizontal FOV of the corresponding 360-degree video receiving apparatus. Alternatively, according to an embodiment, a region of the 360-degree video displayed at one time to the user may be determined by reflecting FOV information of the field.

The cropped region related metadata may include information about a region including actual 360-degree video data on an image frame. The image frame may include an active video area projected with 360-degree video data and an area that is not projected with 360-degree video data. In this case, the active video area may be referred to as a cropped region or a default display region. The active video area is an area illustrated as 360-degree video on an actual VR display, and the 360-degree video receiving apparatus or the VR display may process/display only an active video area. For example, when an aspect ratio of an image frame is 4:3, only a region except for a portion of an upper part and a portion of a lower part of the image frame may include 360-degree video data, which is referred to as an active video area.

The cropped region related metadata may include an is cropped region field, a cr_region_left_top_x field, a cr_region_left_top_y field, a cr_region_width field, and/or a cr_region_height field. According to an embodiment, the cropped region related metadata may further include additional information.

The is_cropped_region field may be a flag representing whether an entire region of the image frame is used by the 360-degree video receiving apparatus or the VR display. Here, an area to which the 360-degree video data is mapped or an area displayed on the VR display may be referred to as an active video area. The is_cropped_region field may represent whether an entire image frame is an active video area. When only a part of the image frame is an active video area, the following four fields may be further added.

The cr_region_left_top_x field, the cr_region_left_top_y field, the cr_region_width field, and the cr_region_height field may represent an active video area on an image frame. These fields may represent an x coordinate of the upper left end of the active video area, a y coordinate of the upper left end of the active video area, a width of the active video area, and a height of the active video area, respectively. The width and height may be represented in units of a pixel.

In order to provide an immersive media/realistic media experience to the user, the present disclosure proposes a method of providing 6-degrees of Freedom (DoF) contents in addition to a method of providing the 360-degree contents.

Figure 12:
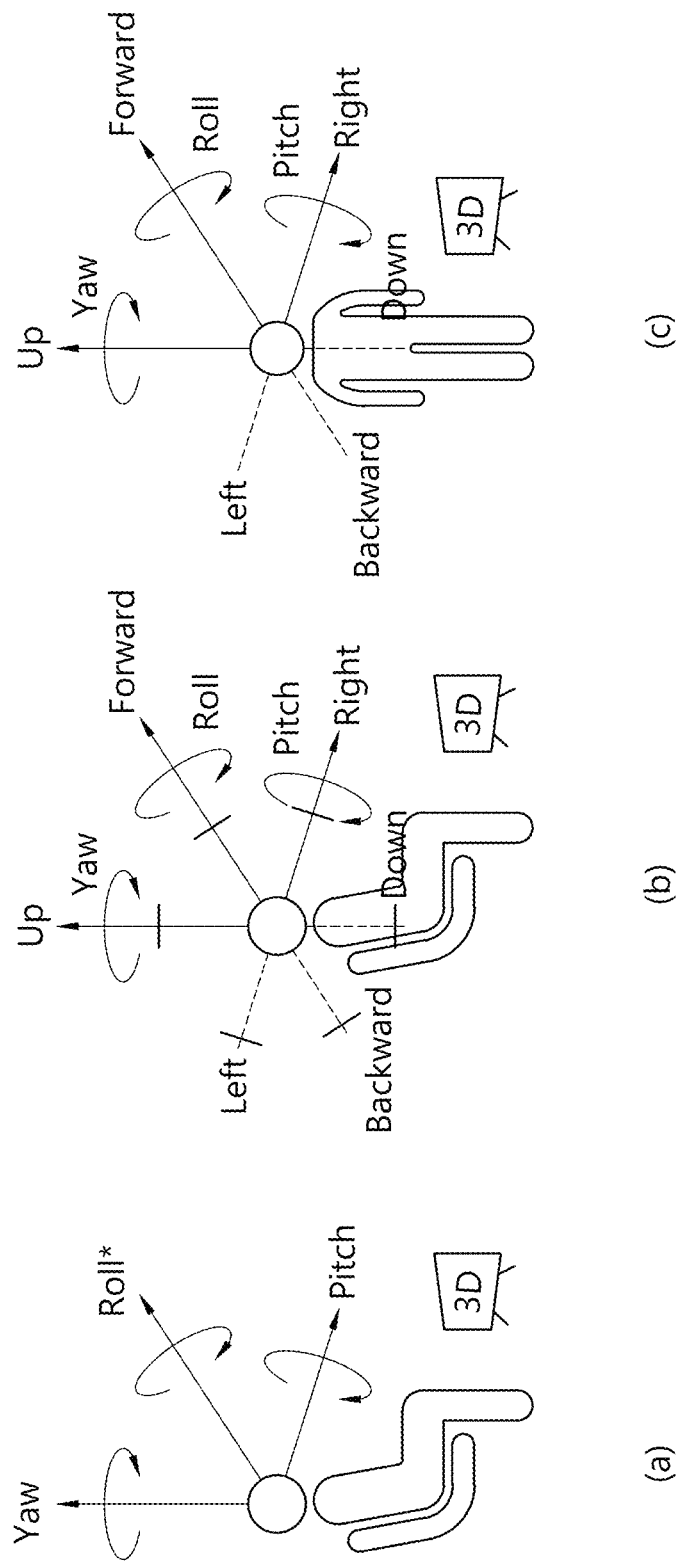
FIG. 12 illustrates the 360-degree content and the 6DoF content.

FIG. 12 illustrates the 360-degree content and the 6DoF content.

The immersive media/realistic media may represent an extended concept in a virtual environment provided by the 360 content. FIG. 12A illustrates an example of the 360 content. As illustrated in FIG. 12A, when the 360-degree content is provided, a user position may be fixed and only the concept of a rotation may be provided. FIGS. 12B and 12C illustrate an example of a 6DoF content. Referring to FIGS. 12(b) and 12(b), the immersive media/realistic media may mean an environment or contents that that may provide various sensory experiences such as movement/rotation of a user in a virtual space by giving a concept of a movement to the user while the user experiences a content.

The realistic media content may include a 6DoF video and 6DoF audio for providing the corresponding content, and the 6DoF video may mean a video or an image captured or reproduced as a newly formed 3DoF or 360-degree video at every movement required to provide a realistic media content. Here, the realistic media content may be represented as a 6DoF content. Further, the 6DoF content may mean a video or an image represented on a three-dimensional space. When a movement is fixed within the content, the corresponding content may be represented in various forms of three-dimensional space, as in the existing 360-degree video. For example, the corresponding content may be represented on a spherical surface. When a movement is free within the content, a three-dimensional space may be newly formed every time around the user on a movement path, and the user may experience a content of a corresponding position. For example, when the user experiences an image represented on a spherical surface at a position in which the user first views, and when the actual user moves in a three-dimensional space, an image of a new spherical surface may be formed about the moved position and thus the corresponding content may be consumed. Similarly, 6DoF audio is an audio content for providing a content that enables the user to experience realistic media, and may mean a content for newly forming and consuming spatial audio as a consumption position of a sound moves.

The present disclosure particularly proposes a method of effectively providing a 6DoF video. The 6DoF video may be captured by two or more cameras at different positions. The captured video may be sent through a series of processes, and the reception side may process and render some of the received data into a 360 video starting from the user's initial position, and when the user position is moved, by processing and rendering a new 360-degree video centered on the moved position, the 6DoF video may be provided to the user.

Figure 13:
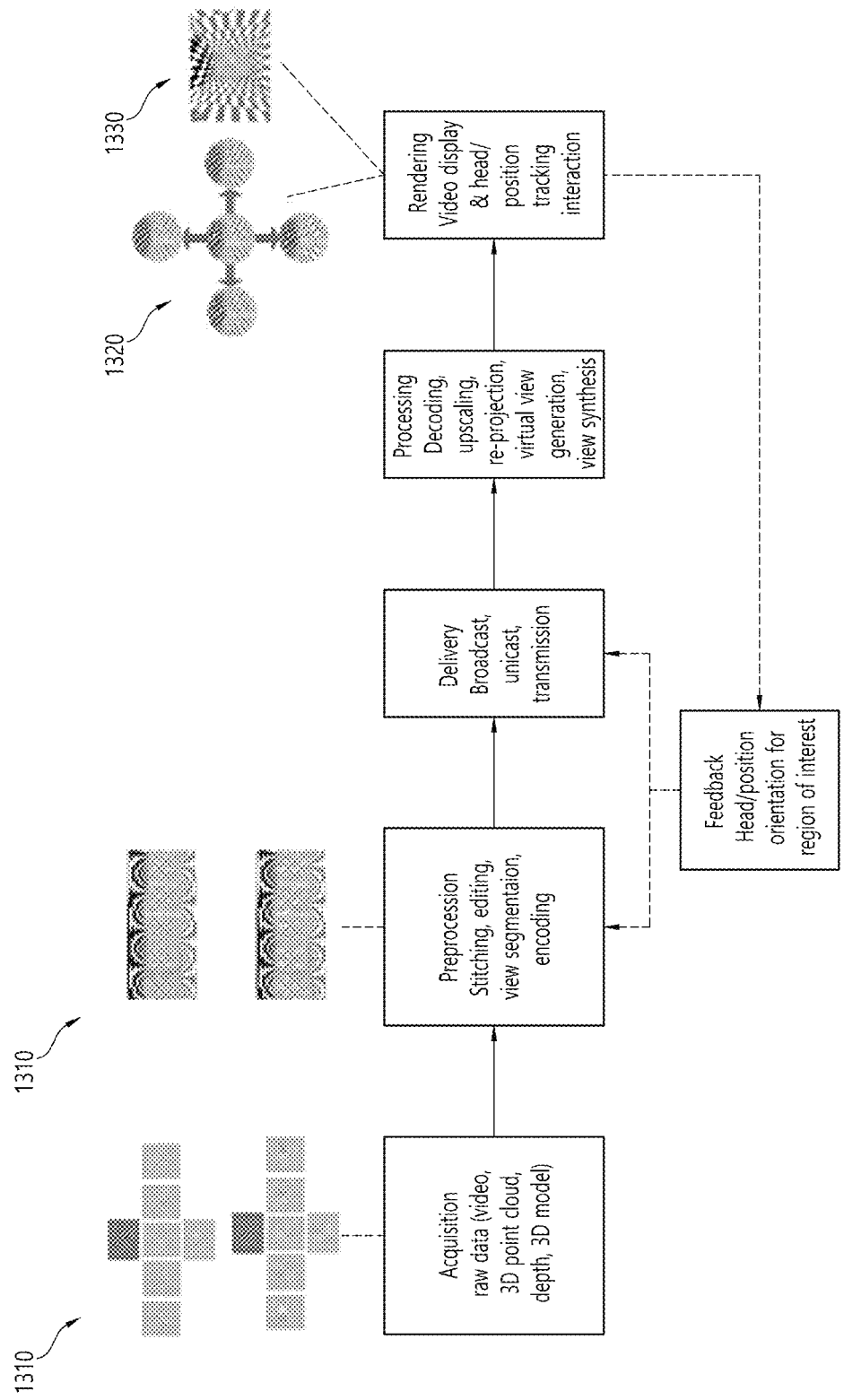
FIG. 13 is a diagram illustrating an entire architecture for providing a 6DoF video according to the present disclosure.

FIG. 13 is a diagram illustrating an entire architecture for providing a 6DoF video according to the present disclosure.

Referring to FIG. 13, 6DoF video data and/or 6DoF audio data may be acquired. Specifically, a high density camera array (HDCA), a lenslet (microlens) camera, or the like may be used for capturing the 6DoF content, and 6DoF video data and/or 6DoF audio data may be acquired through a new device designed for capturing a 6DoF video. Image/video data sets generated according to a position of the captured camera may be generated in the plural, as in the acquired image 1310 illustrated in FIG. 13. In a capturing process of the 6DoF content, metadata representing an internal/external setting value of the camera may be generated. In the case of an image generated by a computer instead of the camera, the capturing process may be replaced. A pre-processing process of the acquired image 1310 may be a process of processing the captured image/video and metadata delivered in a capturing process. In order to improve a stitching process, a color correction process, a projection process, and coding efficiency, the pre-processing process may include all types of preprocessing steps for processing a content before transmission such as an encoding process and a view separation process of dividing into a primary view and a secondary view.

Specifically, the stitching process may be a process of generating an image/video connecting images captured in 360 directions at each camera position in a panorama or sphere shape centered on each camera position.

Thereafter, the stitched image/video may undergo a projection process. The projection process may mean a process of deriving the projected picture 1320 by projecting each stitched image into a 2D image. Here, the projection may be expressed as mapping to a 2D image. Images mapped at each camera position may be separated into a primary view and a secondary view, and different resolutions at each viewpoint may be applied to improve video coding efficiency, and by changing a disposition or a resolution of a mapping image even within the primary view, efficiency of coding can be increased. The secondary view may not be present according to a capture environment. The secondary view may mean an image/video to be reproduced in a moving process when the user moves from the primary view to another primary view, and have a lower resolution than that of the primary view, but may have the same resolution as necessary. Further, in some cases, the secondary view may be newly generated as virtual information at the receiver.

According to an embodiment, the preprocessing process may further include an editing process. In the preprocessing process, editing of image/video data before and after a projection may be further performed, and metadata may be generated. Further, in a pre-processing process, metadata on an initial view to be reproduced first when an image/video is provided, an initial position of a user, a region of interest (ROI), and the like may be generated.

The media delivery process illustrated in FIG. 13 may represent a process of processing and transmitting image/video data and metadata acquired in the preprocessing process. For transmission of the image/video data and the metadata, processing according to any transmission protocol may be performed, and preprocessed data may be delivered through a broadcast network and/or a broadband. Further, the preprocessed data may be delivered to the reception side with an on demand method.

The processing process may include a process of decoding the received image/video data and metadata, a re-projection process of mapping or projecting image/video data of the decoded projected picture into a three-dimensional (3D) model, and all processes before generating an image for reproducing an image/video such as a process of generating and synthesizing a virtual viewpoint. The mapped 3D model or projection map may have a sphere, cube, cylinder, or pyramid form, as in an existing 360-degree video. Alternatively, the 3D model or the projection map may have a modified form of a projection map of an existing 360-degree video, and in some cases, the 3D model or the projection map may be a free form projection map.

Here, a process of generating and synthesizing a virtual viewpoint may represent a process of generating and synthesizing image/video data to be reproduced when the user moves between the primary view and the secondary view or between the primary view and the primary view. In order to generate a virtual viewpoint, a process of processing a metadata delivered in capturing and preprocessing processes may be required, and in some cases, in a virtual viewpoint, only a part of a 360 image/video instead of the entire 360 image/video may be generated/composed.

According to an embodiment, the processing process may further include an editing process, an up-scaling process, a down-scaling process, and the like. In the editing process, an additional editing process required before reproduction after the processing process may be applied. If necessary, a work of up-scaling or down-scaling the received image/video may be performed.

The rendering process may represent a process of rendering to display a transmitted or generated and reprojected image/video. Sometimes, the rendering and reprojection processes are referred to as rendering. Therefore, a reprojection process may be included in the rendering process. The reprojection may have a plurality of projection results of the form in which a 360-degree video/image is formed in each of positions in which the user is moved in a moving direction of the user and a 360-degree video/image centered on the user in the form of 1330 of FIG. 13. The user may view a partial region of the 360-degree video/image according to a device to be displayed, and in this case, a region viewed by the user may be derived in a form of 1340 of FIG. 13. Further, when the user moves, the entire 360-degree video/image may not be rendered, but only an image corresponding to a viewing position of the user may be rendered. Further, the 6DoF video receiving apparatus may receive metadata about the user position and a movement direction to predict the user's movement in advance and to additionally render a video/image of a position to be moved (i.e., a position predicted to move).

The feedback process may represent a process of delivering various feedback information that may be acquired in the display process to the transmission side. Interactivity may occur between the 6DoF content and the user through a feedback process, and according to an embodiment, in a feedback process, information about the user's head and position orientation and a viewport currently viewed by the user may also be delivered. The corresponding information may be delivered to the transmission side or the service provider in a feedback process, and according to an embodiment, the feedback process may not be performed.

The position information of the user may mean information about a head position, an angle, a movement, and a moving distance of the user, and viewport information viewed by the user may be calculated based on the corresponding information.

Figure 14:
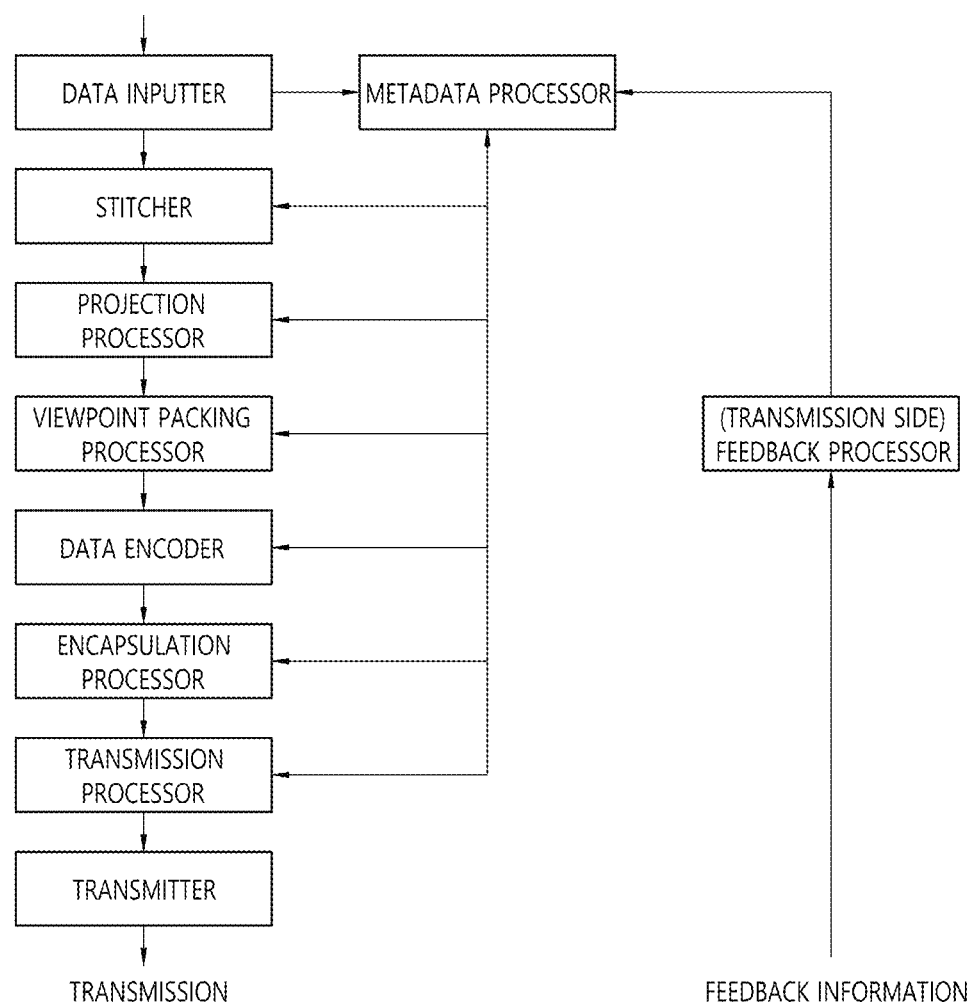
FIG. 14 is a diagram schematically illustrating a configuration of a 6DoF video transmitting apparatus to which the present disclosure can be applied.

FIG. 14 is a diagram schematically illustrating a configuration of a 6DoF video transmitting apparatus to which the present disclosure can be applied. The present disclosure at the transmission side may be related to a 6DoF video transmitting apparatus. The 6DoF video transmitting apparatus may perform the above-described preparation process and operations. Specifically, as illustrated in FIG. 14, the 6DoF video/image transmitting apparatus may include a data inputter, a stitcher, a projection processor, a viewpoint separation processor, a viewpoint packing processor, a metadata processor, a feedback processor, a data encoder, an encapsulation processor, a transmission processor, and/or a transmitter as internal/external components, and although not illustrated in FIG. 14, a depth information processor may be included as an internal/external component.

The data inputter may receive an input of image/video/depth information/audio data for each viewpoint captured by one or more cameras at one or more positions. Further, the data inputter may receive metadata generated in a capture process together with the video/image/depth information/audio data. The data inputter may deliver the input video/image data at each viewpoint to the stitcher, and deliver metadata generated in the capture process to the metadata processor.

The stitcher may perform stitching on captured images/videos at each viewpoint/position. The stitcher may deliver stitched 6DoF video data to the projection processor. If necessary, the stitcher may receive metadata of the 6DoF video data from the metadata processor and stitch the 6DoF video data based on the metadata. The stitcher may deliver metadata generated in the stitching process to the metadata processor. Further, the stitcher may change a video/image stitching position using a position value received from the depth information processor. The stitcher may deliver metadata generated in the stitching process to the metadata processor. The delivered metadata may include whether stitching is performed, a stitching type, an ID of a primary view and a secondary view, and position information of the corresponding viewpoint.

The projection processor may project the stitched 6DoF video data onto a 2D image frame. The projection processor may derive different forms of results according to a scheme, and a corresponding scheme may be similar to the existing projection scheme of 360-degree video, or a newly proposed scheme for 6DoF may be applied. Further, different schemes may be applied to each viewpoint. The depth information processor may deliver depth information to the projection processor to change the mapping result value. If necessary, the projection processor may receive metadata necessary for the projection from the metadata processor and use the metadata for projection of the 6DoF video data, and the projection processor may deliver metadata generated in the projection process to the metadata processor. The metadata may include a kind of scheme, whether projection is performed, an ID of a 2D frame after projection of a primary view and a secondary view, and position information for each viewpoint.

As described above, the viewpoint packing processor may divide views into a primary view and a secondary view, and perform a region-wise packing process in each viewpoint. That is, the viewpoint packing processor classifies the projected 6DoF video data for each viewpoint/position into a primary view and a secondary view, and in order to improve coding efficiency, the viewpoint packing processor may enable the primary view and the secondary view to have different resolutions or may enable each divided region to have different resolutions in each viewpoint by changing a rotation and rearrangement of data of each region by dividing video data of each viewpoint into a plurality of regions. A process of enabling the above-described primary view and secondary view having different resolutions may be referred to as a packing process of each viewpoint, and a process of enabling each region divided within each viewpoint to have different resolutions by changing a rotation and rearrangement of data of each region by dividing video data of each viewpoint into a plurality of regions may be referred to as a regional packing process. Alternatively, a packing process including the viewpoint packing and the region-wise packing may be referred to as a viewpoint packing process.

A process of classifying the primary view and the secondary view may be an optional process that may be omitted, and it may be selectively performed to enable each region within video data of each viewpoint to have different resolutions or different dispositions. When packing is performed by the viewpoint packing processor, region-wise packing may be performed using information received from the metadata processor, and metadata generated in the region-wise packing process may be delivered to the metadata processor. Metadata defined in the region-wise packing process may include information about an ID of each viewpoint for classifying a primary view and a secondary view, a size applied for each region within a viewpoint, a position value for each region of a rotation, and the like.

The stitcher, the projection processor, and/or the viewpoint packing processor may be performed in one or more hardware components or an ingest server in a streaming/download service according to an embodiment.

The metadata processor may process metadata that may occur in a capturing process, a stitching process, a projection process, a viewpoint packing process, an encoding process, an encapsulation process, and/or a process for transmission. The metadata processor may generate new metadata for a 6DoF video service using metadata received in each process. According to an embodiment, the metadata processor may generate newly generated metadata in the form of a signaling table. The metadata processor may deliver received metadata or metadata newly generated/processed by the metadata processor to other modules/units. For example, in order to transmit the generated or received metadata to the reception side, the metadata processor may deliver metadata to the data encoder, the encapsulation processor, and/or the transmission processor.

The data encoder may encode 6DoF video data and/or packed video data of each viewpoint/region projected onto a 2D image. Encoding may be performed in various formats, and when the video data is classified for each viewpoint, the encoding result value of each viewpoint may be separated and delivered to the reception side.

The encapsulation processor may encapsulate the encoded 6DoF video data and/or related metadata in the form of a file. Related metadata may be received from the above-described metadata processor. The encapsulation processor may encapsulate the data in a file format such as ISOBMFF or OMAF, or process the data in the form of a DASH segment, or may process the data in a new type file format. Metadata may be included in boxes existing at various levels in the file format or may be included as data within separate tracks, or only metadata may be encapsulated into a file. A separate encapsulation process may be performed for each viewpoint, or metadata required for each viewpoint and corresponding video information may be encapsulated together.

The transmission processor may perform additional processing for transmission to the encapsulated video data according to the format. The process may operate by using the metadata received from the metadata processor. The transmitter may transmit data and/or metadata received from the transmission processor through a broadcast network and/or broadband. The transmitter may include components necessary for transmission through a broadcast network and/or a broadband.

Although not illustrated in the drawing, the feedback processor (transmission side) may further include a network interface. The network interface may receive feedback information from a 6DoF video receiving apparatus to be described later, and deliver the received feedback information to a feedback processor (transmission side). The feedback processor may deliver information received from the reception side to the stitching, the projection, the viewpoint packing, the encoder, the encapsulation processor, and/or the transmission processor, and also deliver information received from the reception side to the metadata processor to enable the metadata processor to deliver the information to other elements, or enable the metadata processor to generate/process and deliver new metadata. Further, according to another embodiment of the present disclosure, the feedback processor may deliver the position/viewpoint information received from the network interface to the metadata processor, and by delivering the corresponding position/viewpoint information to the projection, the viewpoint packing processor, the encapsulation processor, and/or the data encoder, the metadata processor may transmit only information corresponding to the current user's viewpoint/position and peripheral information, thereby improving coding efficiency.

Components of the above-described 6DoF video transmitting apparatus may be hardware components implemented in hardware. According to an embodiment, each component may be changed or omitted, may add a new component, or may be replaced with another component.

Figure 15:
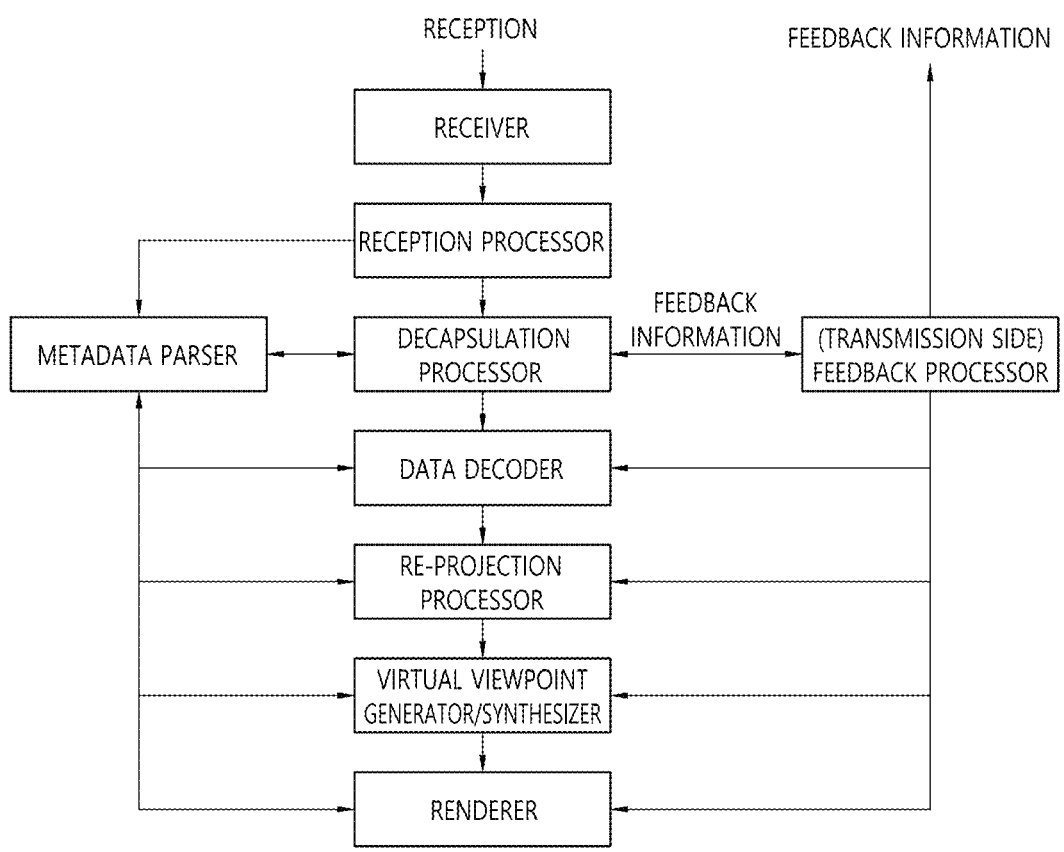
FIG. 15 is a diagram schematically illustrating a configuration of a 6DoF video receiving apparatus to which the present disclosure can be applied.

FIG. 15 is a diagram schematically illustrating a configuration of a 6DoF video receiving apparatus to which the present disclosure can be applied. The present disclosure at the reception side may be related to a 6DoF video receiving apparatus. The 6DoF video receiving apparatus may include a receiver, a reception processor, a decapsulation processor, a metadata parser, a feedback processor, a data decoder, a re-projection processor, a virtual viewpoint generator/synthesizer, and/or a renderer as components.

The receiver may receive 6DoF video data from the above-described 6DoF transmitting apparatus. According to a channel to which 6DoF video data is transmitted, the receiver may receive 6DoF video data through a broadcast network or a broadband.

The reception processor may perform processing according to a transmission protocol of the received 6DoF video data in the 6DoF video data. The reception processor may process the 6DoF video data in reverse order of the process performed by the transmission processor, or may acquire data acquired in the previous step of the transmission processor through a process according to a protocol processing method. The reception processor may deliver the acquired data to the decapsulation processor, and deliver metadata received from the receiver to the metadata parser.

The decapsulation processor may decapsulate 6DoF video data of a file form received from the reception processor. The decapsulation processor may decapsulate files according to a corresponding file format to acquire 6DoF video and/or metadata. The acquired 6DoF video data may be sent to the data decoder, and 6DoF metadata may be delivered to the metadata parser. The decapsulation processor may receive metadata necessary for decapsulation from the metadata parser as needed.

The data decoder may perform decoding of 6DoF video data. The data decoder may receive metadata required for decoding from the metadata parser. Metadata acquired in the data decoding process may be delivered to the metadata parser for processing.

The metadata parser may parse/decode 6DoF video related metadata. The metadata parser may deliver the acquired metadata to the decapsulation processor, the data decoder, the re-projection processor, the virtual viewpoint generator/synthesizer, and/or the renderer.

The re-projection processor may perform re-projection on the decoded 6DoF video data. The re-projection processor may re-project the 6DoF video data for each viewpoint/position into a three-dimensional space, respectively. The three-dimensional space may have different shapes according to the used three-dimensional model, or may be re-projected into a three-dimensional model of the same form through a transformation process. The re-projection processor may receive necessary metadata from the metadata parser. Metadata defined during the re-projection process may be delivered to the metadata parser. For example, a 3D model of 6DoF video data for each viewpoint/position may be received from the metadata parser. Further, when the 3D model of video data for each viewpoint/position is different, if video data of all viewpoints is re-projected into the same 3D model, the re-projection processor may deliver to the metadata parser which model was applied. In some cases, the re-projection processor may re-project only a specific area in the three-dimensional space using metadata required for re-projection, and re-project one or more specific areas.

The virtual viewpoint generator/synthesizer may generate video data in a virtual viewpoint area that is not included in the received 6DoF video data but that needs to be reproduced on the re-projected 3D space using the given 6DoF video data, and perform a process of synthesizing 6DoF video data at a new viewpoint/position based on the virtual viewpoint. Although not illustrated in the drawing, when generating video data of a new viewpoint, the virtual viewpoint generator/synthesizer may use data of the depth information processor. The virtual viewpoint generation/synthesizer may generate/synthesize only a part of a specific area received from the metadata parser and a peripheral virtual viewpoint area that is not received. Generation of 6DoF video data at a virtual viewpoint by the virtual viewpoint generation/synthesizer may be selectively performed, and may be performed when there is no video information corresponding to a required view and position.

The renderer may render the 6DoF video data delivered from the re-projection or virtual viewpoint generation/synthesizer. As described above, all processes occurring in the re-projection or the virtual viewpoint generation/synthesizer on the 3D space may be integrated with the renderer and thus the processes may be performed in the renderer. According to an embodiment, only a part on an expected path and a part viewed by the user may be rendered according to the user's view/position information.

Although not illustrated in the feedback processor (reception side) and/or drawings in the present disclosure, the network interface may be included as an additional component. The reception side feedback processor may acquire and process feedback information from a renderer, a virtual viewpoint generator/synthesizer, a re-projection processor, a data decoder, a decapsulation, and/or a VR display. The feedback information may include viewport information of the user, head and position orientation information, gaze information, gesture information, and the like. The network interface may receive feedback information from the feedback processor and transmit the feedback information to the transmitting apparatus. Alternatively, the feedback information may be consumed in each component of the 6DoF video receiving apparatus. For example, the decapsulation processor may receive position/viewpoint information of the user from the feedback processor, and when the position information of the user is included in the received 6DoF video, only the corresponding position information may be decapsulated, decoded, reprojected, and rendered. When there is no information about the corresponding position, all 6DoF videos located around the corresponding position may be decapsulated, decoded, re-projected, virtual viewpoint generated/composed, and rendered.

The components of the 6DoF video receiving apparatus may be hardware components implemented in hardware. Further, according to an embodiment, each component may be changed or omitted, may add a new component, or may be replaced with or integrated with another component.

Figure 16:
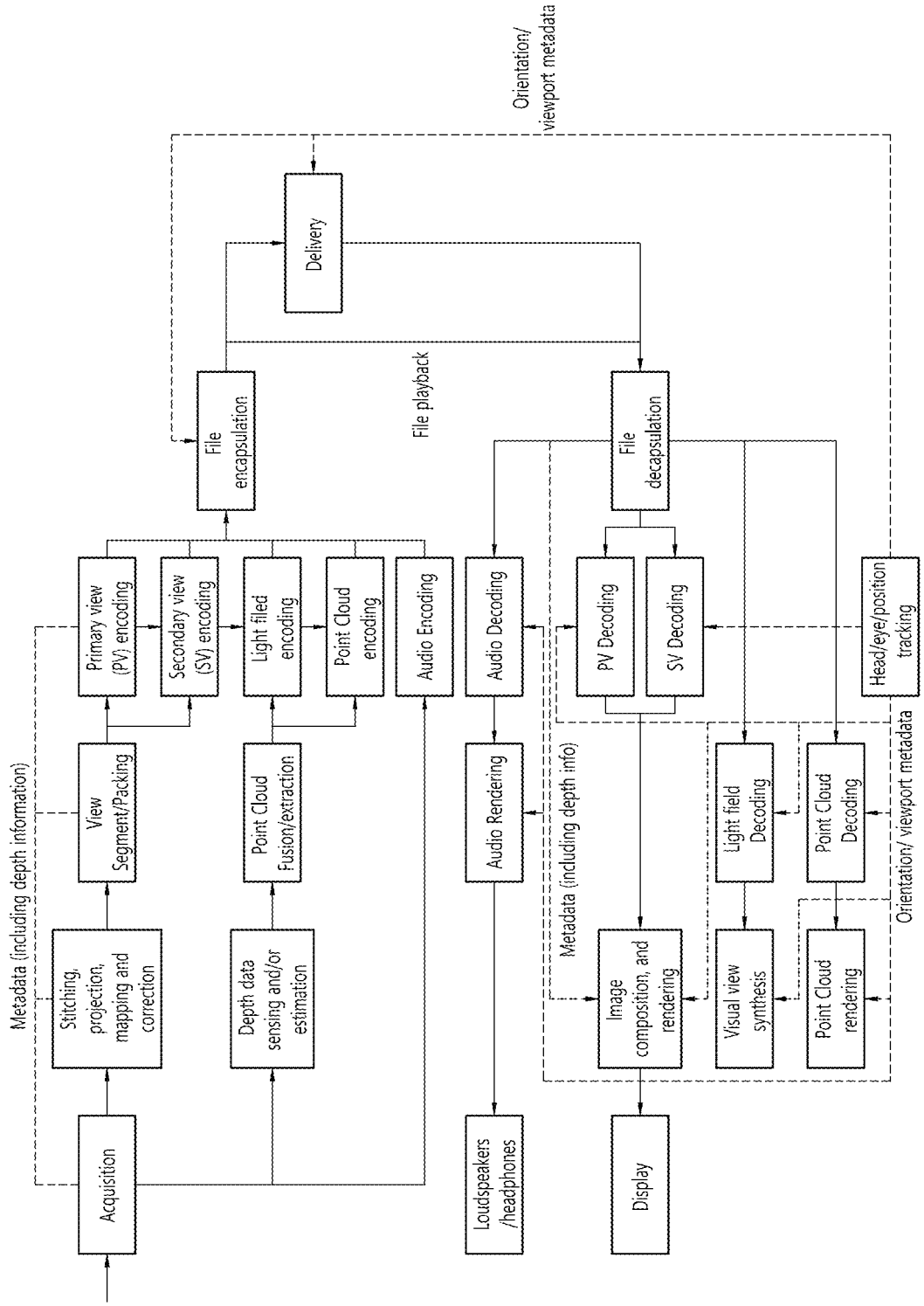
FIG. 16 illustrates an entire architecture for providing 6DoF contents performed through a 6DoF video transmitting apparatus/6DoF video receiving apparatus.

FIG. 16 illustrates an entire architecture for providing a 6DoF content performed through a 6DoF video transmitting apparatus/6DoF video receiving apparatus.

A 6DoF content may be provided by an architecture illustrated in FIG. 16. The 6DoF content may be provided in the form of a file, in the form of a segment-based download or streaming service such as DASH, or in the form of a new file format or a streaming/download service method. Here, the 6DoF content may be referred to as immersive media content, a light field content, or a point cloud content.

Each process for file providing and streaming/download service for the 6DoF content illustrated in FIG. 16 may be described in detail as follows.

Referring to FIG. 16, an acquisition process may be performed. The acquiring process may refer to a process of acquiring an output acquired after capturing from a camera for acquiring a multi view/stereo/depth image. That is, two or more video/image and audio data captured from a camera may be acquired through the acquisition process, and when there is a depth camera, a depth map in each scene may also be acquired.

Further, referring to FIG. 16, an audio encoding process may be performed. The audio encoding process may represent an audio preprocessing process and an encoding process of the acquired 6DoF audio data. Metadata may be generated in the audio encoding process, and related metadata may undergo an encapsulation/encoding process for transmission.

Further, referring to FIG. 16, stitching, projection, mapping, and correction processes may be performed. The stitching, projection, mapping, and correction processes may be as described above. As described above, the acquired 6DoF video data may be subjected to editing, stitching, and projection processes of the image acquired at various positions. According to an embodiment, only a part of the process may be performed, or the whole process may be omitted and performed at the receiver side.

Further, referring to FIG. 16, stitching, projection, mapping, and correction processes may be performed.

Further, referring to FIG. 16, a viewpoint separation/packing process may be performed. Specifically, as described above, the viewpoint separation/packing processor may separate and pack an image of a primary view and a primary view (PV) position required by the receiver side based on the stitched image. After images of the primary view are separated and packed, a preprocessing process of packing the remaining images into a secondary view, i.e., an image of the secondary view (SV) may be performed. In the process of packing, in order to increase coding efficiency, a size, resolution, etc. of an image for the primary view and an image for the secondary view may be adjusted. Further, an image within a viewpoint of the same personality, i.e., an image for the primary view or an image for the secondary view may have a resolution under different conditions of each region or may be rotated and redisposed according to the region.

Further, referring to FIG. 16, a depth sensing and/or estimation process may be performed. For example, when there is no depth camera, a process of extracting a depth map from two or more acquired images may be performed. The process may be referred to as a depth estimation process. Further, when there is a depth capture camera, a process for storing position information may be performed to determine how much the depth of each object included in the image is at the image acquisition position. The process may be referred to as a depth sensing process. That is, a depth value according to a position of each object in the image may be stored.

Further, referring to FIG. 16, a point cloud fusion/extraction process may be performed. The point cloud fusion/extension process may represent a process of transforming a previously acquired depth map into data in an encoding form. For example, a preprocessing process may be performed by transforming the depth map into a point cloud data type and allocating a position value of each object of an image in 3D, and a data type that may express 3D spatial information rather than the pointer cloud data type may be applied instead.

Further, referring to FIG. 16, a primary view (PV) encoding/secondary view (SV) encoding/light field/point cloud encoding process may be performed. When an image or a video is pre-packed for each viewpoint, image or video encoding for each viewpoint may be performed. Further, depth information and/or position information may be image encoded or video encoded for each viewpoint. Further, the same content at the same viewpoint may be encoded in different bit streams for each region. Various media formats such as HEVC-3D and OMAF++ and new codecs to be defined in MPEG-I may be applied.

Further, referring to FIG. 16, a file encapsulation process may be performed. The 6DoF video data encoded as described above may be processed in a file format such as ISOBMFF by the encapsulation processor. That is, the file encapsulation process may represent a process of converting encoded 6DoF video data into a file format such as ISOBMFF. The encoded 6DoF video data may be processed into segments.

Further, referring to FIG. 16, metadata of 6DoF video data may be generated in a process of processing the captured 6DoF video data as a file for storing or transmitting. The metadata may include depth information.

Specifically, metadata generated during the above-described 6DoF video data processing, for example, acquisition, stitching, projection, separation/packing for each viewpoint, encoding, and encapsulation processes, may be delivered to the metadata processor. Further, metadata generated by the metadata processor may be delivered to each process. Further, the metadata generated at the transmission side may be generated as one track or file and delivered to the reception side through an encapsulation process. The reception side may receive metadata stored as a separate file or a track in the file through a broadcast network or a broadband.

Further, referring to FIG. 16, a delivery process of files and/or segments of 6DoF video data may be performed. Files and/or segments may be included in separate tracks for transmission based on DASH or a new model with a similar function. In this case, MPEG DASH, MMT and/or a new standard may be applied for transmission.

Further, referring to FIG. 16, the 6DoF video receiving apparatus may perform a file decapsulation process of decapsulating a received file for receiving 6DoF video/audio data.

Further, the 6DoF video receiving apparatus may perform decoding and rendering of 6DoF audio data/decoding and rendering of 6DoF video data. Decoded and rendered 6DoF audio data may be provided to the user through loudspeakers and headphones.

Further, referring to FIG. 16, a primary view (PV) decoding/secondary view (SV) decoding/light field/point cloud decoding process may be performed. As a codec applied to decoding, a codec newly proposed for 6DoF in HEVC-3D, OMAF++, and MPEG may be applied. When decoding of 6DoF video data is performed, if the PV and the SV are separately packed, videos or images for each viewpoint may be each decoded or decoding of the video or image may be performed regardless of viewpoint classification. Further, decoding of a light field and a point cloud having position and depth information is performed first, and then feedback of a head, a position, and eye tracking is delivered first, and only an image or video of a peripheral viewpoint in which the user is positioned and derived from the feedback may be separated and decoded. As described above, head, position gaze, viewport information, etc. of the user may be acquired and processed through the head/position/eye tracking.

Further, when re-projecting the captured video/image data on the three-dimensional space, the 6DoF video receiving apparatus may set a position of the three-dimensional space, and perform a point cloud rendering process in which although a position of the three-dimensional space is not secured from the received video/image data, but of generating a 3D space of a virtual viewpoint, which is a position in which the user may move.

Further, as described above, when there is no 6DoF video data in a space in which the user is located, the 6DoF video receiving apparatus may perform a virtual viewpoint synthesis process of generating and synthesizing video data of a new viewpoint using 6DoF video data already secured around the user position/viewpoint. According to an embodiment, a virtual viewpoint generation and/or synthesis process may be omitted.

Further, the 6DoF video receiving apparatus may perform an image composition and rendering process. As described above, the process is a process of rendering an image centered on a user position, and the 6DoF video receiving apparatus may use 6DoF video data decoded according to the user position and gaze or may render video and images about the user generated by virtual viewpoint generation/synthesis.

The 6DoF space in which the 6DoF content is provided may be described as described later.

Figure 17:
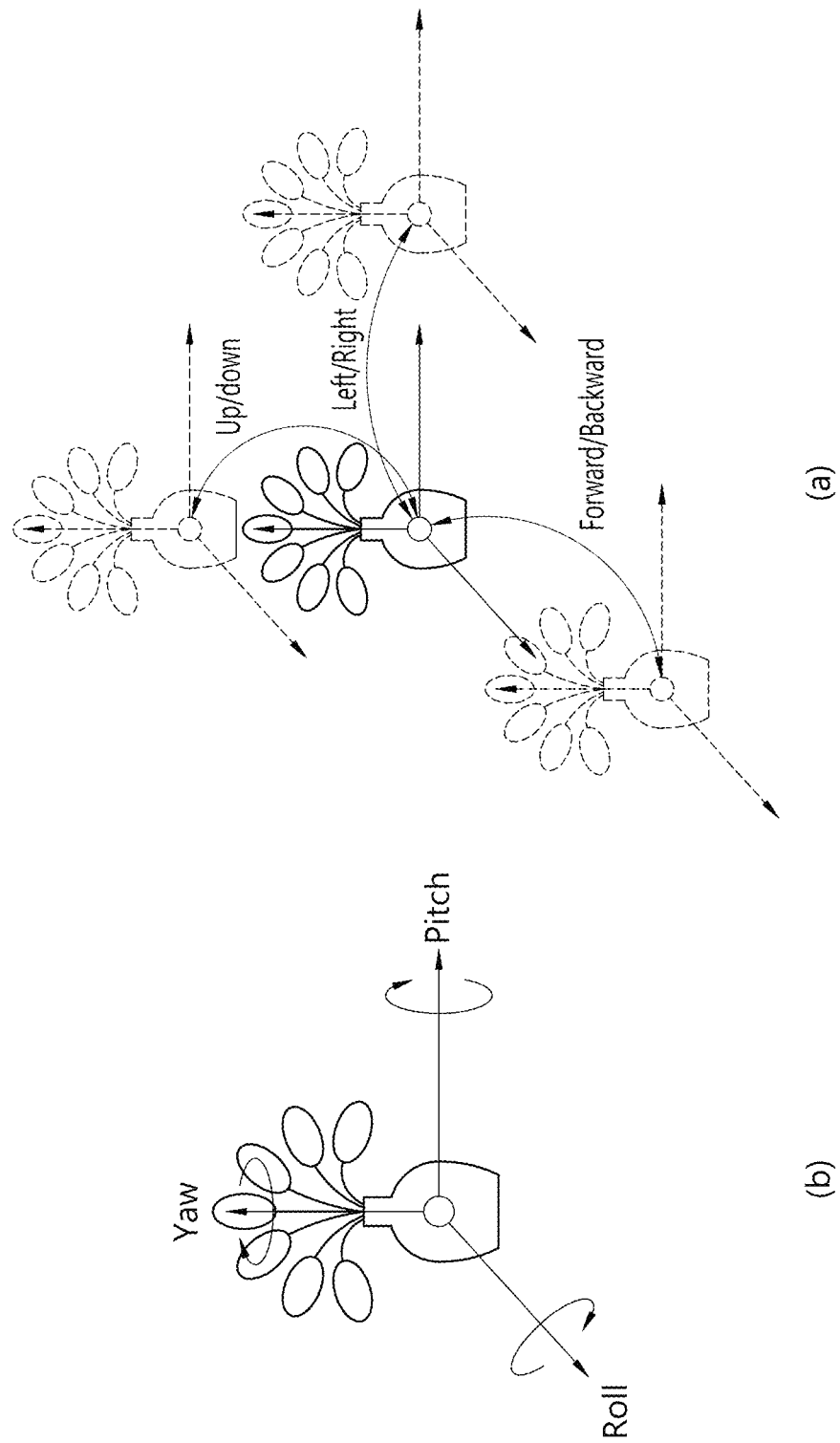
FIG. 17 is a diagram illustrating a 6DoF space of the present disclosure.

FIG. 17 is a diagram illustrating a 6DoF space of the present disclosure.

In the present disclosure, the 6DoF space before projection or after re-projection is described, and in order to perform signaling of information of the 6DoF space, the concept of the drawing as illustrated in FIG. 17 may be used.

Specifically, the 6DoF space may be described with a direction of a movement divided into two kinds of rational and translation unlike that a 360-degree video or a 3DoF space may be described as Yaw, Pitch, and Roll. Specifically, the rational movement may be described as yaw, pitch, and roll, as described in a direction of the existing 3DoF space, as illustrated in FIG. 17A, and the rational movement may be referred to as an orientation movement. However, the translation movement may be referred to as a position movement (of a user or a viewpoint), as illustrated in FIG. 17B. The translation movement may notify a direction in which the axis has moved among Left/Right, Forward/Backward, and Up/down directions and define a value of one or more axes to describe a movement of a central axis (i.e., a user or a viewpoint). For example, in order to represent a position and movement of the central axis, an x-axis, y-axis, and z-axis may be defined and a movement in left/right, forward/backward, and up/down directions with x, y, and z components representing a position of the central axis may be described.

Metadata generated in the above-described 6DoF video processing process may be delivered as follows.

For example, 6DoF video related metadata to be described later may include various metadata of the 6DoF video. The 6DoF video related metadata may be included and transmitted in a separate signaling table, be included and delivered in a HEVC SEI message, be included and transmitted in a DASH MPD, or be included and delivered in a box form in a file format such as ISOBMFF. When 6DoF video related metadata is included in a box form, the box may be included in various levels of files, fragments, tracks, sample entries, samples, and the like, and include metadata of data of corresponding levels. Further, when a new format for a 6DoF video file format, a media format, a compression format, etc. is proposed, metadata included in the box may correspond to metadata included in each format.

According to an embodiment of the 6DoF video related metadata of the present disclosure, the 6DoF video related metadata may include metadata about capture information that should be delivered when acquiring the captured video, metadata related to stitching or/and rendering including the projection scheme, user position related metadata, and viewport related metadata. Further, according to an embodiment, the 6DoF video related metadata may further include additional metadata in addition to the above metadata.

According to an embodiment of the present disclosure, when 6DoF video is stored based on ISO Base Media File Format (ISO BMFF), the present disclosure proposes a method of storing and signaling 6DoF video related metadata related to a 6DoF video track or sample. Metadata related to video tracks or samples for a 6DoF video within one file may be stored in a box form as follows.

TABLE 1

```
aligned(8) class SixDOFVideoConfigurationBox extends FillBox('sdvc', version=0, 0) {
unsigned                            int(8)    projection_scheme;
  unsigned                          int(1)    stitching_flag;
  signed                            int(8)    initial_view_yaw_degree;
  signed                            int(8)    initial_view_pitch_degree;
  signed                            int(8)    initial_view_roll_degree;
  signed                            int(8)    initial_center_FB_delta;
  signed                            int(8)    initial_center_UD_delta;
  signed                            int(8)    initial_center_RL_delta;
  unsigned                          int(6)    reserved = 0;
  unsigned                          int(1)    content_fov_flag;
  unsigned                          int(1)    capture_info_flag;
  unsigned                          int(1)    region_info_flag;
  if (stitching_flag == 1) {
        unsigned int(8)                              num_view_center;
        for (i = 1; i<= num_center;i++){
              signed int(16)                              position_center_X;
              signed int(16)                              position_center_Y;
              signed int(16)                              position_center_Z;
              unsigned int(8)                             num_camera;
              unsigned int(8)                       stitching_radius;
        }
  }
  if((projection_scheme =='0') ) {
        unsigned int(16)                       sphere_raidus;
  } else if(projection_scheme == '2') {              //cylindrical projection
        unsigned int(16)                       cylinder_radius;
        unsigned int(16)                       cylinder_height;
  } else if(projection_scheme == '3'){               //cubic projection
        unsigned int(16)                             cube_front_width;
        unsigned int(16)                             cube_front_height;
        unsigned int(16)                       cube_height;
  } else if(projection_scheme == '4'){               //panorama projection
        unsigned int(16)                             panorama_height;
  }
  if (content_fov_flag == 1)                   {
        unsigned int(16)                       content_fov;
  }
  if (camera_info_flag == 1)                   {
        string                                 Capture_type;
        unsigned int(8)                        num_view;
        unsigned int(8)                        Camera_capture_array_row;
        unsigned int(8)                        Camera_capture_array_col;
        unsigned int(8)                        Baseline_length;
        unsigned int(3)                        Master_camera_ID; // to be origin_view
        for (int i;=0; i< num_view; i++) {
              IntrinsicCameraParametersBox                    intrinsic_camera_params;
              ExtrinsicCameraParametersBox                    extrinsic_camera_params;
              signed int(8)                          camera_center_pitch;
                    signed int(8)                          camera_center_yaw;
                    signed int(8)                          camera_center_roll;
                    signed int(8)                          camera_center_FB;  //Forward to Backward
                    signed int(8)                          camera_center_UD;  //Up to Down
                    signed int(8)                          camera_center_RL;  // Right to Left
        }
  }
}
```

As illustrated in Table 1, the 6DoF video related metadata may be included in a SixDOFVideoConfigureationBox to be stored and signaled. The 6DoF video related metadata may include capture information metadata, stitching information metadata, projection scheme metadata, initial position information, and field of view (FOV) metadata. A detailed description of the fields included in the 6DoF video related metadata will be described later.

Further, metadata related to video tracks or samples for a 6DoF video in one file may be stored in a box form as follows.

TABLE 2

```
aligned(8) class SixDOFVideoConfigurationBox extends FullBox('sdvc', version=0, 0) {
unsigned                            int(8)    projection_scheme;
  unsigned                          int(1)    stitching_flag;
  signed                            int(8)    initial_view_yaw_degree;
  signed                            int(8)    initial_view_pitch_degree;
  signed                            int(8)    initial_view_roll_degree;
  signed                            int(8)    initial_center_FB_delta;
  signed                            int(8)    initial_center_UD_delta;
  signed                            int(8)    initial_center_RL_delta;
  unsigned                          int(3)    reserved =0;
```

TABLE 2-continued

```
    unsigned                                    int(1)   content_fov_flag;
    unsigned                                    int(1)   capture_info_flag;
    unsigned                                    int(1)   region_info_flag;
    unsigned                                    int(1)   reserved_rendering_range_flag;
    if (stitching_flag == 1) {
unsigned int(8) num_view_center;
for (i = 1; i<= num_center;i++){
            signed int(16)position_center_X;
            signed int(16)position_center_Y;
            signed int(16)position_center_Z;
            unsigned int(8)                              num_camera;
                unsigned int(8)                          stitching_radius;
        }
    }
if(projection_scheme =='0') {
            unsigned int(16)                     sphere_raidus;
        } else if(projection_scheme == '2') {            //cylindrical projection
            unsigned int(16)                     cylinder_radius;
            unsigned int(16)                     cylinder_height;
        } else if(projection_scheme == '3'){             //cubic projection
            unsigned int(16)                     cube_front_width;
            unsigned int(16)                     cube_front_height;
            unsigned int(16)                     cube_height;
        } else if(projection_scheme == '4'){             //panorama projection
            unsigned int(16)                     panorama_height;
        }
    if (content_fov_flag == 1)                   {
            unsigned int(16)                     content_fov;
    }
    if (camera_info_flag == 1)                   {
            string                               Capture_type;
            unsinged int(8)                      num_view;
            unsigned int(8)                      Camera_capture_array_row;
            unsigned int(8)                      Camera_capture_array_col;
            unsigned int(8)                      Baseline_length;
            unsigned int(3)                      Master_camera_ID; // to be origin_view
                for (int i;=0; i< num_view; i++) {
                    IntrinsicCameraParametersBox         intrinsic_camera_params;
                    ExtrinsicCameraParametersBox         extrinsic_camera_params;
                    signed int(8)                camera_center_pitch;
                    signed int(8)                camera_center_yaw;
                    signed int(8)                camera_center_roll;
                    signed int(8)                camera_center_FB; //Forward to Backward
                    signed int(8)                camera_center_UD; //Up to Down
                    signed int(8)                camera_center_RL; // Right to Left
            }
        }
    if (reserved_rendering_range_flag;== 1){
            unsigned int(8)                      rendering_type;
            unsigned int(8)                      reserved_range_type;
            signed int(16)                       center_X; //user center
            signed int(16)                       center_Y;
            signed int(16)                       center_Z;
            unsigned int(8)                      step size;
            if (reserved_range_type =='0') {
               unsigned int(8)                   sphere_radius_to_boundary;
            }
            else if(reserved_range_type =='1'){
               unsigned int(8)                   horizontal_range;
               unsigned int(8)                   vertical_range;
            }
            else if(reserved_range_type =='2'){
               unsigned int(8)                   distance_to_top_endpoint;
               unsigned int(8)                   distance_to_bottom_endpoint;
            }
            else if(reserved_range_type =='3'){
               unsigned int(8)                   distance_to_left_endpoint;
               unsigned int(8)                   distance_to_right_endpoint;
            }
            else if(reserved_range_type =='4'){
               unsigned int(8)                   distance_to_front_endpoint;
               unsigned int(8)                   distance_to_back_endpoint;
            }
            else if(reserved_range_type =='5'){
               signed int(16)                    vertex_X[ ];
               signed int(16)                    vertex_Y[ ];
               sigend int(16)                    vertex_Z[ ];
```

TABLE 2-continued

```
        unsigned int(1)                    interpolate;
        unsigned int(7)                    reserved;
    If(rendering_type=='0'){
        unsigned int(16) sphere_radius;
    }
    If(rendering_type=='1'){
        signed int(16)                     preliminary_viewport_yaw;
        signed int(16)                     preliminary_viewport_pitch;
        signed int(16)                     preliminary_viewport_roll;
        unsigned int(8)                    preliminary_hor_range;
        unsigned int(8)                    preliminary_ver_range;
    }
}
```

As illustrated in Table 2, the 6DoF video related metadata may be included in the SixDOFVideoConfigureationBox to be stored and signaled. The 6DoF video related metadata may further include re-projection information metadata in addition to the above-described capture information metadata, stitching information metadata, projection scheme metadata, initial position information, and FOV metadata. A detailed description of the fields included in the 6DoF video related metadata will be described later.

Specifically, the capture information metadata may include information about an environment of a video or an image captured by the corresponding 6DoF camera. As described above, a device capable of capturing a 6DoF video may have various forms, and in order to transform and use the captured environment into depth information or position information, information about a distance between cameras or an internal capture setting environment may be required in the capture environment. Specifically, the necessary information may basically include a form of array of a capturing camera, a camera type, the distance between cameras, the camera internal and/or external parameters, the total number of cameras or viewpoints used for capturing a 6DoF video, and/or ID of each camera or viewpoint, and the capture information metadata may include fields representing the information. Further, according to an embodiment, the capture information metadata may further include additional information, or some of the information may not be included.

As illustrated in Table 1, the capture information metadata may be transmitted when a value of the camera_info_flag field is true. That is, the camera_info_flag field may represent whether the capture information metadata is transmitted. When a value of the camera_info_flag field is 1, the capture information metadata may be transmitted, and when a value of the camera_info_flag field is 0, the capture information metadata may not be transmitted.

The capture information metadata may include a Master camera ID field, a Capture_type field, a num_of_view field, a Camera_capture_array_row field, a Camera_capture_array_col field, and a Baseline_length field. The Capture_type field may be referred to as a camera_type field and the Camera_capture_array_col field may be referred to as a Camera_capture_array_column field.

The Master_camera_ID field may represent a camera ID of a reference viewpoint, which is an origin point in a 3D image. That is, the 6DoF video transmitting apparatus may deliver reference information as an origin when a position in a 3D image of all captured images is designated by specifying a value of the Master_camera_ID field.

The Capture_type field may represent an array type of a camera or a setting type of cameras or lenses. That is, as described above, the Capture_type field may represent a setting type of cameras or lenses such as an arrangement state of a camera or a type of lens when capturing. For example, camera setting types may be classified into a High Density Camera Array (HDCA) and a Low Density Camera Array (LDCA) according to the number of used cameras, and classification criteria of the camera setting type follow criteria classified by standard organizations such as MPEG-I or JPEG.

The num_of_view field may represent the number of cameras. That is, the number of cameras capturing the 6DoF video may correspond to the value of the num_of_view field. Further, the Camera_capture_array_row field and the Camera_capture_array_column field may represent columns and rows of a camera array used when capturing 6DoF video.

FIG. 18 illustrates a camera array used for acquiring 6DoF video data. Referring to FIG. 18A, the 6DoF video data may be acquired using cameras disposed in a plurality of rows and columns. In the case of the camera array as illustrated in FIG. 18A, the camera array may be represented by indicating the order of the rows and columns starting from the camera located at the upper left end. For example, when a 6DoF video is captured based on cameras arranged as illustrated in FIG. 18A, the number of arranged cameras is 20 and thus a value of the num_of_view field may be derived as 20 and a value of the Camera_capture_array_row field may be derived as 4, a value of the Camera_capture_array_column field may be derived as 5, and a camera array may be represented based on the fields. Therefore, the total number of captured viewpoints when the camera array is applied may be derived as 20.

Further, referring to FIG. 18B, the 6DoF video data may be acquired using cameras disposed in a circular or arc shape. In this case, a camera array arranged clockwise based on a camera at a position closest to the 9 o'clock direction of the clock may be defined. For example, when a 6DoF video is captured based on cameras arranged as illustrated in FIG. 18B, values of the Camera_capture_array_row field and the Camera_capture_array_column field may be derived as 1 and 10, respectively, and a value of the num_of_view field may be derived as 10, and it can be seen that the total number of captured viewpoints is 10.

Further, referring to FIG. 18C, the 6DoF video data may be acquired based on cameras disposed in an array of 360 cameras. In this case, the number of viewpoints that may be captured may be derived as a number of view field x Camera_capture_array_row field x Camera_capture_array_column field. That is, the number of viewpoints that may be captured may be derived by multiplying values of the number of view field, Camera_capture_array_row field, and Camera_capture_array_column field. For example, when a 6DoF video is captured as illustrated in (c) of FIG. 18, a value of the numver_of_view field may be derived as 6, and a value of the Camera_capture_array_row field and a value of the Camera_capture_array_column field may be derived as 1 and 3, respectively. Thus, it can be seen that a capture result of total 18 viewpoints may be acquired.

The capture type field may represent a camera setting type for 6DoF video data. For example, the capture type field may represent a camera setting type as illustrated in the following table.

TABLE 3

| Camera_type | Description |
|---|---|
| 0000 | HDCA (High Density Camera Array) |
| 0001 | LDCA (Low Density Camera Array) |
| 0010 | Microlens |
| 0011 | Omnidirectional Camera |
| 0100 | Movement camera |
| 0101 | User defined |
| 0110~1111 | Reserved |

Referring to Table 3, a camera setting type for 6DoF video data may be derived based on the value of the capture type field. The camera setting type may be derived from one of a high density camera array (HDCA), a low density camera array (LDCA), a microlens, an omnidirectional camera, and a user defined.

For example, there may be a microlens as a camera setting type, but the microlens has a lens capable of capturing various viewpoints inside a single camera, and thus may have a camera setting type that may acquire the capturing result by multiple cameras. The microlenses may be used for 6DoF video capture and be classified into one camera setting type. When the camera setting type is set to the microlens, the num_of_view field may be derived as the number of lenses in which the microlens camera has, the Camera_capture_array_row field and the Camera_capture_array_col field may be represented as an array value of the lens, and the Baseline_length field may represent a distance between the lens center.

Further, another camera setting type may include an omnidirectional camera. The omnidirectional camera type may represent a setting environment for capturing a 6DoF video using an omnidirectional camera used for conventional 360-degree video recording. When the camera setting type is set to the omni-directional camera, the num_of_view field may be the number of viewpoints in which each 360-degree camera may capture at one position. Further, another camera setting type may be a movement camera. The movement camera type may represent a camera setting type of moving and capturing one camera using a moving rail or the like. When the camera setting type is set to a movement camera, the num_of_view field may represent the number of captured positions, and the Camera_capture_array_row field and the Camera_capture_array_column field may represent an array of positions captured by the camera. Further, the Baseline length field may represent a distance moved to a position captured by the camera. In addition to the above-described types, the camera setting type may be a user defined type that may be arbitrarily set by the user, and when there is a 6DoF camera that may be captured in a new way, the field may be left to set to the remaining value.

The capture information metadata may include a Baseline_length field. The Baseline_length field may represent a Baseline_length value representing a distance between cameras. The Baseline_length field may be set to deliver a Baseline_length, which is a distance between cameras to a depth information processor.

Further, an IntrinsicCameraParametersBox that may acquire internal setting information of each camera such as a focal length and an alignment value of the camera for each camera or each lens and an ExtrinsicCameraParametersBox representing outer setting information of each camera, i.e., information about whether photographing is performed or whether a horizontal state is proper in a state in which each camera is twisted may be included in the capture information metadata. The IntrinsicCameraParameter and the ExtrinsicCameraParameter may include a plurality of fields, and a detailed description thereof may be described later.

The capture information metadata may include a Master_camera_ID field, and may include a camera_center_FB field, a camera_center_UB field, a camera_center_RL field, a camera_center_yaw field, a camera_center_pitch field, and a camera_center_roll field for each camera. A position of the remaining cameras for the 6DoF video captured using the center of the camera indicated by the Master_camera_ID field, i.e., a center position of a viewpoint indicated by the Master_camera_ID field as the origin may be set to a camera_center_FB field, a camera_center_UB field, and a camera_center_RL field, and a direction of the video captured by a camera may be defined to a camera_center_yaw, a camera_center_pitch, and a camera_center_roll. Specifically, the camera_center_FB field may represent a component of a forward and backward axis of a corresponding camera position, the camera_center_UB field may represent a component of an up and down axis of a corresponding camera position, and the camera_center_RL field may represent a component of a left and right axis of a corresponding camera position. Further, the camera_center_yaw field may represent a yaw value of a midpoint of the 6DoF video captured by the camera, the camera_center_pitch field may represent a pitch value of a midpoint of the 6DoF video captured by the camera, and the camera_center_roll field may represent a roll value of a midpoint of the 6DoF video captured by the camera.

Capture information metadata may include an IntrinsicCameraParametersBox and an ExtrinsicCameraParametersBox for each camera.

The IntrinsicCameraParametersBox may be derived as illustrated in the following table.

TABLE 4

| IntrinsicCameraParameters( ) { | |
|---|---|
| unsigned int(6) | reserved=0; |
| unsigned int(10) | ref_view_id; |
| unsigned int(32) | prec_focal_length; |
| unsigned int(32) | prec_principal_point; |
| unsigned int(32) | prec_skew_factor; |
| unsigned int(8) | exponent_focal_length_x; |
| signed int(64) | mantissa_focal_length_x; |
| unsigned int(8) | exponent_focal_length_y; |
| signed int(64) | mantissa_focal_length_y; |
| unsigned int(8) | exponent_principal_point_x; |
| signed int(64) | mantissa_principal_point_x; |
| unsigned int(8) | exponent_principal_point_y; |
| signed int(64) | mantissa_principal_point_y; |
| unsigned int(8) | exponent_skew_factor; |
| signed int(64) | mantissa_skew_factor; |
| } | |

Referring to Table 4, the IntrinsicCameraParametersBox may include a ref_view_id field, a prec_focal_length field, a prec_principal_point field, a prec_skew_factor field, an exponent_focal_length_x field, a mantissa_focal_length_x field, an exponent_focal_length_y field, a mantissa_focal_length_y field, an exponent_principal_point_x field, a mantissa_principal_point_x field, an exponent_principal_point_y field, a mantissa_principal_point_y field, an exponent_skew_factor field, and/or a mantissa_skew_factor field.

The ref_view_id field may represent a view_id identifying a view of the corresponding camera. The prec_focal_length field may specify an exponent of the maximum truncation error allowed for a focal_length_x and a focal_length_y. The maximum truncation error may be represented as $2^{(-prec\_focal\_length)}$. The prec_principal_point field may specify an exponent of the maximum truncation error allowed for a principal_point_x and a principal_point_y. The maximum truncation error may be represented as $2^{(-prec\_principal\_point)}$.

The prec_skew_factor field may specify an exponent of a maximum truncation error allowed for a skew factor. The prec_skew_factor field may be represented as $2^{(-prec\_skew\_factor)}$.

The exponent_focal_length_x field may represent an exponent part of a focal length in a horizontal direction. The mantissa_focal_length_x field may represent a mantisssa part of a focal length of an i-th camera in the horizontal direction. The exponent_focal_length_y field may represent an exponent part of a focal length in the vertical direction. The mantissa_focal_length_y field may represent a mantisssa part having a focal length in the vertical direction.

The exponent_principal_point_x field may represent an expand part of a principal point in a horizontal direction. The mantissa_principal_point_x field may represent a mantissa part of a principal point in a horizontal direction. The exponent_principal_point_y field may represent an expand part of a principal point in a vertical direction. The mantissa_principal_point_y field may represent a mantissa part of a principal point in a vertical direction.

The exponent skew factor field may represent an expand part of a skew factor. The mantissa_skew_factor field may represent a mantissa part of a skew factor.

Further, the ExtrinsicCameraParametersBox may include camera parameters that define a position and orientation of a camera reference frame based on a known world reference frame. That is, the ExtrinsicCameraParametersBox may include parameters representing contents of a rotation and translation of each camera based on the known world reference frame.

For example, the ExtrinsicCameraParametersBox may be derived as illustrated in the following table.

TABLE 5

```
ExtrinsicCameraParameters( ) {
    unsigned int(6)              reserved=0;
    unsigned int(10)             ref_view_id;
    unsigned int(8)              prec_rotation_param;
    unsigned int(8)              prec_translation_param;
    for (j=1; j<=3; j++) { /* row */
        for (k=1; k<=3; k++) { /* column */
            unsigned int(8)      exponent_r[j][k];
            signed int(64)       mantissa_r [j][k];
        }
        unsigned int(8)          exponent_t[j];
        signed int(64)           mantissa_t[j];
    }
}
```

Referring to Table 5, the ExtrinsicCameraParametersBox may include a ref_view_id field, a prec_rotation_param field, a prec_translation_param field, an exponent_r[j][k] field, a mantissa_r[j][k] field, an exponent_t[j] field, and/or a mantissa_t[j] field.

The ref_view_id field may represent a view_id identifying a view related to internal camera parameters.

The prec_rotation_param field may specify an expandable part of the maximum truncation error allowed for r[j][k]. This may be expressed as 2-prec_rotation_param.

The prec_translation_param field may specify an expand part of a maximum truncation error allowed for t[j]. This may be expressed as 2-prec_translation_param.

The exponent r[j][k] field may specify an component part of a (j, k) component of a rotation matrix. The mantissa_r [j][k] field may specify a mantissa part of the (j, k) component of the rotation matrix. The exponent_t[j] field may specify an component part of the j-th component of the translation vector. The exponent_t[j] field may have a value between 0 and 62. The mantissa_t[j] field may specify a mantissa part of the j-th component of the translation vector.

Further, the 6DoF video related metadata may include the stitching information metadata.

For example, when the stitching information metadata needs to stitch the captured 6DoF video, the stitching information metadata may be used for position and stitch the remaining images based on the captured image of the earliest position among the plurality of captured images. Further, the stitching result may be different according to a projection scheme. In this case, information necessary for the stitching may include information representing whether stitching is performed, the number of views stitched to make one three-dimensional frame when stitching is performed, a criterion distance value for finding a stitching viewpoint, and camera information of viewpoints to be a reference when stitching are performed. According to an embodiment, the stitching information metadata may further include additional information or exclude the above-described information.

For example, the stitching information metadata may be represented as the following table.

TABLE 6

```
if (stitching flag == 1)          {
    unsigned int(8)               num_view_center;
    for (i = 1; i<= num_center;i++){
        signed int(16)            position_center_X;
        signed int(16)            position_center_Y;
        signed int(16)            position_center_Z;
        unsigned int(8)           num_camera;
        unsigned int(8)           stitching_radius;
    }
}
```

Here, the stiching_flag field represents a field representing whether stitching is performed, a num_view_center field represents a field representing the number of reference viewpoints to be stitched, a position_center_X field, a position_center_Y field, and a position_center_Z field represent a field representing a center position of the corresponding reference viewpoint, a num_camera field represents a field representing the number of captured images stitched to a corresponding reference viewpoint, and the stitching_radius field represents a field representing a distance between captured images stitched at a center position of the corresponding reference viewpoint. Specifically, when a value of the stiching_flag field is 1, stitching may be performed on 6DoF video data, and when a value of the stiching_flag field is 0, stitching may not be performed on 6DoF video data. Stitching may be performed only when the stitching_flag field is true because there may be cases where stitching does not occur and is projected into a two-dimensional image.

Further, when stitching is performed, position information of a reference viewpoint may be set.

When stitching is performed, the number of reference viewpoints based on reference viewpoint information may be defined as a num_view_center field, center position information of each reference viewpoint may be defined as a position_center_X, a position_center_Y, and a position_center_Z, and the number of captured images stitched for each viewpoint may be defined as a num_camera field. Further, the stitching_radius field may be defined as a field representing a distance between a center position of the reference viewpoint and the stitched captured images. Specifically, in order to find a captured video corresponding to a value of the num_camera field, the captured image corresponding to the number of the num_camera field values may be set to a stitched image about a position separated by the stitched radius field from the center position of the corresponding reference viewpoint.

Specifically, the position_center_X, the position_center_Y, and the position_center_Z may represent x, y, and z components, respectively, of the center position of the target reference viewpoint in a field representing a center position of the target reference viewpoint. A center position of the reference viewpoint may be represented as an absolute position coordinate value on the 3D axis. A reference point to be an origin of the three-dimensional space representing the center position of the reference viewpoint may be set based on the information represented by the Master_camera_ID field defined in the above-described Camera info.

Further, the num_camera field may represent the number of captured images to be stitched at the target reference viewpoint. Further, the stitching_radius field may represent a distance between the center position of the target reference viewpoint and the stitched captured images. The unit of the distance may be defined to suit the requirements of the system. For example, the unit of the distance may be defined in units of an absolute distance (cm or mm) from the origin, or may be defined as a normalized distance.

Further, the 6DoF video related metadata may include the projection scheme metadata. For example, the projection scheme metadata may be derived as illustrated in the following table.

TABLE 7

```
if((projection_scheme =='0')) {
    unsigned int(16)         sphere_raidus;
} else if(projection_scheme == '1') { //cylindrical projection
    unsigned int(16)         cylinder_radius;
    unsigned int(16)         cylinder_height;
} else if(projection_scheme == '2'){ //cubic projection
    unsigned int(16)         cube_front_width;
    unsigned int(16)         cube_front_height;
    unsigned int(16)         cube_height;
} else if(projection_scheme == '3'){ //panorama projection
    unsigned int(16)         panorama_height;
}
```

Referring to Table 7, the projection scheme metadata may include a projection_scheme field. After the stitching is performed, the projection_scheme field may represent a projection scheme used when the stitched video data at the corresponding viewpoint is projected onto the 2D image. That is, the projection_scheme field may represent a projection scheme used when 6DoF video data at the corresponding viewpoint is projected onto the 2D image. The projection scheme may be the same as or similar to the projection scheme for a 360-degree video. For example, when the projection_scheme field has a value of 0, 1, 2, and 3, each of the projection_scheme field may represent an equirectangular projection scheme, a cylindrical projection scheme, a cube projection scheme, and a panoramic projection scheme.

The projection_scheme field may represent a projection scheme for 6DoF video data at a corresponding viewpoint as illustrated in the following table.

TABLE 8

| projection_scheme | Description |
| --- | --- |
| 0000 | ERP(Equi-Rectangular_projection) |
| 0001 | Cylindrical |
| 0010 | Cube |
| 0011 | Panoramic |
| 0100 | User defined |
| 0101~1111 | Reserved |

Referring to Table 8, when the projection_scheme field has a value of 4, 6DoF video data may be projected onto the 2D image with a method randomly set by a user other than the equirectangular projection scheme, the cylindrical projection scheme, the cube projection scheme, and the panoramic projection scheme. Further, when the projection_scheme field has a value other than values of 0, 1, 2, and 3, the projection_scheme field may be reserved for future use.

The projection scheme metadata may provide detailed information about each projection scheme (e.g., an equirectangular projection scheme, a cylindrical projection scheme, a cube projection scheme, a panoramic projection scheme, etc.) indicated by the projection_scheme field.

For example, when a value of the projection_scheme field is 0, i.e., when the projection_scheme field indicates that the projection scheme is an equirectangular projection scheme, the projection scheme metadata may include a sphere_radius field. The sphere_radius field may represent a radius of a sphere applied when mapping 6DoF video data of a corresponding viewpoint to a 2D image, i.e., upon projecting.

Further, as another example, when a value of the projection_scheme field is 1, i.e., when the projection_scheme field indicates that the projection scheme is a cylindrical projection scheme, the projection scheme metadata may include a cylinder_radius field and/or a cylinder_height field. The cylinder_radius field may represent a radius of a top/bottom of a cylinder applied when mapping 6DoF video data of a corresponding viewpoint to a 2D image, i.e., upon projecting, and the cylinder_height field may represent a height of a cylinder applied when mapping 6DoF video data of a corresponding viewpoint to a 2D image, i.e., upon projecting.

Further, as another example, when a value of the projection_scheme field is 2, i.e., when the projection scheme field indicates that the projection scheme is a cube projection scheme, the projection scheme metadata may include a cube_front_width field, a cube_front_height field, and/or a cube height field. The cube_front_width field may represent a width of a front surface of a cube applied when mapping 6DoF video data of a corresponding viewpoint to a 2D image, i.e., upon projecting, the cube_front_height field may represent a height of a front surface of the cube applied when mapping the 6DoF video data to a 2D image, i.e., upon projecting, and the cube_height field may represent a height between the front and side surfaces of the cube applied when mapping the 6DoF video data to a 2D image, i.e., upon projecting.

Further, as another example, when a value of the projection_scheme field is 3, i.e., when the projection_scheme field indicates that the projection scheme is a panoramic projection scheme, the projection scheme metadata may include a panorama_height field. The panoramic_height field may represent a height of a panorama applied when mapping 360-degree video data to a 2D image, i.e., upon projecting.

According to an embodiment, the 6DoF video related metadata may further include detailed information about a region generated by the projection scheme specified by the projection_scheme field. Here, the detailed information about the region may mean, for example, whether the region is rotated and radius information of a top region of the cylinder.

Further, the 6DoF video related metadata may include initial position information and field of view (FOV) metadata. For example, the initial position information and the FOV metadata may be derived as illustrated in the following table.

TABLE 9

| | | |
|---|---|---|
| signed | int(8) | initial_view_yaw_degree; |
| signed | int(8) | initial_view_pitch_degree; |
| signed | int(8) | initial_view_roll_degree; |
| signed | int(8) | initial_center_FB_delta; |
| signed | int(8) | initial_center_UD_delta; |
| signed | int(8) | initial_center_RL_delta; |
| unsigned | int(5) | reserved = 0; |
| unsigned | int(1) | content_fov_flag; |
| unsigned | int(1) | capture_info_flag; |
| unsigned | int(1) | region_info_flag; |
| if (content_fov_flag == 1) | { | |
| unsigned int(16) | | content_hfov; |
| unsigned int(16) | | content_vfov; |
| } | | |

Referring to Table 9, the initial position information and the FOV metadata may include information about a viewpoint (initial view) to be viewed when the user first reproduces a 6DoF video and information related to the FOV. The initial position information and the FOV metadata may include an initial_view_yaw_degree field, an initial_view_pitch_degree field, an initial_view_roll_degree field, an initial_center_FB_delta field, an initial_center_UD_delta field, an initial_center_RL_delta field, a content_fov_flag field, a capture_info_flag field, a region_info_flag field, a content_hfov field, and/or a content_vfov field. According to an embodiment, the initial position information and the FOV metadata may further include additional information.

The initial_view_yaw_degree field, the initial_view_pitch_degree field, and the initial_view_roll_degree field may represent a center point of an initial view of the user when providing the 6DoF video. That is, the initial_view_yaw_degree field, the initial_view_pitch_degree field, and the initial_view_roll_degree field may represent the center point of the 3D space to which 6DoF video data of the initial view is mapped. Thus, the center point of the viewport first viewed upon reproducing may be represented by these three fields. Specifically, the initial_view_yaw_degree field may represent a yaw value of the center point of the initial view. That is, the initial_view_yaw_degree field may represent a position of the center point in a direction (sign) and a degree (angle) thereof rotated based on the yaw axis. Further, the initial_view_pitch_degree field may represent a pitch value of the center point of the initial view. That is, the initial_view_pitch_degree field may represent a position of the center point in a direction (sign) and a degree (angle) thereof rotated based on the pitch axis. Further, the initial_view_roll_degree field may represent a roll value for a center point of the initial view. That is, the initial_view_roll_degree field may represent a position of the center point in a direction (sign) and a degree (angle) thereof rotated based on the roll axis.

The initial_center_FB_delta field, the initial_center_UD_delta field, and the initial_center_RL_delta field may represent a position of an initial view of the user when providing the 6DoF video. Specifically, the initial_center_FB_delta field may represent a component of a forward and backward axis of a position of the initial view. That is, the initial_center_FB_delta field may represent how far a position of the initial view of a video to be viewed by the user when providing the 6DoF video is separated from the original point in the forward-backward direction. Further, the initial_center_UD_delta field may represent a component of an up and down axis of the position of the initial view. That is, the initial_center_UD_delta field may represent how far a position of an initial view of a video to be viewed by the user when providing the 6DoF video is separated in an up-down direction from the original point. Further, the initial_center_RL_delta field may represent a component of the left and right axis of a position of the initial view. That is, the initial_center_RL_delta field may represent how far a position of an initial view of the video to be viewed by the user when providing the 6DoF video is separated in a left-right direction from the original point.

The content_fov_flag field may represent whether there is information about an intended FOV when producing a corresponding 6DoF video. For example, if there is no intended FOV value when producing the 6DoF video, a value of the content_fov_flag field may be derived to 0, and if there is an intended FOV value when producing the 6DoF video, a value of the content_fov_flag field may be derived to 1. The FOV value may be defined to a content_hfov field and/or a content_vfov field. If a value of the content_fov_flag field is 1, there may be a content_hfov field and/or a content_vfov field.

The content_hfov field may represent information about a horizontal field of view (FOV) of an intended content when producing a corresponding 6DoF video. That is, the content_hfov field may represent a horizontal value of FOV of the intended content when producing the corresponding 6DoF video. According to the horizontal FOV of the corresponding 6DoF video receiving apparatus, an area displayed to the user at one time among 6DoF videos may be determined. Alternatively, according to an embodiment, an area of a 6DoF video displayed to the user at one time may be determined by reflecting horizontal FOV information of this field. The 6DoF video receiving apparatus may adjust and display FOV of the 6DoF video displayed to the user at one time by reflecting the horizontal FOV information, or perform an operation that may support the FOV.

The content_vfov field may represent information about a vertical field of view (FOV) of an intended content when producing the 6DoF video. That is, the content_vfov field may represent a vertical direction value of FOV of the intended content when producing the corresponding 6DoF video. According to the vertical FOV of the corresponding 6DoF video receiving apparatus, an area displayed to the user at one time among 6DoF videos may be determined. Alternatively, according to an embodiment, an area of 6DoF video displayed to the user at one time may be determined by reflecting vertical FOV information of the field. The 6DoF video receiving apparatus may adjust and display the FOV of the 6DoF video displayed to the user at one time by reflecting the vertical FOV information, or perform an operation that may support the FOV. The initial position information and the FOV metadata may provide metadata related to regions of the 6DoF video data. The region_info_flag field may represent whether the 2D image projected with the corresponding 6DoF video data is divided into one or more regions. At the same time, this field may represent whether 6DoF video related metadata includes detailed information about each region.

Further, the initial position information and the FOV metadata may provide the capture information metadata. If a value of the capture_info_flag field is true, the capture information metadata may be transmitted. That is, the capture_info_flag field may represent whether the capture information metadata is transmitted. If a value of the capture_info_flag field is 1, the capture information metadata may be transmitted, and if a value of the capture_info_flag field is 0, the capture information metadata may not be transmitted. The capture_info_flag field may be the same as the above-described camera_info_flag field.

Specifically, the re-projection information metadata may include user position information representing a currently reproducing position, i.e., a position of a 6DoF video currently provided to a user and information about a reserved rendering position existing in a preset advancing direction. The re-projection information metadata may be referred to as rendering information metadata. In order to re-project a 6DoF video, initial viewport information and information to pre-render 6DoF video/image information to be viewed based on a producer's intended advancing direction or the user's movement path at the center of the 6DoF video/image with respect to an initial position or the center of a 3D image/video currently viewed by the user by predicting a movement path may be required. Based on the information, it is possible to prevent image generation/synthesis and rendering delay at the virtual viewpoint. In this case, the re-projection information metadata may include fields representing user position information according to an embodiment and a form of a 6DoF content to be generated in advance and further include fields for additional information.

For example, the re-projection information metadata may be derived as illustrated in the following table.

TABLE 10

```
Reserved_rendering_range ( ){
    unsigned int(8)          reserved_range_type;
    signed int(16)           center_X; //user center
    signed int(16)           center_Y;
    signed int(16)           center_Z;
    unsigned int(8)          step size;
    unsigned int(8)          rendering_type;
    if (reserved_range_type =='0') {
        unsigned int(8)      sphere_radius_to_boundary;
    }
    else if(reserved_range_type =='1'){
    unsigned int(8)          horizontal_range;
        unsigned int(8)      vertical_range;
    }
    else if(reserved_range_type =='2'){
        unsigned int(8)      distance_to_top_endpoint;
        unsigned int(8)      distance_to_bottom_endpoint;
    else if(reserved_range_type =='3'){
        unsigned int(8)      distance_to_left_endpoint;
        unsigned int(8)      distance_to_right_endpoint;
    }
    else if(reserved_range_type =='4'){
        unsigned int(8)      distance_to_front_endpoint;
        unsigned int(8)      distance_to_back_endpoint;
    }
```

TABLE 10-continued

```
    else if(reserved_range_type =='5'){
        signed int(16)       vertex_X[ ];
        signed int(16)       vertex_Y[ ];
        signed int(16)       vertex_Z[ ];
        unsigned int(1)      interpolate;
        unsigned int(7)      reserved;
    }
    If(rendering_type=='0'){
        unsigned int(16) sphere_radius;
    }
    If(rendering_type=='1'){
        signed int(16)       preliminary_viewport_yaw;
        signed int(16)       preliminary_viewport_pitch;
        signed int(16)       preliminary_viewport_roll;
        unsigned int(8)      preliminary_horl_range;
        unsigned int(8)      preliminary_ver_range;
    }
}
```

Referring to Table 10, the re-projection information metadata may include a reserved_range_type field, a center_X field, a center_Y field, a center_Z field, a step_size field, a rendering_type field, a sphere_radius_to_boundary field, a horizontal_range field, a vertical_range field, a distance_to_top_endpoint field, a distance_to_bottom_endpoint field, a distance_to_left_endpoint field, a distance_to_right_endpoint field, a distance_to_front_endpoint field, a distance_to_back_endpoint field, a vertex XII field, a vertex_Y[ ] field, a vertex_Z[ ] field, a sphere_radius field, a preliminary_viewport_yaw field, a preliminary_viewport_pitch field, a preliminary_viewport_roll field, a preliminary_hor_range field, and a preliminary_ver_range field. According to an embodiment, the re-projection information metadata may further include additional information. The re-projection information metadata may be transmitted when a value of the reserved_rendering_range_flag field is true. That is, the reserved_rendering_range_flag field may represent whether the re-projection information metadata is transmitted. If a value of the reserved_rendering_range_flag field is 1, the re-projection information metadata may be transmitted, and if a value of the reserved_rendering_range_flag field is 0, the re-projection information metadata may not be transmitted.

In order to define information about a reserved rendering position existing in a preset progress direction together with a currently reproducing position, information such as a rendering type and a form of the reserved rendering range, position information of the current user, a step_size when the user center moves, and an overall movement range may be required. The reserved rendering range may be referred to as a reserved rendering region. In this case, the 6DoF video or image used for rendering may be formed around a 6DoF video or image for a primary view (PV) and be formed around a part or all of the 6DoF video or image for a PV and an SV.

The form of the reserved rendering range may be described as a description to be described later.

Figure 19A:
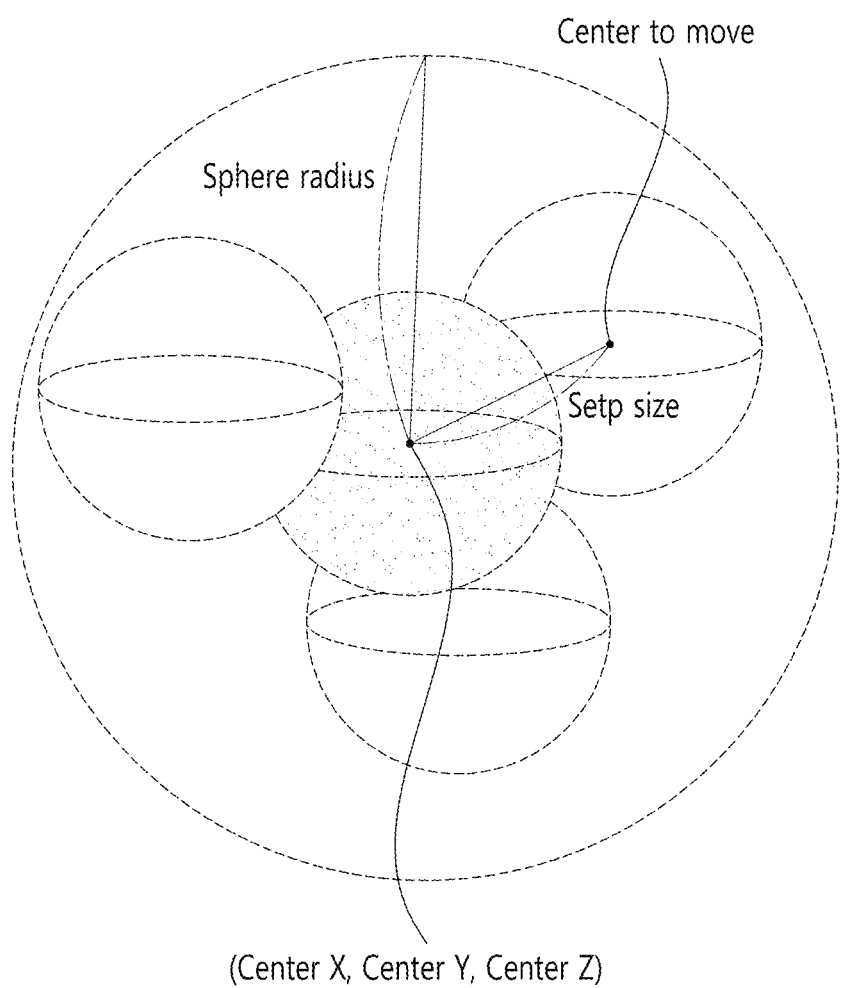
Figure 19B:
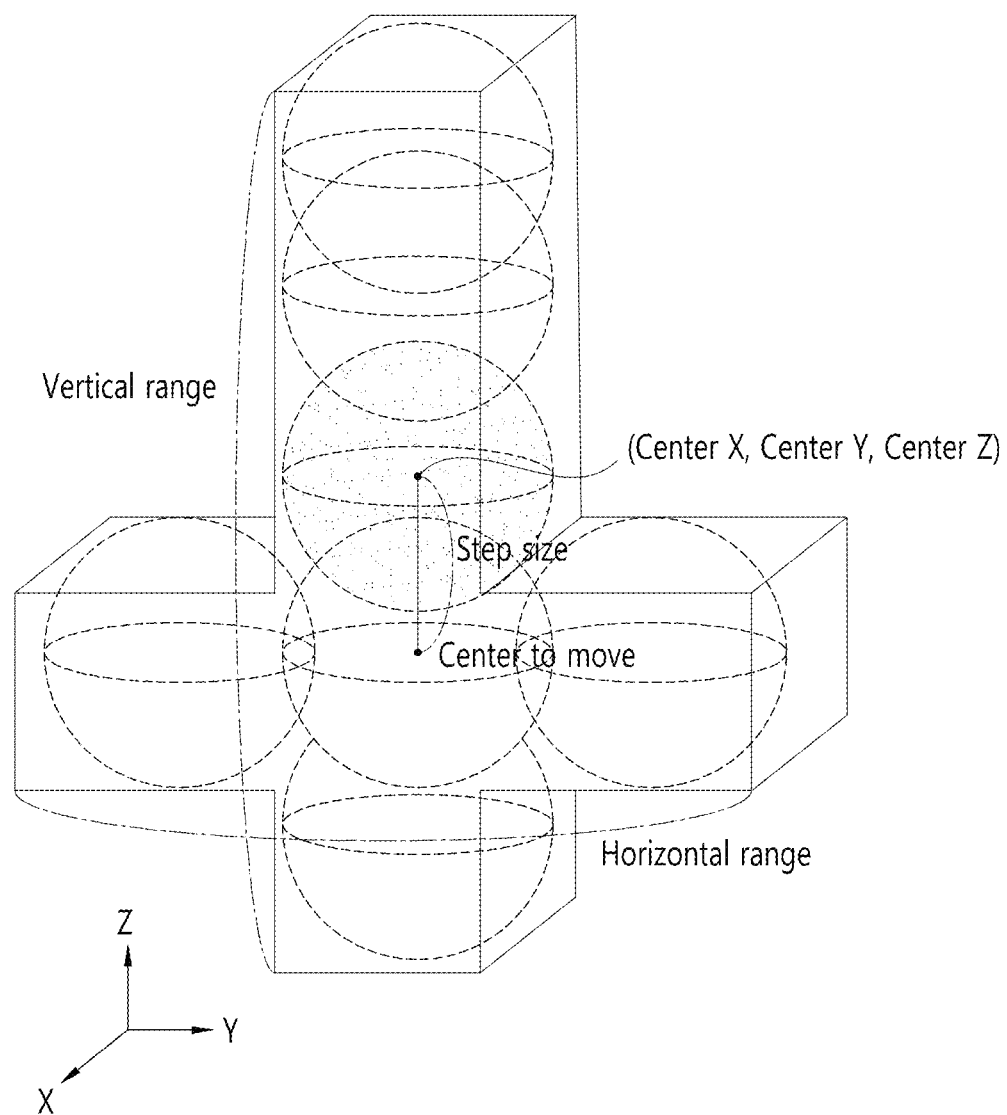
Figure 19C:
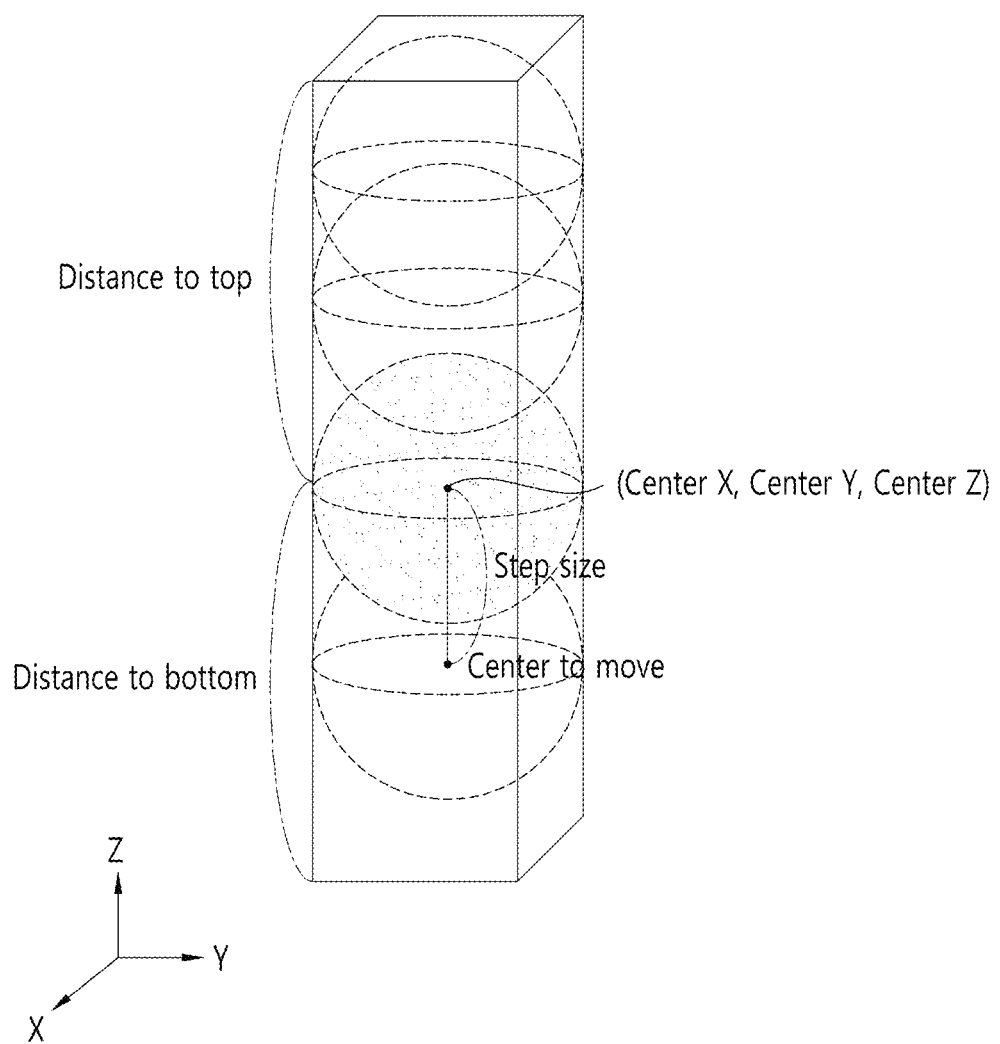
Figure 19D:
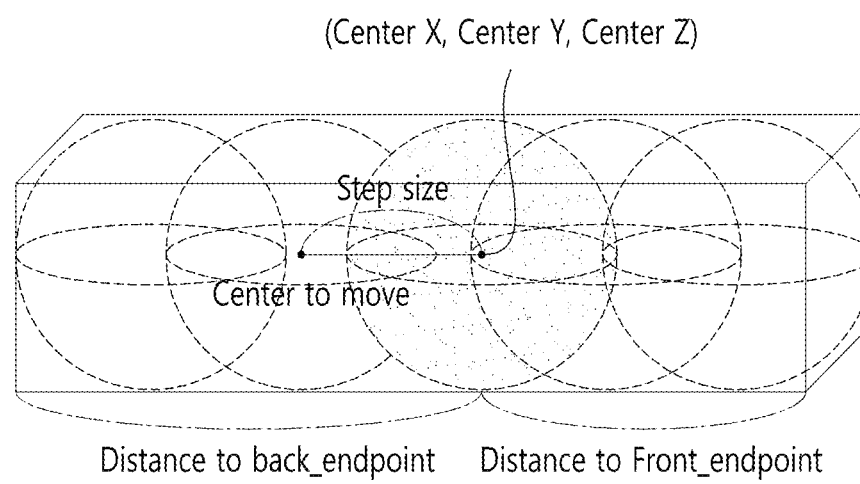

FIGS. 19A to 19E are diagrams illustrating the form of the reserved rendering range of the present disclosure. The form of the reserved rendering range may be defined to a reserved_range_type field. That is, the reserved_range_type field may represent the type of the reserved rendering range. The type of the reserved rendering range may include a sphere type formed with the same radius about a user position as illustrated in FIG. 19A, a top-shape type that extends horizontally and vertically around a user position as illustrated in FIG. 19B, an elevation direction type in which there is only an up and down movement about a user position as illustrated in FIG. 19C, a lateral direction type that moves forward or backward about a user position as illustrated in FIG. 19D, and a longitudinal direction type having only a path that moves left or right around a user position as illustrated in FIG. 19E. Further, as a type of the reserved rendering range, a free form of reserved rendering region may be defined, and there may be a user defined type defined based on a vertex. Further, various forms of advancing directions may occur, and the corresponding form may be added as a type of the reserved rendering range.

The reserved_range_type field may represent a type of the reserved rendering range. For example, the reserved_range_type field may represent a type of the reserved rendering range as illustrated in the following table.

TABLE 11

| reserved_range_type | Description |
| --- | --- |
| 0000 | sphere |
| 0001 | Top-shape |
| 0010 | Elevation-direction |
| 0011 | Lateral direction |
| 0100 | Longitudinal direction |
| 0101 | User defined |
| 0110~1111 | Reserved |

Referring to Table 11, the type of the reserved rendering range may be derived based on a value of the reserved_range_type field. Specifically, when a value of the reserved_range_type field is 0, the type of the reserved rendering range may be derived as aspear type, and when a value of the reserved_range_type field is 1, the type of the reserved rendering range may be derived as the top-shape type, and when a value of the reserved_range_type field is 2, the type of the reserved rendering range may be derived as the elevation direction type, and when a value of the reserved_range_type field is 3, the type of the reserved rendering range may be derived as the lateral direction type, when a value of the reserved_range_type field is 4, the type of the reserved rendering range may be derived as the longitude direction type, and a value of the reserved_range_type field is 5, the type of the reserved rendering range may be derived as the user defined type. Further, when the reserved_range_type field has a value other than a value of 0 to 5, the reserved_range_type field may be reserved for future use.

When the reserved rendering range is defined, i.e., when a type of the reserved rendering range is set, a rendering type representing how information of a video or an image of a position to be pre-rendered is rendered around a moved position may be defined. In other words, a rendering type representing how information of a video or an image of a reserved rendering position is rendered at the reserved rendering position may be defined, and a rendering_type field may represent a rendering type of the reserved rendering position.

Figure 20:
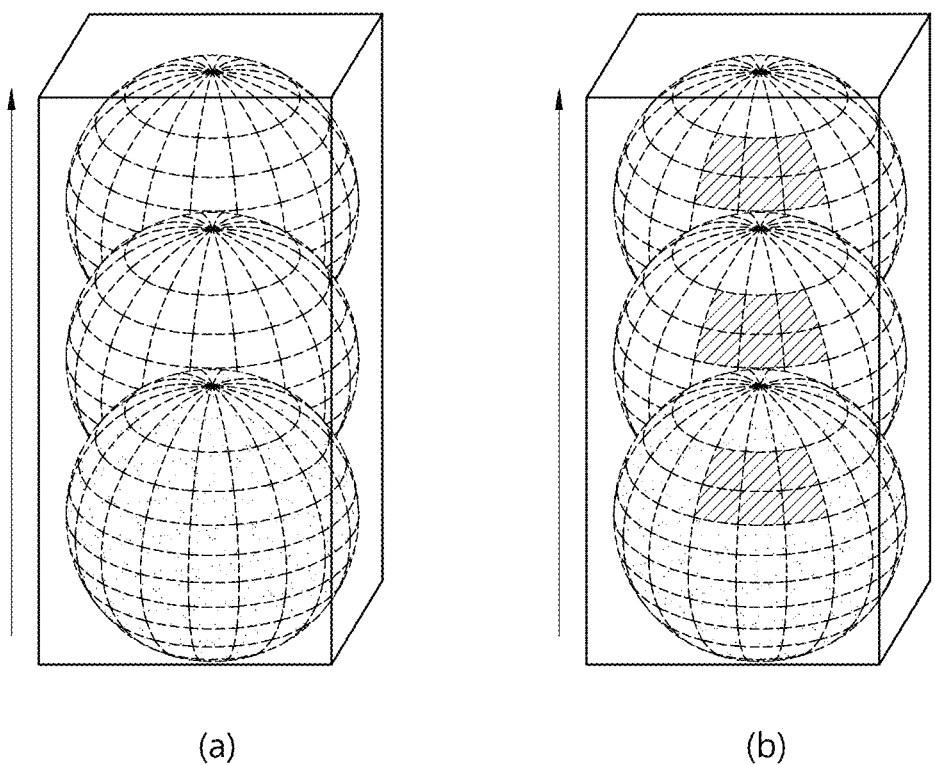
FIG. 20 is a diagram illustrating the rendering type of the reserved rendering position of the present disclosure.

FIG. 20 is a diagram illustrating the rendering type of the reserved rendering position of the present disclosure. Referring to FIG. 20, in the case of a 6DoF video or image advancing in an arrow direction, a user position may be moved in an arrow direction. The rendering type may include a whole sphere rendering type that renders a new 360-degree video or image in the entire 3D space (i.e., entire sphere) at the moved user position (reserved rendering position) as illustrated in FIG. 20(a), and a partial viewport rendering type that pre-renders only a partial viewport such as a viewport currently being viewed by the user at the moved user position, as illustrated in FIG. 20(b), for example, a viewport defined to a midpoint, a horizontal range, and a vertical range designated to a specific yaw, pitch, roll and. Further, there may be a user defined rendering type that pre-renders multiple regions or a typical form of a region intended by a producer on a 3D space for the moved user position, i.e., a sphere.

The rendering_type field may represent a rendering type of the reserved rendering position. For example, the rendering_type field may represent the rendering type as the following table.

TABLE 12

| rendering_type | Description |
| --- | --- |
| 0000 | Whole sphere |
| 0001 | Partial_viewport |
| 0100 | User defined |
| 0101~1111 | Reserved |

Referring to Table 12, the rendering type may be derived based on the value of the rendering_type field. Specifically, when a value of the rendering_type field is 0, the rendering type may be derived as the whole sphere rendering type, and when a value of the rendering_type field is 1, the rendering type may be derived as the partial viewport rendering type, and when a value of the rendering_type field is 2, the rendering type may be derived as the user defined type. Further, when the rendering_type field has a value other than a value of 0 to 2, the rendering_type field may be reserved for future use.

A detailed description of the fields included in the re-projection information metadata may be described later.

The center_X field, the center_Y field, and the center_Z field may represent a position of a user currently viewing a 6DoF video or image. That is, the center_X field, the center_Y field, and the center_Z field may represent X, Y, and Z coordinate values on a three-dimensional space of a user position. The value may change according to the user position, and may be defined within a range of a 6DoF content.

The step_size field may represent a distance from the user position represented by the center_X field, the center_Y field, and the center_Z field to the center of a position (reserved rendering position) to be rendered. That is, the step_size field may represent a distance from a current position of the user to the reserved rendering position. Therefore, the step_size field may represent a center position of a 360-degree video or image to be pre-rendered about a position to which the user is to be moved. This may mean the number of 360-degree videos or images to be pre-rendered. That is, as a value of the step_size field is smaller, the number of 360-degree videos or images rendered within the defined reserved rendering range increases, and as a value of the step_size field is larger, reserved rendering may be performed sparsely within the reserved rendering range. A value acquired by dividing a distance from the user position to each boundary of the reserved rendering area into the step_size field value may be derived as the number of centers of the reserved rendering position.

The sphere_radius_to_boundary field may be delivered when a form of the reserved rendering range is a sphere. That is, the sphere_radius_to_boundary field may be delivered when the reserved_range_type field represents that the type of the reserved rendering range is a sphere type. The sphere_radius_to_boundary field may represent a radius from a user position represented by the center_X field, the center_Y field, and the center_Z field to a boundary of a reserved rendering range. That is, the sphere_radius_to_boundary field may represent a radius of the reserved rendering range.

The horizontal_range field may be delivered when a form of the reserved rendering range is a top-shape. That is, the horizontal_range field may be delivered when the reserved_range_type field represents that a type of the reserved rendering range is a top-shape type. The horizontal_range field may represent a horizontal range of the reserved rendering range when a type of the reserved rendering range is a top-shape type. When the reserved rendering range is symmetric about a user position represented by the center_X field, the center_Y field, and the center_Z field, the horizontal_range field may be defined, and the horizontal_range field may represent a distance from the user position to a boundary point of a horizontal direction.

Alternatively, when the reserved_range_type field represents that the type of the reserved rendering range is a top-shape type, a horizontal_range_left_end field and a horizontal_range_right_end field may be delivered instead of the horizontal_range field. The horizontal_range_left_end field may represent a left boundary point of a reserved rendering range located at a horizontal axis of the user position, and the horizontal_range_right_end field may represent a right boundary point of a reserved rendering range located at the horizontal axis of the user position.

The vertical range field may be delivered when a form of the reserved rendering range is a top-shape. That is, the vertical_range field may be delivered when the reserved_range_type field represents that the type of the reserved rendering range is a top-shape type. The vertical_range field may represent a vertical range of the reserved rendering range when a type of the reserved rendering range is a top-shape type. When the reserved rendering range is symmetric about a user position represented by the center_X field, the center_Y field, and the center_Z field, the vertical range field may be defined, and the vertical_range field may represent a distance from the user position to a boundary point of a vertical direction.

Alternatively, when the reserved_range_type field represents that the type of the reserved rendering range is a top-shape type, a vertical_range top end field and a vertical_range_bottom_end field may be delivered instead of the vertical_range field. The vertical_range_top_end field may represent an upper boundary point of the reserved rendering range located at the vertical axis of the user position, and the vertical_range_bottom_end field may represent a lower boundary point of the reserved rendering range located at the vertical axis of the user position.

The distance_to_top_endpoint field may be transferred when a form of the reserved rendering range is set only in the vertical axis direction. That is, the distance_to_top_endpoint field may be delivered when the reserved_range_type field represents that the type of the reserved rendering range is an elevation direction type. The distance_to_top_endpoint field may represent an upper boundary point of a reserved rendering range located at a vertical axis of a user position represented by the center_X field, the center_Y field, and the center_Z field.

The distance_to_bottom_endpoint field may be delivered when a form of the reserved rendering range is set only in the vertical axis direction. That is, the distance_to_bottom_endpoint field may be delivered when the reserved_range_type field represents that the type of the reserved rendering range is an elevation direction type. The distance_to_bottom_endpoint field may represent a lower boundary point of a reserved rendering range located at a vertical axis of a user position represented by the center_X field, the center_Y field, and the center_Z field.

The distance_to_left_endpoint field may be delivered when a form of the reserved rendering range is set only in the horizontal axis direction. That is, the distance_to_left_endpoint field may be delivered when the reserved_range_type field indicates that the type of the reserved rendering range is a lateral direction type. The distance_to_left_endpoint field may represent a left boundary point of a reserved rendering range positioned at a horizontal axis of a user position represented by the center_X field, the center_Y field, and the center_Z field.

The distance_to_right_endpoint field may be delivered when a form of the reserved rendering range is set only in the horizontal axis direction. That is, the distance_to_right_endpoint field may be delivered when the reserved_range_type field indicates that the type of the reserved rendering range is a lateral direction type. The distance_to_right_endpoint field may represent a right boundary point of a reserved rendering range located at a horizontal axis of a user position represented by the center_X field, the center_Y field, and the center_Z field.

The distance_to_front_endpoint field may be delivered when a form of the reserved rendering range is set only in the front-rear direction. That is, the distance_to_front_endpoint field may be delivered when the reserved_range_type field represents that the type of the reserved rendering range is a longitude direction type. The distance_to_front_endpoint field may represent a front boundary point of a reserved rendering range located at the front-rear direction axis of the user position represented by the center_X field, the center_Y field, and the center_Z field.

The distance_to_back_endpoint field may be delivered when a form of the reserved rendering range is set only in the front-rear direction. That is, the distance_to_back_endpoint field may be delivered when the reserved_range_type field represents that the type of the reserved rendering range is a longitudinal direction type. The distance_to_back_endpoint field may represent a rear boundary point of a reserved rendering range located at the front-rear direction axis of a user position represented by the center_X field, the center_Y field, and the center_Z field.

When a form of a reserved rendering range is set to a reserved rendering area having the above-described form in a region intended by a producer or a region including a video or an image, the vertex_X[ ] field, the vertex_Y[ ] field, and the vertex_Z[ ] field may be delivered. That is, the vertex_X[ ] field, the vertex_Y[ ] field, and the vertex_Z[ ] field may be delivered when the reserved_range_type field represents that a type of a reserved rendering range is a user defined type. The vertex_X[ ] field, the vertex_Y[ ] field, and the vertex_Z[ ] field may represent a vertex of the reserved rendering range. In this case, a form of the reserved rendering range based on the vertex_X[ ] field, the vertex_Y[ ] field, and the vertex_Z[ ] field may be derived as a vertex-based atypical form. That is, the reserved rendering range may be defined in a form in which a combination of each position represented by the vertex_X[ ] field, the vertex_Y[ ] field, and the vertex_Z[ ] field is connected.

When the sphere_radius field is a whole sphere rendering type that renders a new 360-degree video or image in the entire 3D space (i.e., entire sphere) at a user position (reserved rendering position) in which the reserved rendering type is moved, the sphere_radius field may be delivered. That is, the sphere_radius field may be delivered when the rendering_type field represents that the reserved rendering type is a whole sphere rendering type. The sphere_radius field may represent a radius of a sphere around each movable position, i.e., a reserved rendering position. The sphere may mean a 3D space in which a 6DoF video or image for the reserved rendering position is rendered.

The preliminary_viewport_yaw field, the preliminary_viewport_pitch field, and the preliminary_viewport_roll field may be delivered when a reserved rendering type is a partial viewport rendering type that renders only a partial viewport defined to a midpoint, a horizontal range, and a vertical range designated as a specific yaw, pitch, and roll. That is, the preliminary_viewport_yaw field, the preliminary_viewport_pitch field, and the preliminary_viewport_roll field may be delivered when the rendering_type field represents that the reserved rendering type is a partial viewport rendering type. The preliminary_viewport_yaw field, the preliminary_viewport_pitch field, and the preliminary_viewport_roll field may represent a yaw value, a pitch value, and a roll value of the midpoint of the partial viewport in which the 6DoF video or image for the reserved rendering position is rendered.

The preliminary_hor_range field and the preliminary_ver_range field may be delivered when a reserved rendering type is a partial viewport rendering type that renders only a partial viewport defined to a midpoint, a horizontal range, and a vertical range designated to a specific yaw, pitch, and roll. That is, the preliminary_hor_range field and the preliminary_ver_range field may be delivered when the rendering_type field represents that the reserved rendering type is a partial viewport rendering type. The preliminary_hor_range field and the preliminary_ver_range field may represent a length in a horizontal axis direction and a length in a vertical axis direction of the partial viewport in which a 6DoF video or image for the reserved rendering position is rendered. The value of the Preliminary_hor_range field may have a value between 0 and 720, and the value of the preliminary_ver_range field may have a value between 0 and 180. An area (i.e., partial viewport) in which the 6DoF video or image for the reserved rendering position is rendered may be set based on the preliminary_viewport_yaw field, the preliminary_viewport_pitch field, the preliminary_viewport_roll field, the preliminary_hor_range field, and the preliminary_ver_range field. Further, an area (i.e., partial viewport) in which the 6DoF video or image for the reserved rendering position is rendered may be equal to or larger or smaller than the size of the viewport to be viewed at the user position.

The above 6DoF video related metadata may be included in a SixDOFVideoConfigureationBox. In this case, the SixDOFVideoConfigureationBox may be included as part of ISOBMFF, CFF, etc. according to each embodiment, and when the SixDOFVideoConfigureationBox is included in ISOBMFF, the SixDOFVideoConfigureationBox may be included in another box that is not specified in the present disclosure. In this manner, 6DoF video related metadata may be stored and signaled together with 6DoF video data.

For example, 6DoF video related metadata defined to the SixDOFVideoConfigureationBox may be included in the track header (tkhd) box included in the 'moov' box of ISOBMFF as illustrated in the following table.

TABLE 13

```
aligned(8) class TrackHeaderBox extends FullBox('tkhd', version, flags){
   if (version==1) {
      unsigned int(64)           creation_time;
```

TABLE 13-continued

```
      unsigned int(64)           modification_time;
      unsigned int(32)           track_ID;
      const unsigned int(32)        reserved = 0;
      unsigned int(64)           duration;
   }else { // version==0
      unsigned int(32)           creation_time;
      unsigned int(32)           modification_time;
      unsigned int(32)           track_ID;
      const unsigned int(32)        reserved = 0;
      unsigned int(32)           duration;
   }
   const unsigned int(32)[2]        reserved = 0;
   template int(16)              layer = 0;
   template int(16)              alternate_group = 0;
   template int(16)              volume = {if track_is_audio
                                          0x0100 else 0};
   const unsigned int(16)           reserved = 0;
   template int(32)[9]            matrix=
   {0x00010000,0,0,0,0x00010000,0,0,0,0x40000000};// unity matrix
   unsigned int(32)              width;
   unsigned int(32)              height;
   unsigned int(1)               sdv_flag;
   unsigned int(7)               reserved=0;
   if(sdv_flag == 1){
      SixDOFVideoConfigurationBox        sdv_config;
   }
}
```

Referring to Table 13, the tkhd box may include an sdv_config field having an sdv_flag field and/or a SixDOFVideoConfigureationBox.

The sdv_flag field may be a flag representing whether a 6DoF video is included in the corresponding video track. If a value of the sdv_flag field is 1, 6DoF video data is included in the corresponding video track, and if a value of the sdv_flag field is 0, 6DoF video data may not be included in the corresponding video track. The sdv_config field may exist according to the value of the sdv_flag field.

The sdv_config field may include the above-described 6DoF video related metadata for 6DoF video data included in a corresponding video track.

According to another embodiment of the present disclosure, 6DoF video related metadata defined to the SixDOFVideoConfigureationBox may be included and delivered in a video media header (vmhd) box included in a track box of ISOBMFF. Here, the vmhd box is a lower box of the above-described trak box, and may provide general presentation related information about the corresponding video track. In this case, the vmhd box may similarly include an sdv_config field having an sdv_flag field and/or a SixDOFVideoConfigureationBox. The meaning of each field is as described above.

According to an embodiment, the same 6DoF video related metadata (i.e., the above-described SixDOFVideoConfigureationBox) may be included in the tkhd box and the vmhd box. In this case, the 6DoF video related metadata value defined in the tkhd box may be replaced with the 6DoF video related metadata value defined in the vmhd box.

According to another embodiment of the present disclosure, 6DoF video related metadata defined to a SixDOFVideoConfigureationBox may be included and delivered in a Visual Sample Group Entry.

6DoF video related metadata defined to the SixDOFVideoConfigureationBox may be included in the visual sample group entry as illustrated in the following table.

TABLE 14

```
class VisualSampleEntry(codingname) extends SampleEntry
(codingname){
    unsigned int(16) pre_defined = 0;
    const unsigned int(16) reserved = 0;
    unsigned int(32)[3]                         pre_defined = 0;
    unsigned int(16)                            width;
    unsigned int(16)                            height;
    template unsigned int(32)horizresolution =      // 72 dpi
    0x00480000;
    template unsigned int(32)vertresolution  =      // 72 dpi
    0x00430000;
    const unsigned int(32)                      reserved = 0;
    template unsigned int(16)frame_count = 1;
    string[32]                                  compressorname;
    template unsigned int(16)depth = 0x0018;
    int(16)                                     pre_defined = −1;
    // other boxes from derived specifications
    CleanApertureBox                            clap;// optional
    PixelAspectRatioBox                         pasp;// optional
    unsigned int(1)                             sdv_flag;
    unsigned int(7)                             reserved=0;
    if(sdv_flag == 1){
        SixDOFVideoConfigurationBox             sdv_config;
    }
}
```

Referring to Table 14, the visual sample group entry may include an sdv_flag field and/or an sdv_config field having a SixDOFVideoConfigureationBox. When the same 6DoF video related metadata may be applied to one or more video samples existing in one file or movie fragment, the 6DoF video related metadata may be included and delivered in a visual sample group entry.

According to another embodiment of the present disclosure, when the video stream is fragmented into one or more movie fragments, stored and delivered based on ISOBMFF, 6DoF video related metadata defined to a SixDOFVideo-ConfigureationBox may be included in a track extends (trex) box included in the movie extends(mvex) box of ISOBMFF as illustrated in the following table.

TABLE 15

```
aligned(8) class           TrackExtendsBox extends FullBox('trex', 0, 0){
    unsigned int(32)           track_ID;
    unsigned int(32)           default_sample_description_index;
    unsigned int(32)           default_sample_duration;
    unsigned int(32)           default_sample_size;
    unsigned int(32)           default_sample_flags;
    unsigned int(1) default_sample_sdv_flag;
    unsigned int(7) reserved=0;
    if(default_sample_sdv_flag == 1){
        SixDOFVideoConfigurationBox    default_sample_sdv_config;
    }
}
```

Referring to Table 15, the trex box may include a default_sample_sdv_config field having a default_sample_sdv_flag field and/or SixDOFVideoConfigureationBox.

The default_sample_sdv_flag field may represent whether 6DoF video samples are included in a video track fragment included in a movie fragment. If a value of the default_sample_sdv_flag field is 1, the default_sample_sdv_flag field may represent that 6DoF video samples may be included in a video track of movie fragments by default, and in this case, the default_sample_sdv_flag field may include a SixDOFideoConfigurationBox including 6DoF video related metadata that may be applied to each video sample of the corresponding track fragment.

Further, the default_sample_sdv_config field may include 6DoF video related detailed parameters to be applied to samples included in a track fragment of a movie fragment by default. In this case, the fields included in the SixDOFVideoConfigurationBox may represent the same meaning as the previously proposed content.

According to another embodiment of the present disclosure, when the video stream is fragmented into one or more movie fragments and stored and delivered based on ISOBMFF, 6DoF video related metadata defined to a SixDOFVideoConfigureationBox may be included in a track fragment header (tfhd) box included in the movie fragment (moof) box of ISOBMFF as illustrated in the following table.

TABLE 16

```
aligned(8) class TrackFragmentHeaderBox extends FullBox('tfhd', 0,
tf_flags){
    unsigned int(32)                    track_ID;
    unsigned int(1) sdv_flag;
    unsigned int(7) reserved=0;
    if(omv_flag == 1){
        SixDOFVideoConfigurationBox     sdv_config;
    }
    // all the following are optional fields
    unsigned int(64)                    base_data_offset;
    unsigned int(32)                    sample_description_index;
    unsigned int(32)                    default_sample_duration;
    unsigned int(32)                    default_sample_size;
    unsigned int(32)                    default_sample_flags;
}
```

Referring to Table 16, the tfhd box may include an sdv_flag field and/or an sdv_config field having a SixDOFVideoConfigureationBox.

The sdv_flag field may represent whether a 6DoF video is included in a track fragment included in a movie fragment. When a value of the sdv_flag field is 1, the sdv_flag field may represent that a 6DoF video is included in the corresponding track fragment, and when a value of the sdv_flag field is 0, the sdv_flag field may represent that a 6DoF video is not included in the corresponding track fragment.

Further, the sdv_config field may include 6DoF video related detailed parameters included in a track fragment of a movie fragment. In this case, the fields included in the SixDOFVideoConfigurationBox may represent the same meaning as the previously proposed content.

According to another embodiment of the present disclosure, the sdv_flag field may be omitted, and the default_sample_sdv_config field may be included instead of the sdv_config field.

In this case, the tr_flags field may represent whether 6DoF video related metadata is included in the tfhd box. Specifically, the tr_flags field may represent whether 6DoF video related metadata is included in the tfhd box as illustrated in the following table.

TABLE 17

| tf_flags | Description |
| --- | --- |
| 0x000001 | base-data-offset-present: |
| 0x000002 | sample-description-index-present: |
| 0x000008 | default-sample-duration-present |
| 0x000010 | default-sample-size-present |
| 0x000020 | default-sample-flags-present |
| 0x010000 | duration-is-empty. |
| 0x020000 | default-base-is-moof: |
| 0x400000 | default-sample-omv-configuration-present; |
| 0x800000 | default-sample-sdv-configuration-present; |

Referring to Table 17, when the tr_flags field includes 0x800000, 6DoF video related metadata may be included and delivered in the tfhd box. That is, when the tr_flags field includes 0x800000, the tr_flags field may represent that there is a default value of 6DoF video related metadata associated with a video sample included in a track fragment within a movie fragment. In this case, default 6DoF video related metadata applied to a video sample may be stored and signaled as follows. A value other than 0x800000 may be allocated to the tr_flags field representing that 6DoF video related metadata is included in the tfhd box.

The tfhd box in which the sdv_flag field is omitted and the default_sample_sdv_config field is included instead of the sdv_config field may be derived as illustrated in the following table.

TABLE 18

```
aligned(8) class TrackFragmentHeaderBox extends FullBox('tfhd' 0, tf_flags){
    unsigned int(32)            track_ID;
    // all the following are optional fields
    unsigned int(64)            base_data_offset;
    unsigned int(32)            sample_description_index;
    unsigned int(32)            default_sample_duration;
    unsigned int(32)            default_sample_size;
    unsigned int(32)            default_sample_flags;
    SixDOFVideoConfigurationBox default_sample_sdv_config;
}
```

The default_sample_sdv_config field may include 6DoF video related detailed parameters to be applied to samples included in a track fragment of a movie fragment by default. In this case, the fields included in the SixDOFVideoConfigurationBox may represent the same meaning as the previously proposed content.

According to another embodiment of the present disclosure, when a track run box exists in a track fragment box within one or more movie fragments, 6DoF video related metadata that may be commonly applied to video samples included in the track fragment may be stored and signaled as follows. The 6DoF video related metadata may have the same meaning as the fields of SixDOFVideoConfigurationBox proposed in the tfhd box.

When a track run box exists in a track fragment box in one or more movie fragments, the tr_flags field may represent whether 6DoF video related metadata is included in the trun box. Specifically, the tr_flags field may represent whether 6DoF video related metadata is included in a trun box as illustrated in the following table.

TABLE 19

| tr_flags | Description |
| --- | --- |
| 0x000001 | data-offset-present. |
| 0x000004 | first-sample-flags-present; |
| 0x000100 | sample-duration-present: |
| 0x000200 | sample-size-present: |
| 0x000400 | sample-flags-present; |
| 0x000800 | sample-composition-time-offsets-present; |
| 0x004000 | sample-omv-configuration-present; |
| 0x008000 | omv-configuration-present; |
| 0x010000 | sample-sdv-configuration-present; |
| 0x020000 | sdv-configuration-present; |

Referring to Table 19, when a value of the tr_flags field is 0x020000, the tr_flags field may represent that there is 6DoF video related metadata that may be commonly applied to video samples included in the track fragment. Further, when a value of the tr_flags field is 0x010000, the tr_flags field may represent that 6DoF video related metadata applied to each video sample exists within the track fragment. A value other than the above-described value may be allocated to the tr_flags field representing that 6DoF video related metadata is included in the trun box.

When a value of the tr_flags field is 0x020000, the sdv_config field for SixDOFVideoConfigurationBox commonly applied to video samples included in the track fragment may be included in the trun box as illustrated in the following table.

TABLE 20

```
aligned(8) class TrackFragmentHeaderBox extends FullBox('trun', version, tr_flags) {
    unsigned int(32)            sample_count;   // the following are optional fields
    signed int(32)              data_offset;
    unsigned int(32)            first_sample_flags;
    SixDOFVideoConfigurationBox sdv_config;
    // all fields in the following array are optional
    {
        unsigned int(32)        sample_duration;
        unsigned int(32)        sample_size;
        unsigned int(32)        sample_flags;
        if (version == 0)
        {
            unsigned int(32)    sample_composition_time_offset;
        }else {
            signed int(32)      sample_composition_time_offset;
        }
    }[ sample_count ]
}
```

When a value of the tr_flags field is 0x010000, the sdv_config field for SixDOFVideoConfigurationBox applied to each video sample within the track fragment may be included in the trun box as illustrated in the following table.

TABLE 21

```
aligned(8) class TrackFragmentHeaderBox extends FullBox('trun', version,
tr_flags) {
  unsigned int(32)              sample_count; //the following are optional
  fields
  signed int(32)                data_offset;
  unsigned int(32)              first_sample_flags;
  // all fields in the following array are optional
  {
    unsigned int(32)            sample_duration;
    unsigned int(32)            sample_size;
    unsigned int(32)            sample_flags;
    if (version == 0)
    {
      unsigned int(32)          sample_composition_time_offset;
    }else {
      signed int(32)            sample_composition_time_offset;
    }
    SixDOFVideoConfigurationBox   sdv_config;
  }[ sample_count ]
}
```

According to another embodiment of the present disclosure, when the same 6DoF video related metadata is applied to one or more video samples existing in one file or movie fragment, 6DoF video related metadata defined to the SixDOFVideoConfigureationBox may be added to a visual sample group entry as illustrated in the following table.

TABLE 22

```
class VisualSampleGroupEntry (unsigned int(32) grouping_type) extends SampleGroupEntry
(grouping_type)
  unsigned int(1) sdv_flag;
  unsigned int(7) reserved=0;
  if(omv_flag == 1){
    SixDOFVideoConfigurationBox   sdv_config;
  }
}
```

Referring to Table 22, the visual sample group entry may include an sdv_flag field and/or an sdv_config field having a SixDOFVideoConfigureationBox.

The sdv_flag field may represent whether a sample group is a 6DOF video sample group. For example, when a value of the sdv_flag field is 1, the sdv_flag field may represent that the corresponding sample group is a 6DoF video sample group, and when a value of the sdv_flag field is 0, the sdv_flag field may represent that the corresponding sample group is not a 6DoF video sample group.

The sdv_config field may include metadata of 6DoF video that may be commonly applied to 6DoF video samples included in the sample group. For example, as described above, using the initial_view_yaw_degree field, the initial_view_pitch_degree field, the initial_view_roll_degree field, the initial_center_FB_delta field, the initial_center_UD_delta field, and the initial_center_RL_delta field of the SixDOFVideoConfigurationBox, an initial view and an initial center of the initial view of the video associated with each sample group, i.e., a position (center position) of the initial view may be set.

According to another embodiment of the present disclosure, when one video frame is divided into one or more regions and coded, and when the corresponding region data are stored through one or more tracks, the previously proposed SixDOFVideoConfigurationBox may be included in a box associated with each track. However, when the SixDOFVideoConfigurationBox is included in only one specific track of the tracks and when the SixDOFVideoConfigurationBox is not included in the remaining tracks, a field indicating a track including the SixDOFVideoConfigurationBox may be included as a 'sdvb' track reference type in the TrackReferenceTypeBox of the tracks not including the SixDOFVideoConfigurationBox. Here, the 'sdvb' track reference type may refer to a track in which tracks including data of regions constituting one 6DoF video refer to a basic base layer through a track_IDs field when decoding. That is, the track_IDs field may represent a track including the SixDOFVideoConfigurationBox.

A TrackReferenceTypeBox including the track_IDs field may be represented as in the following table.

TABLE 23

```
aligned(8) class TrackReferenceBox extends Box('tref') {
}
aligned(8) class TrackReferenceTypeBox (unsigned int(32) refefence_type) extends Box(reference_type) {
   unsigned int(32) track_IDs[ ];
}
```

A type of a track reference indicated by the track_IDs field included in the TrackReferenceTypeBox may be represented as the following table.

TABLE 24

| Track Reference | Description |
| --- | --- |
| 'hint' | The referenced track(s) contain the original media for this hint track |
| 'cdsc' | This track describes the referenced track |
| 'font' | This track uses fonts carried/defined in the referenced track |
| 'hind' | This track depends on the referenced hint track i.e., it should only be used if the referenced hint track is used |
| 'vdep' | This track contains auxiliary depth video information for the referenced video track |
| 'vplx' | This track contains auxiliary parallax video information for the referenced video track |
| 'subt' | This track contains subtitle, timed text or overlay graphical information for the referenced track or any track in the alternate group to which the track belongs, if any. |
| 'sdvb' | This track contains information related to Six DoF contents for the referenced track or any track in the alternate group to which the track belongs, if any |

Referring to Table 24, when a type of the track reference indicated by the track IDs field is a 'hint' type, the track indicated by the track_id field may include original media of the corresponding track. The corresponding track may be referred to as a hint track.

Further, when a type of the track reference indicated by the track_IDs field is a 'cdsc' type, the corresponding track may describe a track indicated by the track id field.

Further, when a type of the track reference indicated by the track_IDs field is a 'font' type, the corresponding track may use a font transmitted through a track indicated by the track_id field or a font defined in a track indicated by the track_id field.

Further, when a type of the track reference indicated by the track_IDs field is a 'hind' type, the corresponding track may refer to the hint track. Therefore, the 'hind' type may be represented only when the hint track is used.

Further, when a type of the track reference indicated by the track_IDs field is a 'vdep' type, it may be indicated that the corresponding track includes auxiliary depth video information for the track indicated by the track_IDs field of the TrackReferenceTypeBox.

Further, when a type of the track reference indicated by the track_IDs field is a 'vplx' type, it may be indicated that the corresponding track includes auxiliary parallax video information for the track indicated by the track_IDs field of the TrackReferenceTypeBox.

Further, when a type of the track reference indicated by the track_IDs field is a 'subt' type, it may be indicated that the corresponding track includes a subtitle, timed text, and overlay graphical information for the track indicated by the track_IDs field of the TrackReferenceTypeBox. Alternatively, it may be indicated that the corresponding track includes a subtitle, a timed text, and overlay graphical information for all tracks of an alternate group including the corresponding track.

Further, when a type of the track reference indicated by the track_IDs field is a 'sdvb' type, the track_IDs field may represent a specific track carrying the above-described 6DoF video related metadata. Specifically, each track including respective regions may require basic base layer information among 6DoF video related metadata when decoded. The track_IDs field may represent a specific track carrying the base layer information. The base layer information may be referred to as basic information.

In the 6DoF video service, because the user views only a partial area of the video according to the user's view, the previously proposed metadata may be used for supporting decoding or rendering according to the user's view and position.

Further, all information present in metadata related to a video track or a sample for the above-described 6DoF video may be defined in the DASH MPD or SEI of HEVC/AVC.

Figure 21:
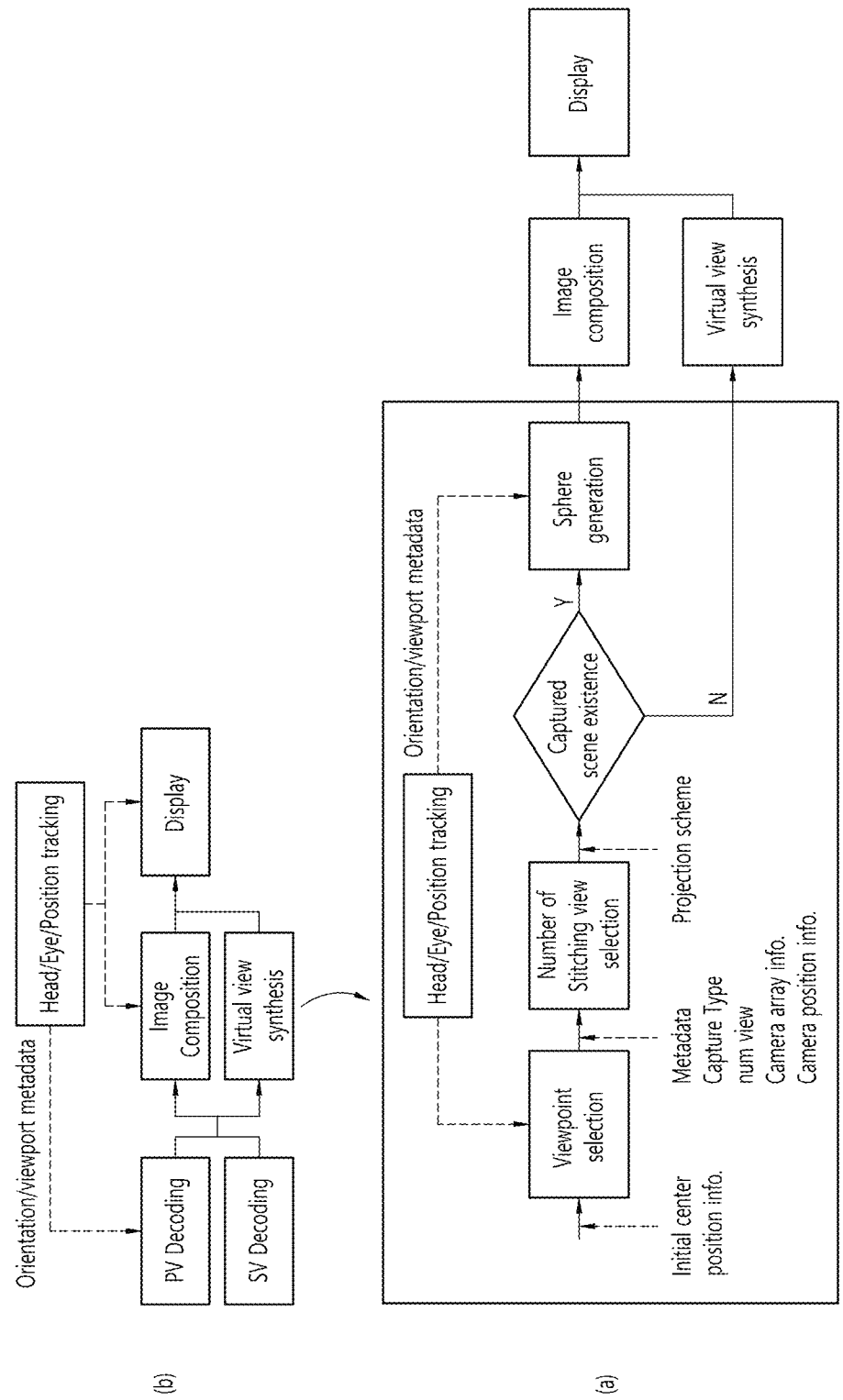
FIG. 21 illustrates an operation of using camera information metadata and stitching metadata in a 6DoF video receiving apparatus.

FIG. 21 illustrates an operation of using camera information metadata and stitching metadata in a 6DoF video receiving apparatus.

Referring to FIG. 21A, the 6DoF video receiving apparatus may decode a video or an image for each of a primary view (PV) and a secondary view (SV). Alternatively, decoding on the video or image may be performed regardless of view classification.

Further, the 6DoF video receiving apparatus may perform an image composition and rendering process. As described above, the process is a process for rendering an image centered on the user position, and the 6DoF video receiving apparatus may use the decoded 6DoF video data according to the user position and gaze or may render a video and an image around the user generated with virtual viewpoint generation/composition. Next, the 6DoF video receiving apparatus may display the rendered video. Further, as described above, head, position, gaze, and viewport information of the user may be acquired and processed through head/position/eye tracking, and the decoded 6DoF video data according to the position and gaze of the user may be image composed, rendered, and displayed based on the head, position, gaze, and viewport information of the user.

As illustrated in FIG. 21(b), in the decoded image, a captured scene using as an image stitched according to a viewpoint may be changed, and in this case, the 6DoF video receiving apparatus may select an appropriate image using metadata corresponding to the viewpoint the number of images to be stitched after selecting the viewpoint, the number of captured scenes to be used in this case, and a camera array type and camera position information of the captured image. When there is an image to be stitched, i.e., a captured scene, a sphere generation process is performed that generates a 3D space in which the captured scene is to be stitched, and the sphere generation may use projection scheme information and sphere radius information as metadata. The 6DoF video receiving apparatus may compose and display an image of the selected viewpoint. When there is no captured scene to be stitched at the corresponding viewpoint, the 6DoF video receiving apparatus may display the image after virtual view synthesis based on the images of the neighboring viewpoints of the viewpoint.

Thereby, a 6DoF content according to a position movement of the user may be provided, and an immersive media/realistic media experience may be provided to the user.

Further, by signaling stitching information about the corresponding viewpoint, even when there is no captured 6DoF video at the corresponding viewpoint, a 6DoF video of the specific position may be generated and provided to the user based on the 6DoF video of a peripheral position of the corresponding viewpoint and the 6DoF content may be more efficiently provided.

Figure 22:
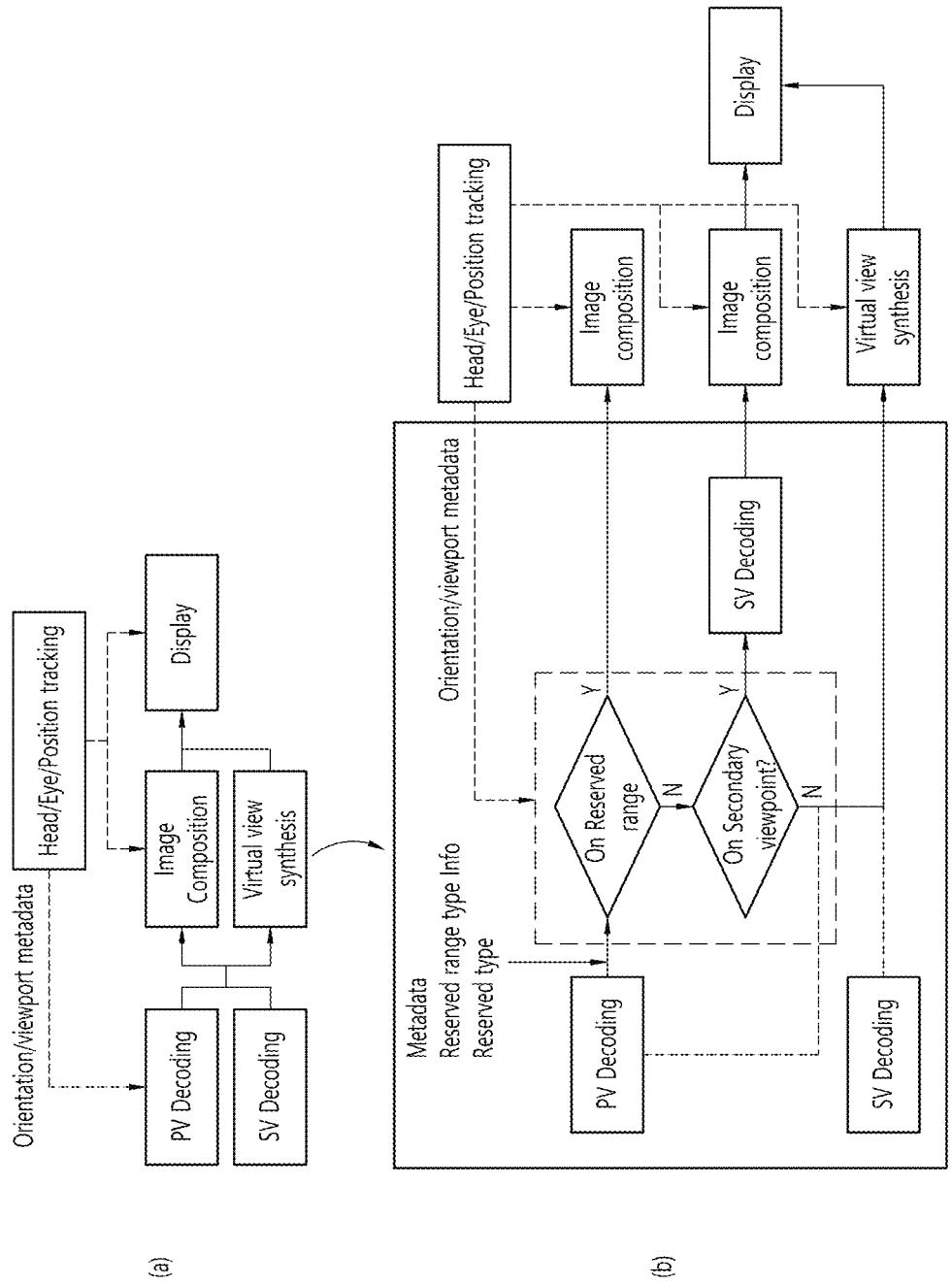
FIG. 22 illustrates an operation in which re-projection information metadata is used in a 6DoF video receiving apparatus.

FIG. 22 illustrates an operation in which re-projection information metadata is used in a 6DoF video receiving apparatus. The re-projection information metadata may be referred to as rendering information metadata. As described above, the process is a process of rendering an image centered on the user position, and the 6DoF video receiving apparatus may use the decoded 6DoF video data according to the user position and gaze or may render video and images around the user generated with virtual view generation/composition. Next, the 6DoF video receiving apparatus may display the rendered video. Further, as described above, head, position, gaze, and viewport information of the user may be acquired and processed through head/position/eye tracking, and the decoded 6DoF video data according to the position and gaze of the user may be image composed, rendered, and displayed based on the head, position, gaze, and viewport information of the user.

As illustrated in FIG. 22(b), decoding may be performed with divided into a 6DoF video for a PV and a 6DoF video for an SV. In this case, the 6DoF video receiving apparatus may first perform PV decoding and then map the user position based on metadata of information (Reserved_range_Type_info) about a reserved rendering range and information about the rendering type to determine whether the user position is included on the reserved rendering range.

When the user position exists on the reserved rendering range, the 6DoF video receiving apparatus may compose and display an image of the viewpoint. When the user position is not located on the reserved rendering range but is located at a viewpoint corresponding to the SV, the 6DoF video receiving apparatus may perform SV decoding and compose and display an image of the viewpoint. When the user position is located at a viewpoint other than a viewpoint corresponding to the PV and SV, the 6DoF video receiving apparatus may perform both PV decoding and SV decoding, and compose and generate a virtual viewpoint of the corresponding viewpoint with a 6DoF image of the decoded PV and SV, and display an image of the corresponding viewpoint.

According to the present disclosure, by signaling reserved rendering information according to a movement direction provided in the 6DoF content or the predicted position movement direction of the user, the 6DoF content to be provided to the user may be delivered and rendered preferentially, and the 6DoF content can be provided more efficiently.

Figure 23:
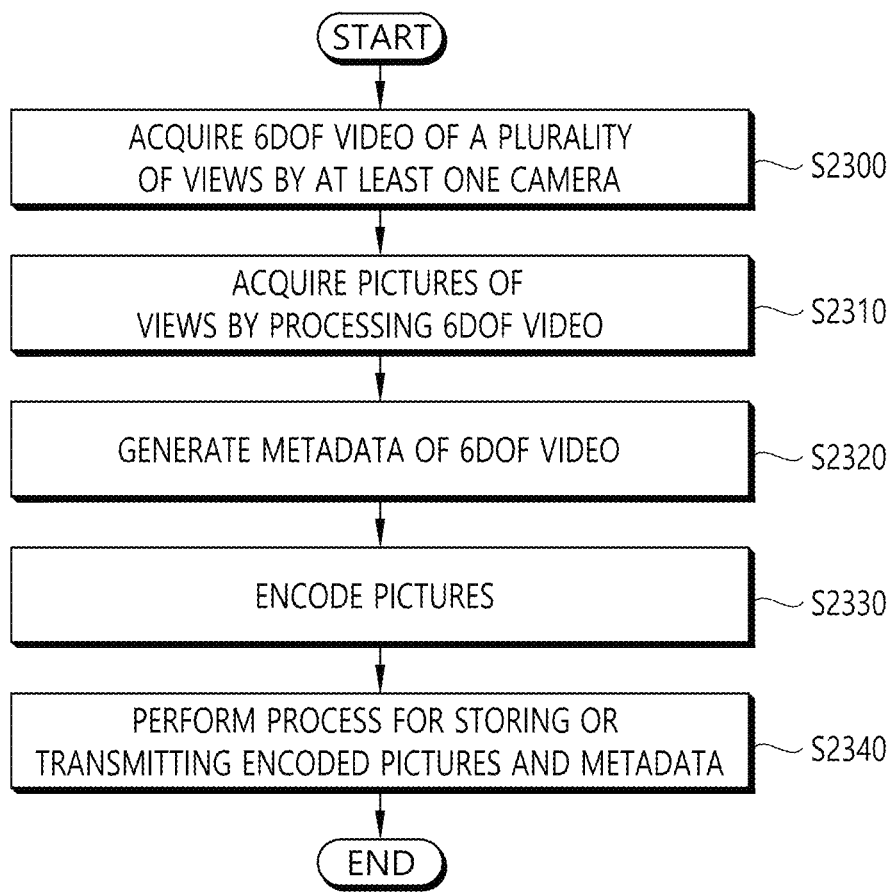
FIG. 23 schematically illustrates a 6DoF video data processing method by a 6DoF video transmitting apparatus according to the present disclosure.

FIG. 23 schematically illustrates a 6DoF video data processing method by the 6DoF video transmitting apparatus according to the present disclosure. The method disclosed in FIG. 23 may be performed by the 6DoF video transmitting apparatus disclosed in FIG. 14. Specifically, for example, S2300 of FIG. 23 may be performed by the data inputter of the 6DoF video transmitting apparatus, S2310 may be performed by the projection processor of the 6DoF video transmitting apparatus, S2320 may be performed by the metadata processor of the 6DoF video transmitting apparatus, S2330 may be performed by the data encoder of the 6DoF video transmitting apparatus, and S2340 may be performed by the transmission processor of the 6DoF video transmitting apparatus. The transmission processor may be included in the transmitter.

The 6DoF video transmitting apparatus acquires a 6DoF video of a plurality of views by at least one camera (S2300). The 6DoF video transmitting apparatus may acquire a 6DoF video of a plurality of views captured by at least one camera. Further, the 6DoF video transmitting apparatus may acquire a 6DoF video of a plurality of views by at least one camera.

The 6DoF video transmitting apparatus processes the 6DoF video to acquire pictures of the views (S2310). The 6DoF video transmitting apparatus may perform a projection of a 2D image according to a projection scheme of the 6DoF video among various projection schemes, and acquire a projected picture. The various projection schemes may include an equirectangular projection scheme, a cylindrical projection scheme, a cube projection scheme, and a panoramic projection scheme. Further, the projection schemes may include any user defined projection scheme. Further, the projection schemes may further include projection schemes other than the above-described projection schemes. The projected picture may include regions representing surfaces of the 3D projection structure of the projection scheme.

Further, the 6DoF video transmitting apparatus may perform processing such as rotating and rearranging each of regions of the projected picture, changing the resolution of each region, and the like. The process may be referred to as the region-wise packing process.

The 6DoF video transmitting apparatus may not apply a region-wise packing process to the projected picture. Alternatively, the 6DoF video transmitting apparatus may apply a region-wise packing process to the projected picture and acquire the packed picture including a region to which the region-wise packing process is applied.

Further, the 6DoF video transmitting apparatus may perform a stitching process of a specific view and derive the pictures of the specific view. For example, the 6DoF video transmitting apparatus may derive at least one stitching target view and derive captured scenes for the stitching target view. The 6DoF video transmitting apparatus may stitch the captured scenes and process the stitched captured scenes to derive a picture of the stitching target view, and generate the camera information and the stitching information.

The 6DoF video transmitting apparatus may derive a reserved rendering range for the user position. In this case, the 6DoF video transmitting apparatus may generate rendering information about the reserved rendering range.

The 6DoF video transmitting apparatus generates metadata of the 6DoF video (S2320). The metadata may include the above-described camera_info_flag_field, num_view field, Camera_capture_array_row field, Camera_capture_array_col field, Baseline_length field, Master_camera_ID field, camera_center_pitch field, camera_center_yaw field, camera_center_roll field, camera_center_FB field, camera- _center_UD field, camera_center_RL field, num_view_center field, position_center_X field, position_center_Y field, position_center_Z field, num_camera field, stitching_radius field, position_center_yaw field, position_center_roll field, position_center_pitch field, position_center_distance field, initial_view_yaw_degree field, initial_view_pitch_degree field, initial_view_roll_degree field, initial_center_FB_delta field, initial_center_UD_delta field, initial_center_RL_delta field, content_fov_flag field, capture_info_flag field, region_info_flag_field, content_hfov field, content_vfov field, reserved_rendering_range_flag field, rendering_type field, reserved_range_type field, center_X field, center_Y field, center_Z field, step_size field, sphere_radius_to_boundary field, horizontal_range field, vertical_range field, distance_to_top_endpoint field, distance_to_bottom_endpoint field, distance_to_left_endpoint field, distance_to_right_endpoint field, distance_to_front_endpoint field, distance_to_back_endpoint field, vertex_X[ ] field, vertex_Y[ ] field, vertex_Z[ ] field, sphere_radius field, preliminary_viewport_yaw field, preliminary_viewport_pitch field, preliminary_viewport_roll field, preliminary_hor_range field and/or preliminary_ver_range field. The meanings of the fields are as described above.

Specifically, as an example, the metadata may include camera information and stitching information that captures a 6DoF video.

The camera information may include information representing a camera ID of a view to be the origin, camera array information, information representing the number of views captured by the camera, information representing a column of a camera array, information representing a row of a camera array, information representing a distance between cameras, and/or position information of the views.

Information representing a camera ID of the view to be the origin may represent the Master_camera_ID field, the camera array information may represent the Capture_type field, and information representing the number of views captured by the camera may represent the num view field, information representing a column of a camera array may represent the Camera_capture_array_row field, information representing a row of a camera array may represent the Camera_capture_array_col field, and information representing a distance between cameras may represent a Baseline_length field.

Position information of the views may include information representing a yaw value of a midpoint of a 6DoF video of the corresponding view, information representing a pitch value of a midpoint of a 6DoF video of the corresponding view, information representing a roll value of a midpoint of a 6DoF video of the corresponding view, information representing a component of the front and rear direction axis of the corresponding view position, information representing a component of the up and down direction axis of the corresponding view position, and/or information representing a component of the left and right direction axis of the corresponding view position. Here, the fore and aft direction axis may represent a y-axis, the left and right direction axis may represent an x axis, and the up and down direction axis may represent a z axis. Information representing a yaw value of a midpoint of the 6DoF video of the corresponding view may represent the camera_center_yaw field, information representing a pitch value of a midpoint of the 6DoF video of the corresponding view may represent the camera_center_pitch field, information representing a roll value of a midpoint of the 6DoF video of the corresponding view may represent the camera_center_roll field, information representing a component of the forward and backward axis of the corresponding view position may represent the camera_center_FB field, and information representing a component of an up-down direction axis of the corresponding view position may represent the camera_center_UD field, and information representing a component of a left-right direction axis of the corresponding view position may represent the camera_center_RL field.

The camera array information may represent a camera array type used for capturing the 6DoF video. Here, the camera array type may be one of a High Density Camera Array (HDCA), a Low Density Camera Array (LDCA), a microlens, an omnidirectional camera, a movement camera, and a user defined array.

Specifically, for example, when a value of the camera array information is 0, the camera array information may represent the HDCA as a camera array type of the 6DoF video. Further, when a value of the camera array information is 1, the camera array information may represent the LDCA as the camera array type of the 6DoF video. Further, when a value of the camera array information is 2, the camera array information may represent the microlens as a camera array type of the 6DoF video. Further, when a value of the camera array information is 3, the camera array information may represent the omnidirectional camera as the camera array type of the 6DoF video. Further, when a value of the camera array information is 4, the camera array information may represent the movement camera as the camera array type of the 6DoF video. Further, when a value of the camera array information is 5, the camera array information may represent the user defined arrangement as the camera array type of the 6DoF video.

Further, the metadata may include a flag representing whether the camera information is delivered, and when a value of the flag is 1, the metadata may include the camera information. A flag representing whether the camera information is delivered may represent the camera_region_info_flag field.

Further, the stitching information may include information representing the number of stitching target views and position information of the stitching target views. The position information of the stitching target view may include information representing an x component of the stitching target view position, information representing a y component of the stitching target view position, information representing a z component of the stitching target view position, and information representing a distance between the stitching target view position and the stitching 6DoF video or image. Alternatively, the position information of the stitching target view may include information representing a yaw component of the stitching target view position, information representing a pitch component of the stitching target view position, information representing a roll component of the stitching target view position, information representing a distance between the stitching target view position and the stitching 6DoF video or image, and information representing the number of the stitching 6DoF video or image.

Information representing the number of the stitching target views may represent the num_view_center field, information representing an x component of the stitching target view position may represent the position_center_X field, and information representing a y component of the stitching target view position may represent the position_center_Y field, information representing a z component of the stitching target view position may represent the position_center_Z field, information representing a distance between the stitching target view position and a stitching 6DoF video or image may represent the stitching_radius field, and information representing the number of stitching 6DoF videos or images may represent the num_camera field. Information representing a yaw component of the stitching target view position may represent the position_center_yaw field, and information representing a pitch component of the stitching target view position may represent the position_center_pitch field, and information representing a roll component of the stitching target view position may represent the position_center_roll field.

Further, the stitching information may include a flag representing whether a stitching process for deriving the image is performed. When a value of the flag is 1, a stitching process may be performed to derive an image of the user position. When a value of the flag is 0, a stitching process may not be performed to derive the image. A flag representing whether a stitching process for deriving the image is performed may represent the stitching_flag field.

Further, the metadata may include rotation information about an initial view of the 6DoF video and position information about an initial view of the 6DoF video. Here, the initial view may represent a view provided initially of the 6DoF video, and the user position when the 6DoF video is first provided may be derived as a position of the initial view.

Rotation information about the initial view of the 6DoF video may include information representing a yaw value of a midpoint of the initial view, information representing a pitch value of a midpoint of the initial view, and information representing a roll value of a midpoint of the initial view. Position information of the initial view of the 6DoF video may include information representing a component of the forward and backward axis of a position of the initial view, information representing a component of the left and right axis of a position of the initial view, and information representing a component of an up and down direction axis of a position of the initial view. Information representing a yaw value of a midpoint of the initial view may represent the initial_view_yaw_degree field, and information representing a pitch value of a midpoint of the initial view may represent the initial_view_pitch_degree field, information representing a roll value for a midpoint of the initial view may represent the initial_view_yaw_roll field, information representing a component of the forward and backward axis of a position of the initial view may represent the initial_center_FB_delta field, information representing a component of the left and right axis of the position of the initial view may represent an initial_center_LR_delta field, and information representing a component of an up and down axis of a position of the initial view may represent an initial_center_UD_delta field.

Further, the metadata may include field of view (FOV) information. The FOV information may include information representing a horizontal direction value of the FOV and/or information representing a vertical direction value of the FOV. A size of the viewport may be derived based on the FOV information, and the viewport may represent an area in which the user is viewing in a 6DoF video, i.e., a displayed area. Information representing a horizontal direction value of the FOV may represent the content_hfov field, and information representing a vertical direction value of the FOV may represent the content_vfov field.

Further, the metadata may include a flag representing whether the FOV information is delivered. When a value of the flag is 1, the metadata may include the FOV information, and when a value of the flag is 0, the metadata may not include the FOV information. A flag representing whether the FOV information is delivered may represent the content_fov_flag field.

Further, the metadata may include rendering information. The rendering information may include information representing a type of the reserved rendering range and information representing a user position. Information representing the user position may include information representing an x component of the user position, information representing a y component of the user position, and information representing a z component of the user position. Information representing a type of the reserved rendering range may represent the reserved_range_type field, information representing an x component of the user position may represent the center_X field, information representing a y component of the user position may represent the center_Y field, information representing a z component of the user position may represent the center_Z field.

A type of the reserved rendering range may be one of a sphere type formed with the same radius around the user position, a top-shape type formed horizontally and vertically around the user position, an elevation direction type in which a range of a movement is vertically formed around the user position, a lateral direction type that forms a range that advances or retracts around a user position, a longitudinal direction type that forms a range that moves to the left or the right around a user position, and a user defined type in which a free form range is formed.

Specifically, for example, when a value of information representing a type of the reserved rendering range is 0, information representing a type of the reserved rendering range may represent the sphere type as a type of the reserved rendering range of the 6DoF video. Further, when a value of information representing a type of the reserved rendering range is 1, information representing a type of the reserved rendering range may represent the top-shape type as a type of the reserved rendering range of the 6DoF video. Further, when a value of information representing a type of the reserved rendering range is 2, information representing a type of the reserved rendering range may represent the elevation direction type as a type of the reserved rendering range of the 6DoF video. Further, when a value of information representing a type of the reserved rendering range is 3, information representing a type of the reserved rendering range may represent the lateral direction type as a type of the reserved rendering range of the 6DoF video. Further, when a value of information representing a type of the reserved rendering range is 4, information representing a type of the reserved rendering range may represent the longitude direction type as a type of the reserved rendering range of the 6DoF video. Further, when a value of information representing a type of the reserved rendering range is 5, information representing a type of the reserved rendering range may represent the user defined type as a type of the reserved rendering range of the 6DoF video.

When a type of the reserved rendering range is derived as the spear type, the rendering information may include information representing a radius of the reserved rendering range. Information representing a radius of the reserved rendering range may represent the sphere_radius_to_boundary field.

Further, when a type of the reserved rendering range is derived as the top-shape type, the rendering information may include information representing a horizontal range of the reserved rendering range and/or information representing a vertical range of the reserved rendering range. Information representing a horizontal range of the reserved rendering range may represent the horizontal_range field, and information representing a vertical range of the reserved rendering range may represent the vertical_range field. Alternatively, when a type of the reserved rendering range is derived as the top-shape type, the rendering information may include information representing a left boundary point of a reserved rendering range located at a horizontal axis of the user position, information representing a right boundary point of a reserved rendering range located at a horizontal axis of the user position, information representing an upper boundary point of a reserved rendering range located at a vertical axis of the user position, and/or a lower boundary point of a reserved rendering range located at a vertical axis of the user position. Information representing a left boundary point of a reserved rendering range located at the horizontal axis of the user position may represent the horizontal_range_left_end field, information representing a right boundary point of a reserved rendering range located at the horizontal axis of the user position may represent the horizontal_range_right_end field, information representing an upper boundary point of a reserved rendering range located at the vertical axis of the user position may represent the vertical_range_top_end field, and information representing a lower boundary point of a reserved rendering range located at the vertical axis of the user position may represent the vertical_range_bottom_end field.

Further, when a type of the reserved rendering range is derived as the elevation direction type, the rendering information may include information representing an upper boundary point of a reserved rendering range located at a vertical axis of the user position and/or information representing a lower boundary point of a reserved rendering range located at a vertical axis of the user position. Information representing an upper boundary point of a reserved rendering range located at a vertical axis of the user position may represent the distance_to_top_endpoint field, and information representing a lower boundary point of a reserved rendering range located at a vertical axis of the user position may represent the distance_to_bottom_endpoint field.

Further, when a type of the reserved rendering range is derived as the lateral direction type, the rendering information may include information representing a left boundary point of a reserved rendering range located at a horizontal axis of the user position and/or information representing a right boundary point of a reserved rendering range located at a horizontal axis of the user position. Information representing a left boundary point of a reserved rendering range located at a horizontal axis of the user position may represent the distance_to_left_endpoint field, and information representing a right boundary point of a reserved rendering range located at a horizontal axis of the user position may represent the distance_to_right_endpoint field.

Further, when a type of the reserved rendering range is derived as the longitude direction type, the rendering information may include information representing a front boundary point of the reserved rendering range located at the forward and backward axis of the user position and/or information representing a back boundary point of a reserved rendering range located at the fore and aft axis of the user position. Information representing a front boundary point of a reserved rendering range located at the front-rear axis of the user position may represent the distance_to_front_endpoint field, and information representing a rear boundary point of a reserved rendering range located at the front-rear axis of the user position may represent the distance_to_back_endpoint field.

Further, when a type of the reserved rendering range is derived as the user defined type, the rendering information may include information representing a vertex of the reserved rendering range. Information representing a vertex of the reserved rendering range may represent the vertex_X[ ] field, the vertex_Y[ ] field, and the vertex_Z[ ] field.

Further, the rendering information may include information representing a distance from the user position to the reserved rendering position in the vicinity. Information representing a distance from the user position to the reserved rendering position in the vicinity may represent the step_size field. As a value of the information decreases, the number of videos or images rendered within the defined reserved rendering range increases, and as a value of the information increases, reserved rendering may be performed sparsely in the reserved rendering range. A value acquired by dividing a distance from the user position to each boundary of the reserved rendering range by the step_size field value may be derived as the number of centers of the reserved rendering position.

Further, the rendering information may include information representing a rendering type of the reserved rendering position. Information representing the rendering type of the reserved rendering position may include the rendering_type field.

The rendering type may be one of a whole sphere rendering type that renders a video or an image in an entire 3D space (i.e., entire sphere) at the reserved rendering position and a partial viewport rendering type that renders the video or image to the partial viewport at the reserved rendering position.

Specifically, for example, when a value of information representing a rendering type of the reserved rendering position is 0, information representing a rendering type of the reserved rendering position may represent the whole sphere rendering type as the rendering type. Further, when a value of information representing a rendering type of the reserved rendering position is 1, information representing a rendering type of the reserved rendering position may represent the partial viewport rendering type as the rendering type.

When the rendering type is derived as the whole sphere rendering type, the rendering information may include information representing a radius of a 3D space (e.g., sphere) in which the video or image of the reserved rendering position is rendered. Information representing a radius of the 3D space may represent the sphere_radius field.

Further, when the rendering type is derived as the partial viewport rendering type, the rendering information may include information representing a yaw value of a midpoint of the partial viewport in which the video or image of the reserved rendering position is rendered, information representing a pitch value of a midpoint of the partial viewport, information representing a roll value of a midpoint of the partial viewport, information representing a horizontal range of the partial viewport, and information representing a vertical range of the partial viewport. Information representing a yaw value of a midpoint of the partial viewport may represent the preliminary_viewport_yaw field, information representing a pitch value of a midpoint of the partial viewport may represent the preliminary_viewport_pitch field, information representing a roll value of a midpoint of the partial viewport may represent the preliminary_viewport_roll field, information representing a horizontal range of the partial viewport may represent the preliminary_hor_range field, and information representing a vertical range of the partial viewport may represent the preliminary_ver_range field. The partial viewport may be derived based on the midpoint, the horizontal range, and the vertical range derived based on the information.

Further, the metadata may include a flag representing whether the rendering information is delivered. When a value of the flag is 1, the metadata may include the rendering information, and when a value of the flag is 0, the metadata may not include the rendering information. A flag representing whether the rendering information is delivered may represent the reserved_rendering_range_flag field.

The metadata may be transmitted through an SEI message. Further, the metadata may be included in an adaptation set, a representation, or a subrepresentation of a media presentation description (MPD). Here, the SEI message may be used for decoding of a 2D image or for assistance in displaying the 2D image in a 3D space.

The 6DoF video transmitting apparatus encodes the pictures (S2330). The 6DoF video transmitting apparatus may encode the pictures. Further, the 6DoF video transmitting apparatus may encode the metadata.

The 6DoF video transmitting apparatus performs a process for storing or transmitting the encoded pictures and the metadata (S2340). The 6DoF video transmitting apparatus may encapsulate the plurality of views of encoded 6DoF video and/or the metadata in the form of a file or the like. The 6DoF video transmitting apparatus may encapsulate the encoded 6DoF video data and/or the metadata in a file format such as ISOBMFF and CFF in order to store or transmit the encoded 6DoF video data and/or the metadata or may process the encoded 6DoF video data and/or the metadata in a form such as other DASH segments. The 6DoF video transmitting apparatus may include the metadata in a file format. For example, the metadata may be included in boxes at various levels on the ISOBMFF file format or may be included as data in separate tracks in the file. Further, the 6DoF video transmitting apparatus may encapsulate the metadata itself into a file. The 6DoF video transmitting apparatus may apply processing for transmission to the 6DoF video data encapsulated according to a file format. The 6DoF video transmitting apparatus may process the 6DoF video data according to any transmission protocol. The processing for transmission may include processing for delivery through a broadcast network or processing for delivery through a communication network such as a broadband. Further, the 6DoF video transmitting apparatus may apply a process for transmission to the metadata. The 6DoF video transmitting apparatus may transmit the transmitted 6DoF video and metadata through a broadcast network and/or a broadband.

Figure 24:
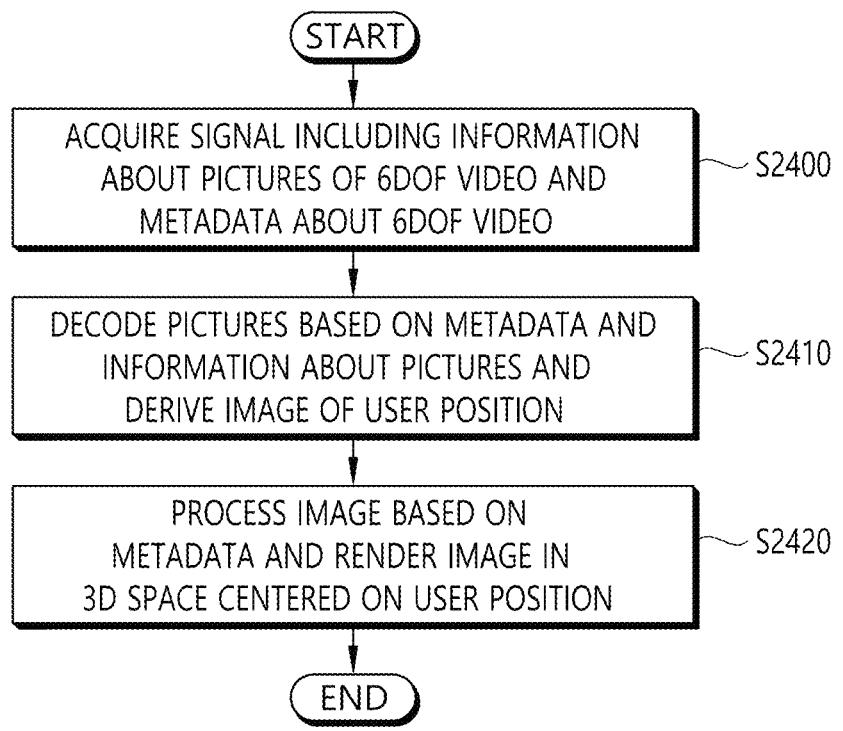
FIG. 24 schematically illustrates a 6DoF video data processing method by a 6DoF video receiving apparatus according to the present disclosure.

FIG. 24 schematically illustrates a 6DoF video data processing method by the 6DoF video receiving apparatus according to the present disclosure. The method disclosed in FIG. 24 may be performed by the 6DoF video receiving apparatus disclosed in FIG. 15. Specifically, for example, S2400 of FIG. 24 may be performed by the receiver and the reception processor of the 6DoF video receiving apparatus, S2410 may be performed by the data decoder of the 6DoF video receiving apparatus, and S2420 may be performed by the renderer of the 6DoF video receiving apparatus.

The 6DoF video receiving apparatus acquires a signal including information about pictures of a 6DoF video and metadata about the 6DoF video (S2400).

The 6DoF video receiving apparatus may receive information about pictures of the 6DoF video signaled from the 6DoF video transmitting apparatus and the metadata through a broadcast network. Further, the 6DoF video receiving apparatus may receive information about the pictures and the metadata through a communication network such as a broadband or a storage medium.

The 6DoF video receiving apparatus may perform processing according to a transmission protocol of the metadata and information about the received pictures. Further, the 6DoF video receiving apparatus may perform a reverse process of processing for transmitting the above-described 6DoF video transmitting apparatus.

Pictures of the 6DoF video may represent pictures mapped with 6DoF video data of a view of the camera captured by the camera.

Further, the metadata may include the above-described camera_info_flag field, num_view field, Camera_capture_array_row field, Camera_capture_array_col field, Baseline_length field, Master_camera_ID field, camera_center_pitch field, camera_center_yaw field, camera_center_roll field, camera_center_FB field, camera_center_UD field, camera_center_RL field, num_view_center field, position_center_X field, position_center_Y field, position_center_Z field, num_camera field, stitching_radius field, position_center_yaw field, position_center_roll field, position_center_pitch field, position_center_distance field, initial_view_yaw_degree field, initial_view_pitch_degree field, initial_view_roll_degree field, initial_center_FB_delta field, initial_center_UD_delta field, initial_center_RL_delta field, content_fov_flag field, capture_info_flag field, region_info_flag field, content_hfov field, content_vfov field, reserved_rendering_range_flag field, rendering_type field, reserved_range_type field, center_X field, center_Y field, center_Z field, step_size field, sphere_radius_to_boundary field, horizontal_range field, vertical_range field, distance_to_top_endpoint field, distance_to_bottom_endpoint field, distance_to_left_endpoint field, distance_to_right_endpoint field, distance_to_front_endpoint field, distance_to_back_endpoint field, vertex_X[ ] field, vertex_Y[ ] field, vertex_Z[ ] field, sphere_radius field, preliminary_viewport_yaw field, preliminary_viewport_pitch field, preliminary_viewport_roll field, preliminary_hor_range field, and/or preliminary_ver_range field. The meanings of the fields are as described above.

Specifically, as an example, the metadata may include camera information and stitching information that captures a 6DoF video.

The camera information may include information representing a camera ID of a view to be an origin, camera array information, information representing the number of views captured by the camera, information representing a column of a camera array, information representing a row of a camera array, information representing a distance between cameras, and/or position information of the views.

Information representing a camera ID of a view to be the origin may represent the Master_camera_ID field, the camera array information may represent the Capture_type field, information representing the number of views captured by the camera may represent the num_view field, information representing a column of a camera array may represent the Camera_capture_array_row field, information representing a row of a camera array may represent the Camera_capture_array_col field, and information representing a distance between cameras may represent a Baseline_length field.

Position information of the views may include information representing a yaw value of a midpoint of a 6DoF video of the corresponding view, information representing a pitch value of a midpoint of a 6DoF video of the corresponding view, information representing a roll value of a midpoint of a 6DoF video of the corresponding view, information representing a component of the front and rear direction axis of the corresponding view position, information representing a component of the up and down direction axis of the corresponding view position, and/or information representing a component of the left and right direction axis of the corresponding view position. Here, the fore and aft direction axis may represent a y-axis, the left and right direction axis may represent an x-axis, and the up and down direction axis may represent a z-axis. Information representing a yaw value of a midpoint of a 6DoF video of the corresponding view may represent the camera_center_yaw field, information representing a pitch value of a midpoint of a 6DoF video of the corresponding viewpoint may represent the camera_center_pitch field, information representing a roll value of a midpoint of a 6DoF video of the corresponding view may represent the camera_center_roll field, information representing a component of the forward and backward axis of the corresponding view position may represent the camera_center_FB field, information representing a component of an up-down direction axis of the corresponding view position may represent the camera_center_UD field, and information representing a component of a left-right direction axis of the corresponding view position may represent the camera_center_RL field.

The camera array information may represent a camera array type used for capturing the 6DoF video. Here, the camera array type may be one of a High Density Camera Array (HDCA), a Low Density Camera Array (LDCA), a microlens, an omnidirectional camera, a movement camera, and a user defined array.

Specifically, for example, when a value of the camera array information is 0, the camera array information may represent the HDCA as a camera array type of the 6DoF video. Further, when a value of the camera array information is 1, the camera array information may represent the LDCA as a camera array type of the 6DoF video. Further, when a value of the camera array information is 2, the camera array information may represent the microlens as a camera array type of the 6DoF video. Further, when a value of the camera array information is 3, the camera array information may represent the omnidirectional camera as a camera array type of the 6DoF video. Further, when a value of the camera array information is 4, the camera array information may represent the movement camera as a camera array type of the 6DoF video. Further, when a value of the camera array information is 5, the camera array information may represent the user defined array as a camera array type of the 6DoF video.

Further, the metadata may include a flag representing whether the camera information is delivered, and when a value of the flag is 1, the metadata may include the camera information. A flag representing whether the camera information is delivered may represent the camera region_info_flag field.

Further, the stitching information may include information representing the number of stitching target views and position information of the stitching target view. Position information of the stitching target view may include information representing an x component of the stitching target view position, information representing a y component of the stitching target view position, information representing a z component of the stitching target view position, and information representing a distance between the stitching target view position and the stitching 6DoF video or image. Alternatively, position information of the stitching target view may include information representing a yaw component of the stitching target view position, information representing a pitch component of the stitching target view position, information representing a roll component of the stitching target view position, information representing a distance between the stitching target view position and the stitching 6DoF video or image, and information representing the number of the stitching 6DoF video or image.

Information representing the number of the stitching target views may represent the num_view_center field, information representing an x component of the stitching target view position may represent the position_center_X field, information representing a y component of the stitching target view position may represent the position_center_Y field, information representing a z component of the stitching target view position may represent the position_center_Z field, information representing a distance between the stitching target view position and the stitching 6DoF video or image may represent the stitching_radius field, and information representing the number of stitching 6DoF videos or images may represent the num_camera field. Information representing a yaw component of the stitching target view position may represent the position_center_yaw field, information representing a pitch component of the stitching target view position may represent the position_center_pitch field, and information representing a roll component of the stitching target view position may represent the position_center_roll field.

Further, the stitching information may include a flag representing whether a stitching process for deriving the image is performed. When a value of the flag is 1, a stitching process may be performed to derive an image of the user position. When a value of the flag is 0, a stitching process may not be performed to derive the image. A flag representing whether the stitching process for deriving the image is performed may represent the stitching_flag field.

Further, the metadata may include rotation information about an initial view of the 6DoF video and position information of the initial view of the 6DoF video. Here, the initial view may represent a view provided initially of the 6DoF video, and the user position when the 6DoF video is first provided may be derived as a position of the initial view.

Rotation information about an initial view of the 6DoF video may include information representing a yaw value of a midpoint of the initial view, information representing a pitch value of a midpoint of the initial view, and information representing a roll value of a midpoint of the initial view. Position information of the initial view of the 6DoF video may include information representing a component of the forward and backward axis of a position of the initial view, information representing a component of the left and right axis of a position of the initial view, and information representing a component of the up and down direction axis of a position of the initial view. Information representing a yaw value of a midpoint of the initial view may represent the initial_view_yaw_degree field, information representing a pitch value of a midpoint of the initial view may represent the initial_view_pitch_degree field, information representing a roll value of a midpoint of the initial view may represent the initial_view_yaw_roll field, information representing a component of the forward and backward axis of the position of the initial view may represent the initial_center_FB_delta field, information representing a component of the left and right axis of the position of the initial view may represent an initial_center_LR_delta field, and information representing a component of an up and down axis of a position of the initial view may represent an initial_center_UD_delta field.

Further, the metadata may include field of view (FOV) information. The FOV information may include information representing a horizontal direction value of the FOV and/or information representing a vertical direction value of the FOV. A size of the viewport may be derived based on the FOV information, and the viewport may represent an area in which the user is viewing in a 6DoF video, i.e., a displayed area. Information representing a horizontal direction value of the FOV may represent the content_hfov field, and information representing a vertical direction value of the FOV may represent the content_vfov field.

Further, the metadata may include a flag representing whether the FOV information is delivered. When a value of the flag is 1, the metadata may include the FOV information, and when a value of the flag is 0, the metadata may not include the FOV information. A flag representing whether the FOV information is delivered may represent the content_fov_flag field.

Further, the metadata may include rendering information. The rendering information may include information representing a type of a reserved rendering range and information representing a user position. Information representing the user position may include information representing an x component of the user position, information representing a y component of the user position, and information representing a z component of the user position. Information representing a type of the reserved rendering range may represent the reserved_range_type field, information representing an x component of the user position may represent the center_X field, information representing a y component of the user position may represent the center_Y field, and information representing a z component of the user position may represent the center_Z field.

A type of the reserved rendering range may be one of a sphere type formed with the same radius about the user position, a top-shape type formed horizontally and vertically about the user position, an elevation direction type in which a vertical movement range about the user position is formed, a lateral direction type that forms a range that advances or retracts about the user position, a longitudinal direction type in which a range moving to the left or the right about the user position is formed, and a user defined type in which a free form range is formed.

Specifically, for example, when a value of information representing a type of the reserved rendering range is 0, information representing a type of the reserved rendering range may represent the sphere type as a type of the reserved rendering range of the 6DoF video. Further, when a value of information representing a type of the reserved rendering range is 1, information representing a type of the reserved rendering range may represent the top-shape type as a type of the reserved rendering range of the 6DoF video. Further, when a value of information representing a type of the reserved rendering range is 2, information representing a type of the reserved rendering range may represent the elevation direction type as a type of the reserved rendering range of the 6DoF video. Further, when a value of information representing a type of the reserved rendering range is 3, information representing a type of the reserved rendering range may represent the lateral direction type as a type of the reserved rendering range of the 6DoF video. Further, when a value of information representing a type of the reserved rendering range is 4, information representing a type of the reserved rendering range may represent the longitude direction type as a type of the reserved rendering range of the 6DoF video. Further, when a value of information representing a type of the reserved rendering range is 5, information representing a type of the reserved rendering range may represent the user defined type as a type of the reserved rendering range of the 6DoF video.

When a type of the reserved rendering range is derived as the spear type, the rendering information may include information representing a radius of the reserved rendering range. Information representing a radius of the reserved rendering range may represent the sphere_radius_to_boundary field.

Further, when a type of the reserved rendering range is derived as the top-shape type, the rendering information may include information representing a horizontal_range of a reserved rendering range and/or information representing a vertical_range of a reserved rendering range. Information representing a horizontal_range of the reserved rendering range may represent the horizontal_range field, and information representing a vertical_range of a reserved rendering range may represent the vertical_range field. Alternatively, when a type of a reserved rendering range is derived as the top-shape type, the rendering information may include information representing a left boundary point of a reserved rendering range located at the horizontal axis of the user position, information representing a right boundary point of a reserved rendering range located at the horizontal axis of the user position, information representing an upper boundary point of a reserved rendering range located at the vertical axis of the user position, and/or information representing a lower boundary point of a reserved rendering range located at the vertical axis of the user position. Information representing a left boundary point of a reserved rendering range located at the horizontal axis of the user position may represent the horizontal_range_left_end field, information representing a right boundary point of a reserved rendering range located at the horizontal axis of the user position may represent the horizontal_range_right_end field, information representing an upper boundary point of a reserved rendering range located at the vertical axis of the user position may represent the vertical_range_top_end field, and information representing a lower boundary point of a reserved rendering range located at the vertical axis of the user position may represent the vertical_range_bottom_end field.

Further, when a type of the reserved rendering range is derived as the elevation direction type, the rendering information may include information representing an upper boundary point of a reserved rendering range located at the vertical axis of the user position and/or information representing a lower boundary point of a reserved rendering range located at the vertical axis of the user position. Information representing an upper boundary point of a reserved rendering range located at a vertical axis of the user position may represent the distance_to_top_endpoint field, and information representing the lower boundary point of a reserved rendering range located at a vertical axis of the user position may represent the distance_to_bottom_endpoint field.

Further, when a type of the reserved rendering range is derived as the lateral direction type, the rendering information may include information representing a left boundary point of a reserved rendering range located at a horizontal axis of the user position and/or information representing a right boundary point of a reserved rendering range located at a horizontal axis of the user position. Information representing a left boundary point of a reserved rendering range located at a horizontal axis of the user position may represent the distance_to_left_endpoint field, and information representing a right boundary point of a reserved rendering range located at the horizontal axis of the user position may represent the distance_to_right_endpoint field.

Further, when a type of the reserved rendering range is derived as the longitudinal direction type, the rendering information may include information representing a front boundary point of a reserved rendering range located at a forward and backward axis of the user position and/or information representing a back boundary point of a reserved rendering range located at the fore and aft axis of the user position. Information representing a front boundary point of a reserved rendering range located at the front-rear axis of the user position may represent the distance_to_front_endpoint field, and information representing a rear boundary point of a reserved rendering range located at the front-rear axis of the user position may represent the distance_to_back_endpoint field.

Further, when a type of the reserved rendering range is derived as the user defined type, the rendering information may include information representing a vertex of the reserved rendering range. Information representing a vertex of a reserved rendering range may represent the vertex_X[ ] field, the vertex_Y[ ] field, and the vertex_Z[ ] field.

Further, the rendering information may include information representing a distance from the user position to the reserved rendering position in the vicinity. Information representing a distance from the user position to the reserved rendering position in the vicinity may represent the step_size field. As a value of the information decreases, the number of videos or images rendered within the defined reserved rendering range increases, and as the value of the information increases, reserved rendering may be performed sparsely in a reserved rendering range. A value acquired by dividing a distance from the user position to each boundary of a reserved rendering range by the step_size field value may be derived as the number of centers of the reserved rendering position.

Further, the rendering information may include information representing a rendering type of the reserved rendering position. Information representing the rendering type of the reserved rendering position may include the rendering_type field.

The rendering type may be one of a whole sphere rendering type that renders a video or an image in the entire 3D space (i.e., entire sphere) at the reserved rendering position and a partial viewport rendering type that renders the video or image to a partial viewport at the reserved rendering position.

Specifically, for example, when a value of information representing a rendering type of the reserved rendering position is 0, information representing the rendering type of the reserved rendering position may represent the whole sphere rendering type as the rendering type. Further, when a value of information representing a rendering type of the reserved rendering position is 1, information representing a rendering type of the reserved rendering position may represent the partial viewport rendering type as the rendering type.

When the rendering type is derived as the whole sphere rendering type, the rendering information may include information representing a radius of a 3D space (e.g., sphere) in which a video or an image of the reserved rendering position is rendered. Information representing a radius of a 3D space may represent the sphere_radius field.

Further, when the rendering type is derived as the partial viewport rendering type, the rendering information may include information representing a yaw value of a midpoint of the partial viewport in which a video or an image of the reserved rendering position is rendered, information representing a pitch value of the midpoint of the partial viewport, information representing a roll value of a midpoint of the partial viewport, information representing a horizontal_range of the partial viewport, and information representing a vertical_range of the partial viewport. Information representing a yaw value of a midpoint of the partial viewport may represent the preliminary_viewport_yaw field, information representing a pitch value of a midpoint of the partial viewport may represent the preliminary_viewport_pitch field, information representing a roll value of a midpoint of the partial viewport may represent the preliminary_viewport_roll field, information representing a horizontal_range of the partial viewport may represent the preliminary_hor_range field, and information representing a vertical_range of the partial viewport may represent the preliminary_ver_range field. The partial viewport may be derived based on the midpoint, the horizontal_range, and the vertical range derived based on the information.

Further, the metadata may include a flag representing whether the rendering information is delivered. When a value of the flag is 1, the metadata may include the rendering information, and when a value of the flag is 0, the metadata may not include the rendering information. A flag representing whether the rendering information is delivered may represent the reserved_rendering_range_flag field.

The metadata may be received through an SEI message. Further, the metadata may be included in an adaptation set, a representation, or a subrepresentation of a media presentation description (MPD). Here, the SEI message may be used for decoding of a 2D image or for assistance in displaying the 2D image in a 3D space.

The 6DoF video receiving apparatus may decode the pictures based on the metadata and information about the pictures and derive an image of the user position (S2410). The 6DoF video receiving apparatus may decode the pictures based on information about the pictures.

The pictures may represent pictures mapped to a 6DoF video of views captured by at least one camera. Further, the views may include a primary view (PV) and a secondary view (SV), and the pictures may include a picture of the PV and a picture of the SV. In this case, the 6DoF video receiving apparatus may decode a picture of the PV and a picture of the SV.

When a flag representing whether a stitching process is performed represents that the stitching process is performed, i.e., when a value of the flag is 1, the 6DoF video receiving apparatus may perform a stitching process. Specifically, the 6DoF video receiving apparatus may derive at least one stitching target view based on the camera information and the stitching information, derive pictures of the stitching target view among the decoded pictures, and stitch the pictures to derive the image of the user position.

That is, when the stitching target view is derived, the 6DoF video receiving apparatus may derive a captured scene of the stitching target view among the pictures based on information representing the number of stitched 6DoF videos or images, camera array information, and information representing a camera position with respect to the stitching target view. When the captured scene is derived, the 6DoF video receiving apparatus may perform a sphere generation process of generating a 3D space in which the captured scene is to be stitched based on projection scheme information and sphere radius size information. The 6DoF video receiving apparatus may derive the image based on the captured scene. When there is no captured scene of the stitching target view, the 6DoF video receiving apparatus may generate a virtual image based on pictures of peripheral views of the stitching target view.

As described above, the metadata may include rotation information about an initial view of the 6DoF video and position information of the initial view of the 6DoF video. Here, the initial view represents a view provided initially of the 6DoF video, and the current position when the 6DoF video is first provided may be derived as a position of the initial view.

The 6DoF video receiving apparatus processes the image based on the metadata and renders the image in a 3D space about the user position (S2420).

The 6DoF video receiving apparatus may map a 6DoF video of the image to a 3D space based on the metadata. Specifically, the 6DoF video receiving apparatus may map 6DoF video data of the image to a 3D model according to a projection scheme. The projection scheme may be derived based on projection scheme information, and the metadata may include the projection scheme information.

Further, the 6DoF video receiving apparatus may derive a reserved rendering range of the user position based on the rendering information. Specifically, the rendering information may include information representing a type of the reserved rendering range. Further, the rendering information may include additional information about the type. The 6DoF video receiving apparatus may derive a form and size of the reserved rendering range based on information representing a type of the reserved rendering range and the additional information.

Further, the 6DoF video receiving apparatus may derive a rendering type of a reserved rendering position within the reserved rendering range based on the rendering information. The rendering type may be derived as one of the above-described whole sphere rendering type and partial viewport rendering type. The rendering information may include additional information about the rendering type. A rendering area may be derived based on the additional information about the rendering type.

When the reserved rendering range is derived and when the user position is moved, if the moved position is the reserved rendering position within the reserved rendering range, an image of the moved position may be rendered according to the rendering type. For example, when a rendering type of the reserved rendering position in the reserved rendering range is derived as the whole sphere rendering type, an image of the moved position may be rendered in an entire sphere, and when a rendering type of the reserved rendering position in the reserved rendering range is derived as the partial viewport rendering type, an image of the moved position may be rendered in the partial viewport.

According to the present disclosure, 6DoF contents according to the user position movement can be provided, and experiences of immersive media/immersive media can be provided to the user.

Further, according to the present disclosure, by signaling stitching information about a specific position, even if there is no captured 6DoF video for the specific position, a 6DoF video of the specific position may be generated and provided to the user based on a 6DoF video of a peripheral position and 6DoF contents can be provided more efficiently.

Further, according to the present disclosure, by signaling reserved rendering information according to a movement direction provided in the 6DoF content or a predicted position movement direction of the user, the 6DoF content to be provided to the user may be delivered and rendered preferentially and be provided more efficiently.

The above-described steps may be omitted or replaced by other steps of performing similar/same operations according to an embodiment.

The 6DoF video transmitting apparatus according to an embodiment of the present disclosure may include the above-described data inputter, stitcher, signaling processor, projection processor, data encoder, transmission processor, and/or transmitter. Each of the internal components is as described above. The 6DoF video transmitting apparatus and internal components thereof according to an embodiment of the present disclosure may perform the above-described embodiments of a method for transmitting the 6DoF video of the present disclosure.

The 6DoF video receiving apparatus according to an embodiment of the present disclosure may include the above-described receiver, reception processor, data decoder, signaling parser, re-projection processor, and/or renderer. Each of the internal components is as described above. The 6DoF video receiving apparatus and internal components thereof according to an embodiment of the present disclosure may perform the above-described embodiments of a method of receiving a 6DoF video of the present disclosure.

The internal components of the above-described apparatus may be processors for executing successive procedures stored in a memory or hardware components configured with other hardware. The internal components may be located inside or outside the device.

The above-described modules may be omitted or replaced by other modules performing similar/same operations according to embodiments.

Each part, module, or unit described above may be a processor or a hardware part that executes successive procedures stored in a memory (or storage unit). Each step described in the foregoing embodiment may be performed by hardware parts or processors. Each module/block/unit described in the foregoing embodiment may operate as hardware/processor. Further, methods suggested by the present disclosure may be executed as a code. The code may be recorded in a processor readable storage medium and may be thus read by a processor provided by an apparatus.

In the above embodiment, although the methods have been described on the basis of the flowcharts as a series of steps or blocks, the present disclosure is not limited to the sequence of the steps, and some of the steps may be performed with different sequences from other steps or may be performed simultaneously with other steps. Furthermore, those skilled in the art will understand that the steps shown in the flowcharts are not exclusive and may include other steps or one or more steps of the flowcharts may be deleted without affecting the scope of the present disclosure.

In the present disclosure, when embodiments are implemented in software, the above-described method may be implemented with a module (process, function) that performs the above-described function. The module may be stored at a memory and may be executed by the processor. The memory may exist at the inside or the outside of the processor and may be connected to the processor with well-known various means. The processor may include an application-specific integrated circuit (ASIC), another chipset, a logic circuit, and/or a data processor. The memory may include a read-only memory (ROM), a random access memory (RAM), a flash memory, a memory card, a storage medium, and/or another storage device.

What is claimed is:

1. A six degrees of freedom (6DoF) video data processing method performed by a 6DoF video receiving apparatus, the 6DoF video data processing method comprising:
    acquiring information about pictures of a 6DoF video and metadata of the 6DoF video;
    decoding the pictures based on the metadata and the information about the pictures, and deriving an image of a user position; and rendering the image in a 3D space centered on the user position by processing the image based on the metadata, wherein the metadata comprises camera information for a camera capturing the 6DoF video and stitching information, wherein the decoding of the pictures based on the metadata and the deriving of the image of the user position comprises:

deriving at least one stitching target view based on the camera information and the stitching information;

deriving pictures of the stitching target view among the decoded pictures; and deriving the image of the user position by stitching the pictures, wherein the camera information comprises camera array information about the 6DoF video, information representing the number of views captured by the camera, and position information of the views, and the stitching information comprises information representing the number of the stitching target view and position information of the stitching target view.

2. The 6DoF video data processing method of claim 1, wherein the stitching information comprises a flag representing whether a stitching process for deriving the image is performed.

3. The 6DoF video data processing method of claim 1, wherein the camera array information represents a camera array type used for capturing the 6DoF video, and the camera array type is one of a high density camera array (HDCA), a low density camera array (LDCA), a microlens, an omnidirectional camera, a movement camera, and a user defined array.

4. The 6DoF video data processing method of claim 1, wherein the metadata comprises rotation information about an initial view of the 6DoF video and position information of the initial view of the 6DoF video.

5. The 6DoF video data processing method of claim 1, further comprising:

deriving a reserved rendering range of the user position based on rendering information; and deriving a rendering type of a reserved rendering position in the reserved rendering range based on the rendering information, wherein the metadata comprises the rendering information, and the rendering information comprises information representing a type of the reserved rendering range and information representing the rendering type.

6. The 6DoF video data processing method of claim 5, wherein the type of the reserved rendering range is one of a sphere type, a top-shape type, an elevation direction type, a lateral direction type, a longitudinal direction type, and a user defined type.

7. The 6DoF video data processing method of claim 5, wherein, when the type of the reserved rendering range is the spear type, the rendering information comprises information representing a radius of the reserved rendering range, wherein the reserved rendering range is derived as a sphere having the radius and centered on the user position.

8. The 6DoF video data processing method of claim 5, wherein the rendering type is one of a whole sphere rendering type and a partial viewport rendering type.

9. The 6DoF video data processing method of claim 8, wherein an image of the moved position is rendered in a partial viewport, when the rendering type is the partial viewport rendering type and a position of the user is moved.

10. The 6DoF video data processing method of claim 9, wherein the partial viewport is derived based on the rendering information, and the rendering information comprises information representing a yaw value of a midpoint of the partial viewport, information representing a pitch value of the midpoint of the partial viewport, information representing a roll value of the midpoint of the partial viewport, information representing a horizontal range of the partial viewport, and information representing a vertical range of the partial viewport.

11. A 6DoF video data processing method performed by a 6DoF video transmitting apparatus, the 6DoF video data processing method comprising:

acquiring a 6DoF video of a plurality of views by at least one camera;

acquiring pictures of the views by processing the 6DoF video;

generating metadata of the 6DoF video;

encoding the pictures; and performing a process for storing or transmitting the encoded pictures and the metadata, wherein the metadata comprises camera information for a camera capturing the 6DoF video and stitching information, wherein the acquiring of the pictures of the views comprises:

deriving at least one stitching target view;

deriving captured scenes of the stitching target view;

stitching the captured scenes and deriving a picture of the stitching target view by processing the stitched captured scenes; and generating the camera information and the stitching information, wherein the camera information comprises camera array information about the 6DoF video, information representing the number of views captured by the camera, and position information of the views, and the stitching information comprises information representing the number of the stitching target views and position information of the stitching target views.

12. The 6DoF video data processing method of claim 11, wherein the stitching information further comprises information representing a distance between a position of the stitching target view and the captured scenes and information representing the number of the captured scenes.

13. The 6DoF video data processing method of claim 11, wherein the stitching information comprises a flag representing whether a stitching process for deriving the picture of the stitching target view is performed.

14. The 6DoF video data processing method of claim 11, wherein the camera array information represents a camera array type used for capturing the 6DoF video, and the camera array type is one of a high density camera array (HDCA), a low density camera array (LDCA), a microlens, an omnidirectional camera, a movement camera, and a user defined array.

15. The 6DoF video data processing method of claim 11, wherein the metadata comprises rotation information about an initial view of the 6DoF video and position information of the initial view of the 6DoF video.

16. The 6DoF video data processing method of claim 11, further comprising:

deriving a reserved rendering range of the user position; and generating rendering information about the reserved rendering range, wherein the metadata comprises the rendering information, and the rendering information comprises information representing a type of the reserved rendering range and information representing the rendering type.

17. The 6DoF video data processing method of claim 16, wherein the type of the reserved rendering range is one of a sphere type, a top-shape type, an elevation direction type, a lateral direction type, a longitudinal direction type, and a user defined type.

18. The 6DoF video data processing method of claim 16, wherein the rendering type is one of a whole sphere rendering type and a partial viewport rendering type.

\* \* \* \* \*